[19] US 11,882,588 B2
[45] Date of Patent: Jan. 23, 2024

United States Patent
He et al.

(54) SCHEDULING SIDELINK TRANSMISSION WITH RELAY

(71) Applicant: QUALCOMM Incorporated, San Diego, CA (US)

(72) Inventors: Linhai He, San Diego, CA (US); Seyedkianoush Hosseini, San Diego, CA (US); Sudhir Kumar Baghel, Hillsborough, NJ (US); Karthika Paladugu, San Diego, CA (US); Gokul Sridharan, Sunnyvale, CA (US); Gabi Sarkis, San Diego, CA (US); Gavin Bernard Horn, La Jolla, CA (US); Hwan Joon Kwon, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/203,699

(22) Filed: Mar. 16, 2021

(65) Prior Publication Data

US 2021/0298034 A1 Sep. 23, 2021

Related U.S. Application Data

(60) Provisional application No. 62/992,747, filed on Mar. 20, 2020, provisional application No. 62/992,611, filed on Mar. 20, 2020.

(51) Int. Cl.
*H04W 72/10* (2009.01)
*H04W 72/12* (2023.01)
*H04W 72/56* (2023.01)

(52) U.S. Cl.
CPC ........... *H04W 72/56* (2023.01); *H04W 72/12* (2013.01)

(58) Field of Classification Search
CPC .............................. H04W 72/10; H04W 72/12
(Continued)

(56) References Cited

U.S. PATENT DOCUMENTS

2014/0241262 A1\* 8/2014 Novak ................ H04W 72/042
370/329
2018/0219654 A1 8/2018 Chen et al.
(Continued)

FOREIGN PATENT DOCUMENTS

WO WO-2017134578 A1 8/2017
WO WO-2018016157 A1 1/2018
(Continued)

OTHER PUBLICATIONS

International Search Report and Written Opinion—PCT/US2021/022821—ISA/EPO—dated Sep. 24, 2021.
(Continued)

*Primary Examiner* — Angel T Brockman
(74) *Attorney, Agent, or Firm* — Holland & Hart LLP/QUALCOMM Incorporated

(57) ABSTRACT

Methods, systems, and devices for wireless communications are described. A base station may configure resources on a first communication link for scheduling requests and may transmit an indication of the configured resources over a second communication link to a first device. The first device may relay the indication of the configured resources to a second device via the first communication link. The second device may identify that resources on the first communication link are unavailable for a transmission and may transmit a scheduling request. The first device may receive the scheduling request. The first device may transmit, over the first communication link and based on the scheduling request, an indication of one or more shared channel resources configured by the base station for the transmis-
(Continued)

sion. The first device may receive, over the first communication link, the transmission over the one or more shared channel resources.

63 Claims, 43 Drawing Sheets

(58) Field of Classification Search
USPC .......................................................... 370/329
See application file for complete search history.

(56) References Cited

U.S. PATENT DOCUMENTS

| | | |
|---|---|---|
| 2018/0324842 A1 | 11/2018 | Gulati et al. |
| 2019/0335356 A1 | 10/2019 | Lee et al. |
| 2020/0029353 A1 | 1/2020 | Xu et al. |
| 2020/0092685 A1 | 3/2020 | Fehrenbach et al. |
| 2020/0196387 A1 | 6/2020 | Roy et al. |
| 2020/0344771 A1 | 10/2020 | Kang et al. |
| 2021/0168826 A1 | 6/2021 | Zhao |
| 2021/0297992 A1 | 9/2021 | He et al. |
| 2021/0298043 A1 | 9/2021 | He et al. |
| 2022/0015070 A1 | 1/2022 | Chen et al. |
| 2022/0022244 A1 | 1/2022 | Zhao |
| 2022/0124772 A1 | 4/2022 | Xu et al. |
| 2022/0225341 A1 | 7/2022 | Li et al. |
| 2022/0346112 A1 | 10/2022 | Lin et al. |
| 2022/0400490 A1 | 12/2022 | Ji et al. |

FOREIGN PATENT DOCUMENTS

| | | |
|---|---|---|
| WO | WO-2018061521 A1 | 4/2018 |
| WO | WO-2020006366 A1 | 1/2020 |
| WO | WO-2020006388 A1 | 1/2020 |
| WO | WO-2020034610 A1 | 2/2020 |

OTHER PUBLICATIONS

Interdigital Inc: "Remaining Aspects of UL/SL Prioritization", 3GPP Draft, 3GPP RAN WG2 Meeting #107bis, R2-1914868, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Nov. 8, 2019 (Nov. 8, 2019), XP051816812, 4 Pages, Retrieved from the Internet: URL: https://ftp.3gpp.org/tsg_ran/WG2_RL2/TSGR2_108/Docs/R2-1914868.zip. R2-1914S68 (R16-V2X WI A642 UL SL Prioritization Aspects).doc [Retrieved on Nov. 8, 2019] section 2.3.

Nokia, et al., "Sidelink Resource Allocation with Relay UE", 3GPP Daft, 3GPP TSG RAN WG1 Meeting #89, R1-1708564, Sidelink Resource Allocation with Relay UE V2, 3rd Generation Partnership Project (3GPP), Mobile Competence Centre, 650, Route Des Lucioles, F-06921 Sophia-Antipolis Cedex, F, vol. RAN WG1, No. Hangzhou, China, May 15, 2017-May 19, 2017, May 14, 2017 (May 14, 2017), XP051273756, 7 Pages, Retrieved from the Internet: URL: http://www.3gpp.org/ftp/Meetings_3GPP_SYNC/RAN1/Docs/. [Retrieved on May 14, 2017], section 2, figure 2.

NTT Docomo Inc, "Sidelink Physical Layer Structure for NR V2X", 3GPP Draft, 3GPP TSG RAN WG1 Meeting #AH1901, R1-1900962, SL PHY Structure, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593807, 7 Pages, Retrieved from the Internet: URL: http://www.3gpp.org/ftp/Meetings%5F3GPP%5FSYNC/RAN1/Docs/R1%2D1900962%2Ezip. [retrieved on Jan. 20, 2019] p. 2.

Partial International Search Report—PCT/US2021/022821—ISA/EPO—dated Jul. 27, 2021.

Coolpad: "Further Discussion on Resource Allocation Issues and Way Forward for Release 13", 3GPP Draft, 3GPP TSG RAN WG2 #91 bis, R2-154269, 3GPP, Mobile Competence Centre, 650, Route Des Lucioles, F-06921 Sophia-Antipolis Cedex, France, vol. RAN WG2, No. Malmo, Sweden, Oct. 5, 2015-Oct. 10, 2015, Oct. 4, 2015, XP051004828, pp. 1-4, paragraph [03.3], p. 2, paragraph 3.1, p. 2, figure 2.

VIVO: "Triggering Condition of Pre-BSR", 3GPP Draft, 3GPP TSG-RAN WG2 Meeting #106, R2-1905829 (Resubmission of R2-19003343)_Triggering Condition of PRE-BSR, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019 May 3, 2019 (May 3, 2019), XP051710182, pp. 1-3.

3GPP TS 23.304 V0.1.0 (Mar. 2021) Technical Specification, 3rd Generation Partnership Project; Technical Specification Group Services and System Aspects; Proximity based Services (ProSe) in the 5G System (5GS) (Release 17), Sections 5.4 and 6.1, Mar. 2021, Valbonne, France, 7 pages.

\* cited by examiner

SCHEDULING SIDELINK TRANSMISSION WITH RELAY

CROSS REFERENCE

The present Application for Patent claims the benefit of U.S. Provisional Patent Application No. 62/992,611 by HE et al., entitled "SCHEDULING SIDELINK TRANSMISSION WITH RELAY," filed Mar. 20, 2020, assigned to the assignee hereof, and expressly incorporated by reference herein. Additionally, the present Application for Patent claims the benefit of U.S. Provisional Patent Application No. 62/992,747 by HE et al., entitled "CONFIGURATIONS FOR SIDELINK SCHEDULING REQUESTS," filed Mar. 20, 2020, assigned to the assignee hereof, and expressly incorporated by reference herein.

INTRODUCTION

The following relates to wireless communications and more specifically to scheduling sidelink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include transmitting, over a communication link between the first device and a second device, a scheduling request. The method may include receiving, over the communication link and based on transmitting the scheduling request, an indication of one or more shared channel resources configured by a base station for a transmission by the first device. The method may include transmitting, over the communication link, the transmission over at least a portion of the one or more shared channel resources.

An apparatus for wireless communication at a first device is described. The apparatus may include a processor and memory coupled to the processor, the processor and the memory configured to transmit, over a communication link between the first device and a second device, a scheduling request. The processor and the memory may be further configured to receive, over the communication link and based on transmitting the scheduling request, an indication of one or more shared channel resources configured by a base station for a transmission by the first device. The processor and the memory may be further configured to transmit, over the communication link, the transmission over at least a portion of the one or more shared channel resources.

Another apparatus for wireless communication at a first device is described. The apparatus may include means for transmitting, over a communication link between the first device and a second device, a scheduling request, means for receiving, over the communication link and based on transmitting the scheduling request, an indication of one or more shared channel resources configured by a base station for a transmission by the first device, and means for transmitting, over the communication link, the transmission over at least a portion of the one or more shared channel resources.

A non-transitory computer-readable medium storing code for wireless communication at a first device is described. The code may include instructions executable by a processor to transmit, over a communication link between the first device and a second device, a scheduling request, receive, over the communication link and based on transmitting the scheduling request, an indication of one or more shared channel resources configured by a base station for a transmission by the first device, and transmit, over the communication link, the transmission over at least a portion of the one or more shared channel resources.

Some examples of the method, apparatuses, and non-transitory computer-readable medium described herein may further include operations, features, means, or instructions for receiving or a processor and memory configured to receive a control signal from the base station indicating a priority for each of a set of multiple logical channel groups of the first device.

Some examples of the method, apparatuses, and non-transitory computer-readable medium described herein may further include operations, features, means, or instructions for determining or a processor and memory configured to determine that a criterion for transmitting the transmission may be satisfied, where the transmitting the transmission over at least the portion of the one or more shared channel resources may be based at least in part on determining that the criterion may be satisfied, where the transmission corresponds to data stored at the first device, and where the criterion includes the first device receiving the data at an empty buffer, the data being associated with a logical channel that may have a higher priority than one or more additional logical channels associated with additional data stored at the first device, or a combination thereof.

A method for wireless communication at a first device is described. The method may include receiving, over a first communication link between the first device and a second device, a scheduling request. The method may include transmitting, over the first communication link and based on receiving the scheduling request, an indication of one or more shared channel resources configured by a base station for a transmission by the second device. The method may include receiving, over the first communication link, the transmission over at least a portion of the one or more shared channel resources. The method may include transmitting, over a second communication link between the first device and the base station, an indication that the transmission was successfully received and decoded by the first device.

An apparatus for wireless communication at a first device is described. The apparatus may include a processor and memory coupled to the processor, the processor and the memory further configured to receive, over a first communication link between the first device and a second device, a scheduling request. The processor and the memory may be further configured to transmit, over the first communication link and based on receiving the scheduling request, an indication of one or more shared channel resources configured by a base station for a transmission by the second device. The processor and the memory may be further configured to receive, over the first communication link, the transmission over at least a portion of the one or more shared channel resources. The processor and the memory may be further configured to transmit, over a second communication link between the first device and the base station, an indication that the transmission was successfully received and decoded by the first device.

Another apparatus for wireless communication at a first device is described. The apparatus may include means for receiving, over a first communication link between the first device and a second device, a scheduling request, means for transmitting, over the first communication link and based on receiving the scheduling request, an indication of one or more shared channel resources configured by a base station for a transmission by the second device, means for receiving, over the first communication link, the transmission over at least a portion of the one or more shared channel resources, and means for transmitting, over a second communication link between the first device and the base station, an indication that the transmission was successfully received and decoded by the first device.

A non-transitory computer-readable medium storing code for wireless communication at a first device is described. The code may include instructions executable by a processor to receive, over a first communication link between the first device and a second device, a scheduling request, transmit, over the first communication link and based on receiving the scheduling request, an indication of one or more shared channel resources configured by a base station for a transmission by the second device, receive, over the first communication link, the transmission over at least a portion of the one or more shared channel resources, and transmit, over a second communication link between the first device and the base station, an indication that the transmission was successfully received and decoded by the first device.

Some examples of the method, apparatuses, and non-transitory computer-readable medium described herein may further include operations, features, means, or instructions for receiving or a processor and memory configured to receive, over the second communication link, an indication of one or more feedback channel resources for the scheduling request from the second device to the first device and operations, features, means, or instructions for transmitting or the processor and the memory configured to transmit, over the first communication link, the indication of the one or more feedback channel resources, where the scheduling request may be received over at least a portion of the one or more feedback channel resources.

Some examples of the method, apparatuses, and non-transitory computer-readable medium described herein may further include operations, features, means, or instructions for receiving or a processor and memory configured to receive, over the second communication link, an indication of one or more additional feedback channel resources for the scheduling request from the second device to the first device and operations, features, means, or instructions for transmitting or the memory and the processor being configured to transmit, over the first communication link, the indication of the one or more additional feedback channel resources, where the one or more feedback channel resources may be associated with a first priority and the one or more additional feedback channel resources may be associated with a second priority, and where the scheduling request may be received over the at least the portion of the one or more feedback channel resources based on the data being associated with a logical channel group with the first priority.

In some examples of the method, apparatuses, and non-transitory computer-readable medium described herein, the one or more feedback channel resources may be associated with a first prohibit timer and a first maximum transmission counter, and the one or more additional feedback channel resources may be associated with a second prohibit timer and a second maximum transmission counter.

Some examples of the method, apparatuses, and non-transitory computer-readable medium described herein may further include operations, features, means, or instructions for receiving or a processor and memory further configured to receive a first control signal over the second communication link indicating a priority for each of a set of multiple logical channel groups of the second device and operations, features, means, or instructions for transmitting or the memory or the processor being configured to transmit a second control signal over the first communication link indicating the priority for each of the set of multiple logical channel groups of the second device.

Some examples of the method, apparatuses, and non-transitory computer-readable medium described herein may further include operations, features, means, or instructions for transmitting or a processor and memory configured to transmit, to a third device, a third control signal indicating the priority for each of the set of multiple logical channel groups of the second device.

In some examples of the method, apparatuses, and non-transitory computer-readable medium described herein, and the method, apparatuses, and non-transitory computer-readable medium may include further operations, features, means, or instructions for transmitting or a processor and memory configured to transmit the buffer status report over the second communication link.

Some examples of the method, apparatuses, and non-transitory computer-readable medium described herein may further include operations, features, means, or instructions for transmitting or a processor and memory configured to transmit, over the second communication link, a second scheduling request over the second communication link based on receiving the scheduling request over the first communication link and operations, features, means, or instructions for receiving or the processor and the memory being configured to receive, over the second communication link, the indication of the one or more shared channel resources based on transmitting the second scheduling request.

Some examples of the method, apparatuses, and non-transitory computer-readable medium described herein may further include operations, features, means, or instructions for transmitting or a processor and memory being configured to transmit, over the first communication link, an indication of second one or more shared channel resources configured by the base station for the transmission, operations, features, means, or instructions for determining or the memory and the processor being configured to determine that the first device may have failed to successfully receive and decode the transmission over the second one or more shared channel resources, and operations, features, means, or instructions for transmitting or the processor and the memory being configured to transmit, over the second communication link, an indication that the first device may have failed to successfully receive and decode the transmission based on the determining, where receiving the indication of the one or more shared channel resources may be based on transmitting the indication that the first device may have failed to successfully receive and decode the transmission.

In some examples of the method, apparatuses, and non-transitory computer-readable medium described herein, the scheduling request may be received over a dedicated feedback channel.

In some examples of the method, apparatuses, and non-transitory computer-readable medium described herein, the transmission corresponds to data stored at the second device, and the scheduling request explicitly indicates a priority of a logical channel group associated with the data.

In some examples of the method, apparatuses, and non-transitory computer-readable medium described herein, the transmission corresponds to data stored at the second device, and the transmission indicates a priority of one or more logical channel groups associated with the data stored at the second device.

In some examples of the method, apparatuses, and non-transitory computer-readable medium described herein, the transmission includes a buffer status report corresponding to data stored at the second device.

A method for wireless communication at a base station is described. The method may include transmitting, over a communication link between the base station and a first device, an indication of one or more shared channel resources for a transmission from a second device to the first device. The method may include receiving an indication that the transmission was successfully received and decoded by the first device based on transmitting the indication of the one or more shared channel resources.

An apparatus for wireless communication at a base station is described. The apparatus may include a processor and memory coupled to the processor, the processor and the memory configured to transmit, over a communication link between the base station and a first device, an indication of one or more shared channel resources for a transmission from a second device to the first device. The processor and the memory may be further configured to receive an indication that the transmission was successfully received and decoded by the first device based on transmitting the indication of the one or more shared channel resources.

Another apparatus for wireless communication at a base station is described. The apparatus may include means for transmitting, over a communication link between the base station and a first device, an indication of one or more shared channel resources for a transmission from a second device to the first device and means for receiving an indication that the transmission was successfully received and decoded by the first device based on transmitting the indication of the one or more shared channel resources.

A non-transitory computer-readable medium storing code for wireless communication at a base station is described. The code may include instructions executable by a processor to transmit, over a communication link between the base station and a first device, an indication of one or more shared channel resources for a transmission from a second device to the first device and receive an indication that the transmission was successfully received and decoded by the first device based on transmitting the indication of the one or more shared channel resources.

A method for wireless communication at a first device is described. The method may include receiving, over a first communication link between the first device and a second device, an indication of one or more resources configured by a base station for transmission of a scheduling request to the second device over the first communication link. The method may include triggering a buffer status report for transmission of data to the base station over the second communication link. The method may include identifying, based on triggering the buffer status report, that resources on the first communication link are unavailable for transmission of the buffer status report. The method may include transmitting, to the second device and over the first communication link, the scheduling request using at least a portion of the one or more configured resources and based on identifying that the resources on the first communication link are unavailable.

An apparatus for wireless communication at a first device is described. The apparatus may include a processor and memory coupled to the processor, the processor and the memory configured to receive, over a first communication link between the first device and a second device, an indication of one or more resources configured by a base station for transmission of a scheduling request to the second device over the first communication link. The processor and the memory may be further configured to trigger a buffer status report for transmission of data to the base station over the second communication link. The processor and the memory may be further configured to identify, based on triggering the buffer status report, that resources on the first communication link are unavailable for transmission of the buffer status report. The processor and the memory may be further configured to transmit, to the second device and over the first communication link, the scheduling request using at least a portion of the one or more configured resources and based on identifying that the resources on the first communication link are unavailable.

Another apparatus for wireless communication at a first device is described. The apparatus may include means for receiving, over a first communication link between the first device and a second device, an indication of one or more resources configured by a base station for transmission of a scheduling request to the second device over the first communication link, means for triggering a buffer status report for transmission of data to the base station over the second communication link, means for identifying, based on triggering the buffer status report, that resources on the first communication link are unavailable for transmission of the buffer status report, and means for transmitting, to the second device and over the first communication link, the scheduling request using at least a portion of the one or more configured resources and based on identifying that the resources on the first communication link are unavailable.

A non-transitory computer-readable medium storing code for wireless communication at a first device is described. The code may include instructions executable by a processor to receive, over a first communication link between the first device and a second device, an indication of one or more resources configured by a base station for transmission of a scheduling request to the second device over the first communication link, trigger a buffer status report for transmission of data to the base station over the second communication link, identify, based on triggering the buffer status report, that resources on the first communication link are unavailable for transmission of the buffer status report, and transmit, to the second device and over the first communication link, the scheduling request using at least a portion of the one or more configured resources and based on identifying that the resources on the first communication link are unavailable.

Some examples of the method, apparatuses, and non-transitory computer-readable medium described herein may further include operations, features, means, or instructions for initiating or a processor and memory configured to initiate a counter based on transmission of the scheduling request.

Some examples of the method, apparatuses, and non-transitory computer-readable medium described herein may further include operations, features, means, or instructions for transmitting or a processor and memory configured to transmit, over the first communication link, the buffer status report based on transmission of the scheduling request and operations, features, means, or instructions for resetting or the processor and the memory being configured to reset the counter to an initial value based on transmission of the buffer status report.

Some examples of the method, apparatuses, and non-transitory computer-readable medium described herein may further include operations, features, means, or instructions for transmitting or a processor and memory configured to transmit, over the first communication link, a second scheduling request based on the triggered buffer status report and operations, features, means, or instructions for incrementing or the processor and the memory being configured to increment the counter based on transmission of the second scheduling request.

A method for wireless communication at a first device is described. The method may include receiving, over a first communication link between the first device and a base station, an indication of one or more resources configured by the base station for transmission of a scheduling request from a second device to the first device over a second communication link between the first device and the second device. The method may include transmitting, over the second communication link, the indication of the one or more configured resources, receiving, over the second communication link, the scheduling request using at least a portion of the one or more configured resources, the scheduling request indicating that resources on the second communication link are unavailable for transmission of a buffer status report. The method may include transmitting the scheduling request over the first communication link based on the indication that resources on the second communication link are unavailable and on reception of the scheduling request over the second communication link.

An apparatus for wireless communication at a first device is described. The apparatus may include a processor and memory coupled to the processor, the processor and the memory configured to receive, over a first communication link between the first device and a base station, an indication of one or more resources configured by the base station for transmission of a scheduling request from a second device to the first device over a second communication link between the first device and the second device. The processor and the memory may be further configured to transmit, over the second communication link, the indication of the one or more configured resources. The processor and the memory may be further configured to receive, over the second communication link, the scheduling request using at least a portion of the one or more configured resources, the scheduling request indicating that resources on the second communication link are unavailable for transmission of a buffer status report. The processor and the memory may be further configured to transmit the scheduling request over the first communication link based on the indication that resources on the second communication link are unavailable and on reception of the scheduling request over the second communication link.

Another apparatus for wireless communication at a first device is described. The apparatus may include means for receiving, over a first communication link between the first device and a base station, an indication of one or more resources configured by the base station for transmission of a scheduling request from a second device to the first device over a second communication link between the first device and the second device, means for transmitting, over the second communication link, the indication of the one or more configured resources, means for receiving, over the second communication link, the scheduling request using at least a portion of the one or more configured resources, the scheduling request indicating that resources on the second communication link are unavailable for transmission of a buffer status report, and means for transmitting the scheduling request over the first communication link based on the indication that resources on the second communication link are unavailable and on reception of the scheduling request over the second communication link.

A non-transitory computer-readable medium storing code for wireless communication at a first device is described. The code may include instructions executable by a processor to receive, over a first communication link between the first device and a base station, an indication of one or more resources configured by the base station for transmission of a scheduling request from a second device to the first device over a second communication link between the first device and the second device, transmit, over the second communication link, the indication of the one or more configured resources, receive, over the second communication link, the scheduling request using at least a portion of the one or more configured resources, the scheduling request indicating that resources on the second communication link are unavailable for transmission of a buffer status report, and transmit the scheduling request over the first communication link based on the indication that resources on the second communication link are unavailable and on reception of the scheduling request over the second communication link.

Some examples of the method, apparatuses, and non-transitory computer-readable medium described herein may further include operations, features, means, or instructions for receiving or a processor and memory configured to receive, over the first communication link, a second indication of one or more second resources configured by the base station for transmission of the scheduling request from the second device to the first device over the second communication link and operations, features, means, or instructions for transmitting or the processor and the memory being configured to transmit, over the second communication link, the second indication of the one or more second resources.

In some examples of the method, apparatuses, and non-transitory computer-readable medium described herein, the one or more configured resources may be associated with a first quality of service for first communications on the first communication link and the one or more second resources may be associated with a second quality of service for second communications on the first communication link.

In some examples of the method, apparatuses, and non-transitory computer-readable medium described herein, the one or more configured resources may be associated with a first set of logical channels and the one or more second resources may be associated with a second set of logical channels, the first set of logical channels associated with a first range of logical channel priorities and the second set of logical channels associated with a second range of logical channel priorities.

Some examples of the method, apparatuses, and non-transitory computer-readable medium described herein may further include operations, features, means, or instructions for identifying or a processor and memory configured to identify a priority of the received scheduling request based on the first range of logical channel priorities and receiving the scheduling request on the at least a portion of the one or more configured resources and operations, features, means, or instructions for configuring and the processor and the memory being configured to configure a logical channel for transmission of the scheduling request based on the identified priority.

In some examples of the method, apparatuses, and non-transitory computer-readable medium described herein, the one or more configured resources may be associated with a first timer for prohibiting transmission of the scheduling request and the one or more second resources may be associated with a second timer for prohibiting transmission of the scheduling request.

Some examples of the method, apparatuses, and non-transitory computer-readable medium described herein may further include operations, features, means, or instructions for receiving or a processor and memory being configured to receive a notification over the second communication link that includes an indication that the second device may have released the one or more configured resources and operations, features, means, or instructions for transmitting or the processor and the memory being configured to transmit, the notification over the first communication link based on receiving the notification.

In some examples of the method, apparatuses, and non-transitory computer-readable medium described herein, the scheduling request includes a set of multiple bits and the set of multiple bits includes an indication of a priority associated with the scheduling request.

A method for wireless communication at a base station is described. The method may include configuring one or resources for transmission of a scheduling request from a first device to a second device over a first communication link between the first device and the second device. The method may include transmitting, over a second communication link between the second device and the base station, an indication of the one or more configured resources, receiving, over the second communication link, the scheduling request for the first device based on transmitting the indication of the one or more configured resources. The method may include determining, based on reception of the scheduling request, that resources on the first communication link are unavailable for transmission of a buffer status report.

An apparatus for wireless communication at a base station is described. The apparatus may include a processor and memory coupled to the processor, the processor and the memory configured to configure one or resources for transmission of a scheduling request from a first device to a second device over a first communication link between the first device and the second device. The processor and the memory may be further configured to transmit, over a second communication link between the second device and the base station, an indication of the one or more configured resources. The processor and the memory may be further configured to receive, over the second communication link, the scheduling request for the first device based on transmitting the indication of the one or more configured resources. The processor and the memory may be further configured to determine, based on reception of the scheduling request, that resources on the first communication link are unavailable for transmission of a buffer status report.

Another apparatus for wireless communication at a base station is described. The apparatus may include means for configuring one or resources for transmission of a scheduling request from a first device to a second device over a first communication link between the first device and the second device, means for transmitting, over a second communication link between the second device and the base station, an indication of the one or more configured resources, means for receiving, over the second communication link, the scheduling request for the first device based on transmitting the indication of the one or more configured resources, and means for determining, based on reception of the scheduling request, that resources on the first communication link are unavailable for transmission of a buffer status report.

A non-transitory computer-readable medium storing code for wireless communication at a base station is described. The code may include instructions executable by a processor to configure one or resources for transmission of a scheduling request from a first device to a second device over a first communication link between the first device and the second device, transmit, over a second communication link between the second device and the base station, an indication of the one or more configured resources, receive, over the second communication link, the scheduling request for the first device based on transmitting the indication of the one or more configured resources, and determine, based on reception of the scheduling request, that resources on the first communication link are unavailable for transmission of a buffer status report.

A method for wireless communication at a remote UE is described. The method may include establishing a communication link (e.g., a first quality of service communication link) with a base station, the communication link including a sidelink communication link between the remote UE and a relay UE and a relay communication link between the relay UE and the base station. The method may include transmitting, over the sidelink communication link, a scheduling request, receiving, over the sidelink communication link and based on transmitting the scheduling request, an indication of one or more sidelink shared channel resources configured by the base station for a sidelink transmission by the remote UE. The method may include transmitting, over the sidelink communication link, the sidelink transmission over at least a portion of the one or more sidelink shared channel resources.

An apparatus for wireless communication at a remote UE is described. The apparatus may include a processor and a memory coupled to the processor, where the processor and memory are configured to establish a communication link with a base station, the communication link including a sidelink communication link between the remote UE and a relay UE and a relay communication link between the relay UE and the base station. The processor and the memory may be further configured to transmit, over the sidelink communication link, a scheduling request, receive, over the sidelink communication link and based on transmitting the scheduling request, an indication of one or more sidelink shared channel resources configured by the base station for a sidelink transmission by the remote UE. The processor and the memory may be further configured to transmit, over the sidelink communication link, the sidelink transmission over at least a portion of the one or more sidelink shared channel resources.

Another apparatus for wireless communication at a remote UE is described. The apparatus may include means for establishing a communication link with a base station, the communication link including a sidelink communication link between the remote UE and a relay UE and a relay communication link between the relay UE and the base station, means for transmitting, over the sidelink communication link, a scheduling request, means for receiving, over the sidelink communication link and based on transmitting the scheduling request, an indication of one or more sidelink shared channel resources configured by the base station for a sidelink transmission by the remote UE, and means for transmitting, over the sidelink communication link, the sidelink transmission over at least a portion of the one or more sidelink shared channel resources.

A non-transitory computer-readable medium storing code for wireless communication at a remote UE is described. The code may include instructions executable by a processor to establish a communication link with a base station, the communication link including a sidelink communication link between the remote UE and a relay UE and a relay communication link between the relay UE and the base station, transmit, over the sidelink communication link, a scheduling request, receive, over the sidelink communication link and based on transmitting the scheduling request, an indication of one or more sidelink shared channel resources configured by the base station for a sidelink transmission by the remote UE, and transmit, over the sidelink communication link, the sidelink transmission over at least a portion of the one or more sidelink shared channel resources.

Some examples of the method, apparatuses, and non-transitory computer-readable medium described herein may further include operations, features, means, or instructions for receiving or a processor and memory configured to receive, over the sidelink communication link, an indication of one or more sidelink feedback channel resources configured by the base station for the scheduling request from the remote UE to the relay UE, where the scheduling request may be transmitted over at least a portion of the one or more sidelink feedback channel resources.

Some examples of the method, apparatuses, and non-transitory computer-readable medium described herein may further include operations, features, means, or instructions for receiving or a processor and memory configured to receive, over the sidelink communication link, an indication of one or more additional sidelink feedback channel resources configured by the base station for the scheduling request from the remote UE to the relay UE, where the one or more sidelink feedback channel resources may be associated with a first priority and the one or more additional sidelink feedback channel resources may be associated with a second priority, and where the scheduling request may be transmitted over the at least the portion of the one or more sidelink feedback channel resources based on the data being associated with a logical channel group with the first priority.

In some examples of the method, apparatuses, and non-transitory computer-readable medium described herein, the one or more sidelink feedback channel resources may be associated with a first prohibit timer and a first maximum transmission counter, and the one or more additional sidelink feedback channel resources may be associated with a second prohibit timer and a second maximum transmission counter.

Some examples of the method, apparatuses, and non-transitory computer-readable medium described herein may further include operations, features, means, or instructions for receiving or a processor and memory configured to receive a control signal over the sidelink communication link indicating a priority for each of a set of logical channel groups.

Some examples of the method, apparatuses, and non-transitory computer-readable medium described herein may further include operations, features, means, or instructions for receiving or a processor and memory configured to receive a control signal from the base station indicating a priority for each of a set of logical channel groups of the remote UE.

In some examples of the method, apparatuses, and non-transitory computer-readable medium described herein, the scheduling request may be transmitted over a dedicated feedback channel.

In some examples of the method, apparatuses, and non-transitory computer-readable medium described herein, the sidelink transmission corresponds to data stored at the remote UE, where the scheduling request explicitly indicates a priority of a logical channel group associated with the data.

In some examples of the method, apparatuses, and non-transitory computer-readable medium described herein, the sidelink transmission corresponds to data stored at the remote UE, where the sidelink transmission indicates a priority of one or more logical channel groups associated with the data stored at the remote UE.

Some examples of the method, apparatuses, and non-transitory computer-readable medium described herein may further include operations, features, means, or instructions for determining or a processor and memory configured to determine that a criterion for transmitting the sidelink transmission may be satisfied, where the transmitting the sidelink transmission over at least the portion of one or more sidelink shared channel resources may be based at least in part on determining that the criterion may be satisfied.

In some examples of the method, apparatuses, and non-transitory computer-readable medium described herein, the sidelink transmission corresponds to data stored at the remote UE, where the criterion includes the remote UE receiving the data at an empty buffer, the data being associated with a logical channel that may have a higher priority than one or more additional logical channels associated with additional data stored at the remote UE, or a combination thereof.

In some examples of the method, apparatuses, and non-transitory computer-readable medium described herein, the sidelink transmission includes a buffer status report corresponding to data stored at the remote UE.

A method for wireless communication at a relay UE is described. The method may include establishing a communication link with a base station and a remote UE, the communication link including a sidelink communication link between the remote UE and the relay UE and a relay communication link between the relay UE and the base station. The method may include receiving over the sidelink communication link, a scheduling request, transmitting, over the sidelink communication link and based on receiving the scheduling request, an indication of one or more sidelink shared channel resources configured by the base station for a sidelink transmission by the remote UE. The method may include receiving, over the sidelink communication link, the sidelink transmission over at least a portion of the one or more sidelink shared channel resources. The method may include transmitting, over the relay communication link, an indication that the sidelink transmission was successfully received and decoded by the relay UE.

An apparatus for wireless communication at a relay UE is described. The apparatus may include a processor and memory coupled to the processor, the memory and the processor configured to establish a communication link with a base station and a remote UE, the communication link including a sidelink communication link between the remote UE and the relay UE and a relay communication link between the relay UE and the base station, receive, over the sidelink communication link, a scheduling request. The processor and the memory may be further configured to transmit, over the sidelink communication link and based on receiving the scheduling request, an indication of one or more sidelink shared channel resources configured by the base station for a sidelink transmission by the remote UE. The processor and the memory may be further configured to receive, over the sidelink communication link, the sidelink transmission over at least a portion of the one or more sidelink shared channel resources. The processor and the memory may be further configured to transmit, over the relay communication link, an indication that the sidelink transmission was successfully received and decoded by the relay UE.

Another apparatus for wireless communication at a relay UE is described. The apparatus may include means for establishing a communication link with a base station and a remote UE, the communication link including a sidelink communication link between the remote UE and the relay UE and a relay communication link between the relay UE and the base station, means for receiving, over the sidelink communication link, a scheduling request, means for transmitting, over the sidelink communication link and based on receiving the scheduling request, an indication of one or more sidelink shared channel resources configured by the base station for a sidelink transmission by the remote UE, means for receiving, over the sidelink communication link, the sidelink transmission over at least a portion of the one or more sidelink shared channel resources, and means for transmitting, over the relay communication link, an indication that the sidelink transmission was successfully received and decoded by the relay UE.

A non-transitory computer-readable medium storing code for wireless communication at a relay UE is described. The code may include instructions executable by a processor to establish a communication link with a base station and a remote UE, the communication link including a sidelink communication link between the remote UE and the relay UE and a relay communication link between the relay UE and the base station, receive, over the sidelink communication link, a scheduling request, transmit, over the sidelink communication link and based on receiving the scheduling request, an indication of one or more sidelink shared channel resources configured by the base station for a sidelink transmission by the remote UE, receive, over the sidelink communication link, the sidelink transmission over at least a portion of the one or more sidelink shared channel resources, and transmit, over the relay communication link, an indication that the sidelink transmission was successfully received and decoded by the relay UE.

Some examples of the method, apparatuses, and non-transitory computer-readable medium described herein may further include operations, features, means, or instructions for receiving or a processor and memory configured to receive, over the relay communication link, an indication of one or more sidelink feedback channel resources for the scheduling request from the remote UE to the relay UE, and operations, features, means, or instructions for transmitting or the processor and the memory configured to transmit, over the sidelink communication link, the indication of the one or more sidelink feedback channel resources, where the scheduling request may be received over at least a portion of the one or more sidelink feedback channel resources.

Some examples of the method, apparatuses, and non-transitory computer-readable medium described herein may further include operations, features, means, or instructions for receiving or a processor and memory configured to receive, over the relay communication link, an indication of one or more additional sidelink feedback channel resources for the scheduling request from the remote UE to the relay UE, and operations, features, means, or instructions for transmitting or the processor and the memory configured to transmit, over the sidelink communication link, the indication of the one or more additional sidelink feedback channel resources, where the one or more sidelink feedback channel resources may be associated with a first priority and the one or more additional sidelink feedback channel resources may be associated with a second priority, and where the scheduling request may be received over the at least the portion of the one or more sidelink feedback channel resources based on the data being associated with a logical channel group with the first priority.

In some examples of the method, apparatuses, and non-transitory computer-readable medium described herein, the one or more sidelink feedback channel resources may be associated with a first prohibit timer and a first maximum transmission counter, and the one or more additional sidelink feedback channel resources may be associated with a second prohibit timer and a second maximum transmission counter.

Some examples of the method, apparatuses, and non-transitory computer-readable medium described herein may further include operations, features, means, or instructions for receiving or a processor and memory configured to receive a first control signal over the relay communication link indicating a priority for each of a set of logical channel groups of the remote UE, and operations, features, means, or instructions for transmitting or the processor and the memory configured to transmit a second control signal over the sidelink communication link indicating the priority for each of the set of logical channel groups of the remote UE.

Some examples of the method, apparatuses, and non-transitory computer-readable medium described herein may further include operations, features, means, or instructions for transmitting or a processor and memory configured to transmit, to an additional UE, a third control signal indicating the priority for each of the set of logical channel groups of the remote UE.

In some examples of the method, apparatuses, and non-transitory computer-readable medium described herein, the sidelink transmission may include operations, features, means, or instructions for transmitting or a processor and memory configured to transmit the buffer status report over the relay communication link.

Some examples of the method, apparatuses, and non-transitory computer-readable medium described herein may further include operations, features, means, or instructions for transmitting or a processor and memory configured to transmit, over the relay communication link, a second scheduling request over the relay communication link based on receiving the scheduling request over the sidelink communication link, and operations, features, means, or instructions for receiving or a processor and memory configured to receive, over the relay communication link, the indication of one or more sidelink shared channel resources based on transmitting the second scheduling request.

Some examples of the method, apparatuses, and non-transitory computer-readable medium described herein may further include operations, features, means, or instructions for transmitting or a processor and memory configured to transmit, over the sidelink communication link, an indication of second one or more sidelink shared channel resources configured by the base station for the sidelink transmission, operations, features, means, or instructions for determining or a processor and memory configured to determine that the relay UE may have failed to successfully receive and decode the sidelink transmission over the second one or more sidelink shared channel resources, and operations, features, means, or instructions for transmitting or a processor and memory configured to transmit, over the relay communication link, an indication that the relay UE may have failed to successfully receive and decode the sidelink transmission based on the determining, where receiving the indication of the one or more sidelink shared channel resources may be based on transmitting the indication that the relay UE may have failed to successfully receive and decode the sidelink transmission.

In some examples of the method, apparatuses, and non-transitory computer-readable medium described herein, the scheduling request may be received over a dedicated feedback channel.

In some examples of the method, apparatuses, and non-transitory computer-readable medium described herein, the sidelink transmission corresponds to data stored at the remote UE, and where the scheduling request explicitly indicates a priority of a logical channel group associated with the data.

In some examples of the method, apparatuses, and non-transitory computer-readable medium described herein, the sidelink transmission corresponds to data stored at the remote UE, and where the sidelink transmission indicates a priority of one or more logical channel groups associated with the data stored at the remote UE.

In some examples of the method, apparatuses, and non-transitory computer-readable medium described herein, the sidelink transmission includes a buffer status report corresponding to data stored at the remote UE.

A method for wireless communication at a base station is described. The method may include establishing a communication link with a remote UE, the communication link including a sidelink communication link between the remote UE and a relay UE and a relay communication link between the relay UE and the base station. The method may include transmitting, over the relay communication link, an indication of one or more sidelink shared channel resources for a sidelink transmission from the remote UE to the relay UE. The method may include receiving an indication that the sidelink transmission was successfully received and decoded by the relay UE based on transmitting the indication of the one or more sidelink shared channel resources.

An apparatus for wireless communication at a base station is described. The apparatus may include a processor and memory coupled to the processor, where the processor and the memory are configured to establish a communication link with a remote UE, the communication link including a sidelink communication link between the remote UE and a relay UE and a relay communication link between the relay UE and the base station. The processor and the memory may be further configured to transmit, over the relay communication link, an indication of one or more sidelink shared channel resources for a sidelink transmission from the remote UE to the relay UE. The processor and the memory may be further configured to receive an indication that the sidelink transmission was successfully received and decoded by the relay UE based on transmitting the indication of the one or more sidelink shared channel resources.

Another apparatus for wireless communication at a base station is described. The apparatus may include means for establishing a communication link with a remote UE, the communication link including a sidelink communication link between the remote UE and a relay UE and a relay communication link between the relay UE and the base station, means for transmitting, over the relay communication link, an indication of one or more sidelink shared channel resources for a sidelink transmission from the remote UE to the relay UE, and means for receiving an indication that the sidelink transmission was successfully received and decoded by the relay UE based on transmitting the indication of the one or more sidelink shared channel resources.

A non-transitory computer-readable medium storing code for wireless communication at a base station is described. The code may include instructions executable by a processor to establish a communication link with a remote UE, the communication link including a sidelink communication link between the remote UE and a relay UE and a relay communication link between the relay UE and the base station, transmit, over the relay communication link, an indication of one or more sidelink shared channel resources for a sidelink transmission from the remote UE to the relay UE, and receive an indication that the sidelink transmission was successfully received and decoded by the relay UE based on transmitting the indication of the one or more sidelink shared channel resources.

Some examples of the method, apparatuses, and non-transitory computer-readable medium described herein may further include operations, features, means, or instructions for receiving or a processor and memory configured to receive a scheduling request associated with the remote UE over the relay communication link, where transmitting the indication of the one or more sidelink shared channel resources may be based on receiving the scheduling request.

Some examples of the method, apparatuses, and non-transitory computer-readable medium described herein may further include operations, features, means, or instructions for transmitting or a processor and memory configured to transmit, over the relay communication link, an indication of one or more sidelink feedback channel resources for a second scheduling request from the remote UE to the relay UE.

Some examples of the method, apparatuses, and non-transitory computer-readable medium described herein may further include operations, features, means, or instructions for transmitting or a processor and memory configured to transmit, over the relay communication link, an indication of one or more additional sidelink feedback control channel resources for the second scheduling request from the remote UE to the relay UE.

Some examples of the method, apparatuses, and non-transitory computer-readable medium described herein may further include operations, features, means, or instructions for transmitting or a processor and memory configured to transmit a control signal over the relay communication link indicating a priority for each of a set of logical channel groups of the remote UE.

Some examples of the method, apparatuses, and non-transitory computer-readable medium described herein may further include operations, features, means, or instructions for transmitting or a memory and processor configured to transmit a control signal to the remote UE indicating a priority for each of a set of logical channel groups of the remote UE.

Some examples of the method, apparatuses, and non-transitory computer-readable medium described herein may further include operations, features, means, or instructions for transmitting or a memory and processor configured to transmit a second control signal to another UE indicating the priority of each of the set of logical channel groups of the remote UE.

In some examples of the method, apparatuses, and non-transitory computer-readable medium described herein, the sidelink transmission may include operations, features, means, or instructions for receiving or a memory and processor configured to receive the buffer status report over the relay communication link.

Some examples of the method, apparatuses, and non-transitory computer-readable medium described herein may further include operations, features, means, or instructions for receiving or a processor and memory configured to receive, over the relay communication link, an indication that the relay UE may have failed to successfully receive and decode the sidelink transmission, and transmitting or the memory and the processor configured to transmit, over the relay communication link, an indication of second one or more sidelink shared channel resources for retransmission of the sidelink transmission, where receiving the indication that the sidelink transmission was successfully received and decoded may be based on transmitting the indication of the second one or more sidelink shared channel resources.

In some examples of the method, apparatuses, and non-transitory computer-readable medium described herein, the sidelink transmission includes a buffer status report corresponding to data stored at the remote UE.

A method for wireless communication at a remote UE is described. The method may include establishing a sidelink communication link with a relay UE. The method may include determining that a criterion for transmitting a sidelink transmission is satisfied. The method may include transmitting, over the sidelink communication link, the sidelink transmission over one or more preconfigured sidelink shared channel resources based on determining that the criterion is satisfied. The method may include receiving, over the sidelink communication link, an indication that the sidelink transmission was successfully received and decoded by the relay UE.

An apparatus for wireless communication at a remote UE is described. The apparatus may include a processor and memory coupled to the processor, the processor and the memory configured to establish a sidelink communication link with a relay UE, determine that a criterion for transmitting a sidelink transmission is satisfied. The processor and the memory may be further configured to transmit, over the sidelink communication link, the sidelink transmission over one or more preconfigured sidelink shared channel resources based on determining that the criterion is satisfied. The processor and the memory may be further configured to receive, over the sidelink communication link, an indication that the sidelink transmission was successfully received and decoded by the relay UE.

Another apparatus for wireless communication at a remote UE is described. The apparatus may include means for establishing a sidelink communication link with a relay UE, means for determining that a criterion for transmitting a sidelink transmission is satisfied, means for transmitting, over the sidelink communication link, the sidelink transmission over one or more preconfigured sidelink shared channel resources based on determining that the criterion is satisfied, and means for receiving, over the sidelink communication link, an indication that the sidelink transmission was successfully received and decoded by the relay UE.

A non-transitory computer-readable medium storing code for wireless communication at a remote UE is described. The code may include instructions executable by a processor to establish a sidelink communication link with a relay UE, determine that a criterion for transmitting a sidelink transmission is satisfied, transmit, over the sidelink communication link, the sidelink transmission over one or more preconfigured sidelink shared channel resources based on determining that the criterion is satisfied, and receive, over the sidelink communication link, an indication that the sidelink transmission was successfully received and decoded by the relay UE.

Some examples of the method, apparatuses, and non-transitory computer-readable medium described herein may further include operations, features, means, or instructions for transmitting or a processor and memory configured to transmit, over the sidelink communication link, the sidelink transmission over second one or more preconfigured sidelink shared channel resources, where the second one or more preconfigured sidelink shared channel resources occur prior to the one or more preconfigured sidelink shared channel resources, operations, features, means, or instructions for receiving or the processor and the memory configured to receive, over the sidelink communication link, an indication that the relay UE failed to successfully receive and decode the sidelink transmission, and operations, features, means, or instructions for transmitting or the processor and the memory configured to the sidelink transmission over the one or more preconfigured sidelink shared channel resources based on receiving the indication that the relay UE failed to successfully receive and decode the sidelink transmission.

In some examples of the method, apparatuses, and non-transitory computer-readable medium described herein, the sidelink transmission includes a buffer status report corresponding to data stored at the remote UE.

A method for wireless communication at a relay UE is described. The method may include establishing a sidelink communication link with a remote UE, receiving, over the sidelink communication link, a sidelink transmission over one or more preconfigured sidelink shared channel resources. The method may include transmitting, over the sidelink communication link, an indication that the sidelink transmission was successfully received and decoded by the remote UE.

An apparatus for wireless communication at a relay UE is described. The apparatus may include a processor and memory coupled to the processor, the processor and the memory configured to establish a sidelink communication link with a remote UE. The processor and the memory may be further configured to receive, over the sidelink communication link, a sidelink transmission over one or more preconfigured sidelink shared channel resources. The processor and the memory may be further configured to transmit, over the sidelink communication link, an indication that the sidelink transmission was successfully received and decoded by the remote UE.

Another apparatus for wireless communication at a relay UE is described. The apparatus may include means for establishing a sidelink communication link with a remote UE, means for receiving, over the sidelink communication link, a sidelink transmission over one or more preconfigured sidelink shared channel resources, and means for transmitting, over the sidelink communication link, an indication that the sidelink transmission was successfully received and decoded by the remote UE.

A non-transitory computer-readable medium storing code for wireless communication at a relay UE is described. The code may include instructions executable by a processor to establish a sidelink communication link with a remote UE, receive, over the sidelink communication link, a sidelink transmission over one or more preconfigured sidelink shared channel resources, and transmit, over the sidelink communication link, an indication that the sidelink transmission was successfully received and decoded by the remote UE.

Some examples of the method, apparatuses, and non-transitory computer-readable medium described herein may further include operations, features, means, or instructions for determining or a processor and memory configured to determine that the relay UE may have failed to receive the sidelink transmission over second one or more preconfigured sidelink shared channel resources, where the second one or more preconfigured sidelink shared channel resources occur prior to the one or more preconfigured sidelink shared channel resources, operations, features, means, or instructions for transmitting or the memory and processor configured to transmit, over the sidelink communication link, an indication that the relay UE failed to successfully receive and decode the sidelink transmission, and operations, features, means, or instructions for receiving or the processor and the memory configured to the sidelink transmission over the one or more preconfigured sidelink shared channel resources based on transmitting the indication that the relay UE failed to successfully receive and decode the sidelink transmission.

In some examples of the method, apparatuses, and non-transitory computer-readable medium described herein, the sidelink transmission includes a buffer status report corresponding to data stored at the remote UE.

A method of wireless communication at a remote UE is described. The method may include establishing a communication link with a base station, the communication link including a sidelink communication link between the remote UE and a relay UE and a relay communication link between the relay UE and the base station. The method may include receiving, over the sidelink communication link, an indication of one or more resources configured by the base station for transmission of a scheduling request to the relay UE over the sidelink communication link. The method may include triggering a buffer status report (BSR) for transmission of data to the base station over the communication link, identifying, based on triggering the BSR, that resources on the sidelink communication link are unavailable for transmission of the BSR. The method may include transmitting, to the relay UE and over the sidelink communication link, a scheduling request using at least a portion of the one or more configured resources and based on identifying that the resources on the sidelink communication link are unavailable.

An apparatus for wireless communication at a remote UE is described. The apparatus may include a processor and memory coupled to the processor, the processor and memory configured to establish a communication link with a base station, the communication link including a sidelink communication link between the remote UE and a relay UE and a relay communication link between the relay UE and the base station. The processor and the memory may be further configured to receive, over the sidelink communication link, an indication of one or more resources configured by the base station for transmission of a scheduling request to the relay UE over the sidelink communication link. The processor and the memory may be further configured to trigger a BSR for transmission of data to the base station over the communication link, identify, based on triggering the BSR, that resources on the sidelink communication link are unavailable for transmission of the BSR. The processor and the memory may be further configured to transmit, to the relay UE and over the sidelink communication link, a scheduling request using at least a portion of the one or more configured resources and based on identifying that the resources on the sidelink communication link are unavailable.

Another apparatus for wireless communication at a remote UE is described. The apparatus may include means for establishing a communication link with a base station, the communication link including a sidelink communication link between the remote UE and a relay UE and a relay communication link between the relay UE and the base station, receiving, over the sidelink communication link, an indication of one or more resources configured by the base station for transmission of a scheduling request to the relay UE over the sidelink communication link, triggering a BSR for transmission of data to the base station over the communication link, identifying, based on triggering the BSR, that resources on the sidelink communication link are unavailable for transmission of the BSR, and transmitting, to the relay UE and over the sidelink communication link, a scheduling request using at least a portion of the one or more configured resources and based on identifying that the resources on the sidelink communication link are unavailable.

A non-transitory computer-readable medium storing code for wireless communication at a remote UE is described. The code may include instructions executable by a processor to establish a communication link with a base station, the communication link including a sidelink communication link between the remote UE and a relay UE and a relay communication link between the relay UE and the base station, receive, over the sidelink communication link, an indication of one or more resources configured by the base station for transmission of a scheduling request to the relay UE over the sidelink communication link, trigger a BSR for transmission of data to the base station over the communication link, identify, based on triggering the BSR, that resources on the sidelink communication link are unavailable for transmission of the BSR, and transmit, to the relay UE and over the sidelink communication link, a scheduling request using at least a portion of the one or more configured resources and based on identifying that the resources on the sidelink communication link are unavailable.

Some examples of the method, apparatuses, and non-transitory computer-readable medium described herein may further include operations, features, means, or instructions for receiving or a memory and processor configured to receive, over the sidelink communication link, a grant of resources for the sidelink communication link for a data transmission to the base station based on transmission of the scheduling request, and operations, features, means, or instructions for transmitting or the memory and the processor configured to transmit the data over the sidelink communication link based on reception of the grant.

In some examples of the method, apparatuses, and non-transitory computer-readable medium described herein, receiving the indication of the one or more configured resources may include operations, features, means, or instructions for receiving or the memory and processor being configured to receive, over the sidelink communication link, a configuration indicating one or more resources on a sidelink feedback channel for transmission of the scheduling request.

In some examples of the method, apparatuses, and non-transitory computer-readable medium described herein, receiving the indication of the one or more configured resources may include operations, features, means, or instructions for receiving or the memory and processor being configured to receive, over the sidelink communication link, a configuration of the one or more resources that includes a bitmap indicating one or more resource blocks including the one or more resources for transmission of the scheduling request.

In some examples of the method, apparatuses, and non-transitory computer-readable medium described herein, receiving the indication of the one or more configured resources further may include operations, features, means, or instructions for receiving or the memory and the processor being configured to receive, within the configuration, a cyclic shift for the one or more resource blocks including the one or more resources.

Some examples of the method, apparatuses, and non-transitory computer-readable medium described herein may further include operations, features, means, or instructions for receiving or the memory and processor being configured to receive, over the sidelink communication link, a second indication of one or more second resources configured by the base station for transmission of a scheduling request to the relay UE over the sidelink communication link.

In some examples of the method, apparatuses, and non-transitory computer-readable medium described herein, the one or more configured resources may be associated with a first quality of service (QoS) for first communications on the communication link and the one or more second resources may be associated with a second QoS for second communications on the communication link.

In some examples of the method, apparatuses, and non-transitory computer-readable medium described herein, the one or more configured resources may be associated with a first set of logical channels (LCHs) and the one or more second resources may be associated with a second set of LCHs, the first set of LCHs associated with a first range of LCH priorities and the second set of LCHs associated with a second range of LCH priorities.

Some examples of the method, apparatuses, and non-transitory computer-readable medium described herein may further include operations, features, means, or instructions for selecting or a processor and memory being configured to select the one or more configured resources for transmission of the scheduling request based on an LCH priority (LCP) of the scheduling request and the first range of LCPs.

In some examples of the method, apparatuses, and non-transitory computer-readable medium described herein, the one or more configured resources may be associated with a first timer for prohibiting transmission of a scheduling request and the one or more second resources may be associated with a second timer for prohibiting transmission of a scheduling request.

Some examples of the method, apparatuses, and non-transitory computer-readable medium described herein may further include operations, features, means, or instructions for initiating or a processor and memory being configured to initiate a counter based on transmission of the scheduling request.

Some examples of the method, apparatuses, and non-transitory computer-readable medium described herein may further include operations, features, means, or instructions for transmitting or a processor and memory being configured to transmit, over the sidelink communication link, the BSR based on transmission of the scheduling request, and operations, features, means, or instructions for resetting or the processor and the memory being configured to reset the counter to an initial value based on transmission of the BSR.

Some examples of the method, apparatuses, and non-transitory computer-readable medium described herein may further include operations, features, means, or instructions for transmitting or a processor and memory configured to transmit, over the sidelink communication link, a second scheduling request based on the triggered BSR, and incrementing or the processor and memory being configured to increment the counter based on transmission of the second scheduling request.

Some examples of the method, apparatuses, and non-transitory computer-readable medium described herein may further include operations, features, means, or instructions for determining or a processor and memory being configured to determine that the counter may have reached a threshold value based on initiating the counter, operations, features, means, or instructions for releasing or the processing and the memory being configured to release the one or more configured resources based on the counter reaching the threshold value, and transmitting or the processor and the memory being configured to transmit, based on releasing the one or more configured resources, a notification over the sidelink communication link that includes an indication that the remote UE may have released the one or more configured resources.

In some examples of the method, apparatuses, and non-transitory computer-readable medium described herein, the scheduling request includes a set of bits and the set of bits includes an indication of a priority associated with the scheduling request.

A method of wireless communication at a relay UE is described. The method may include establishing a communication link with a base station and a remote UE, the communication link including a sidelink communication link between the remote UE and the relay UE and a relay communication link between the relay UE and the base station. The method may include receiving, over the relay communication link, an indication of one or more resources configured by the base station for transmission of a scheduling request from the remote UE to the relay UE over the sidelink communication link. The method may include transmitting, over the sidelink communication link, the indication of the one or more configured resources, receiving, over the sidelink communication link, a scheduling request using at least a portion of the one or more configured resources, the scheduling request indicating that resources on the sidelink communication link are unavailable for transmission of a BSR. The method may include transmitting the scheduling request over the relay communication link based on the indication that resources on the sidelink communication link are unavailable and on reception of the scheduling request over the sidelink communication link.

An apparatus for wireless communication at a relay UE is described. The processor and the memory may be configured to establish a communication link with a base station and a remote UE, the communication link including a sidelink communication link between the remote UE and the relay UE and a relay communication link between the relay UE and the base station. The processor and the memory may be configured to receive, over the relay communication link, an indication of one or more resources configured by the base station for transmission of a scheduling request from the remote UE to the relay UE over the sidelink communication link, transmit, over the sidelink communication link, the indication of the one or more configured resources, receive, over the sidelink communication link, a scheduling request using at least a portion of the one or more configured resources, the scheduling request indicating that resources on the sidelink communication link are unavailable for transmission of a BSR. The processor and the memory may be further configured to transmit the scheduling request over the relay communication link based on the indication that resources on the sidelink communication link are unavailable and on reception of the scheduling request over the sidelink communication link.

Another apparatus for wireless communication at a relay UE is described. The apparatus may include means for establishing a communication link with a base station and a remote UE, the communication link including a sidelink communication link between the remote UE and the relay UE and a relay communication link between the relay UE and the base station, receiving, over the relay communication link, an indication of one or more resources configured by the base station for transmission of a scheduling request from the remote UE to the relay UE over the sidelink communication link, transmitting, over the sidelink communication link, the indication of the one or more configured resources, receiving, over the sidelink communication link, a scheduling request using at least a portion of the one or more configured resources, the scheduling request indicating that resources on the sidelink communication link are unavailable for transmission of a BSR, and transmitting the scheduling request over the relay communication link based on the indication that resources on the sidelink communication link are unavailable and on reception of the scheduling request over the sidelink communication link.

A non-transitory computer-readable medium storing code for wireless communication at a relay UE is described. The code may include instructions executable by a processor to establish a communication link with a base station and a remote UE, the communication link including a sidelink communication link between the remote UE and the relay UE and a relay communication link between the relay UE and the base station, receive, over the relay communication link, an indication of one or more resources configured by the base station for transmission of a scheduling request from the remote UE to the relay UE over the sidelink communication link, transmit, over the sidelink communication link, the indication of the one or more configured resources, receive, over the sidelink communication link, a scheduling request using at least a portion of the one or more configured resources, the scheduling request indicating that resources on the sidelink communication link are unavailable for transmission of a BSR, and transmit the scheduling request over the relay communication link based on the indication that resources on the sidelink communication link are unavailable and on reception of the scheduling request over the sidelink communication link.

Some examples of the method, apparatuses, and non-transitory computer-readable medium described herein may further include operations, features, means, or instructions for receiving or a processor and memory configured to receive, over the relay communication link, a grant of resources for the sidelink communication link for a data transmission from the remote UE to the base station based on transmission of the scheduling request, transmitting, over the sidelink communication link, the grant of resources, operations, features, means, or instructions for receiving or the processor and the memory being further configured to receive a data transmission over the sidelink communication link based on transmission of the grant, and operations, features, means, or instructions for transmitting or the memory and the processor being further configured to transmit the data transmission over the relay communication link based on reception of the data transmission.

In some examples of the method, apparatuses, and non-transitory computer-readable medium described herein, receiving the indication of the one or more configured resources may include operations, features, means, or instructions for receiving or a processor and memory being configured to receive, over the relay communication link, a configuration indicating one or more resources on a sidelink feedback channel for transmission of the scheduling request.

In some examples of the method, apparatuses, and non-transitory computer-readable medium described herein, receiving the indication of the one or more configured resources may include operations, features, means, or instructions for receiving or a processor and memory being configured to receive, over the relay communication link, a configuration of the one or more resources that includes a bitmap indicating one or more resource blocks including the one or more resources for the scheduling request.

In some examples of the method, apparatuses, and non-transitory computer-readable medium described herein, receiving the indication of the one or more configured resources further may include operations, features, means, or instructions for receiving or a processor and memory configured to receive, within the configuration, a cyclic shift for the one or more resource blocks including the one or more resources.

Some examples of the method, apparatuses, and non-transitory computer-readable medium described herein may further include operations, features, means, or instructions for receiving or a processor and memory configured to receive, over the relay communication link, a second indication of one or more second resources configured by the base station for transmission of a scheduling request from the remote UE to the relay UE over the sidelink communication link, and operations, features, means, or instructions for transmitting or a processor and memory configured to transmit, over the sidelink communication link, the second indication of the one or more second resources.

In some examples of the method, apparatuses, and non-transitory computer-readable medium described herein, the one or more configured resources may be associated with a first QoS for first communications on the communication link and the one or more second resources may be associated with a second QoS for second communications on the communication link.

In some examples of the method, apparatuses, and non-transitory computer-readable medium described herein, the one or more configured resources may be associated with a first set of LCHs and the one or more second resources may be associated with a second set of LCHs, the first set of LCHs associated with a first range of LCPs and the second set of LCHs associated with a second range of LCPs.

Some examples of the method, apparatuses, and non-transitory computer-readable medium described herein may further include operations, features, means, or instructions for identifying or a processor and memory configured to identify a priority of the received scheduling request based on the first range of LCPs and receiving the scheduling request on the at least a portion of the one or more configured resources, and operations, features, means, or instructions for configuring or a processor and memory configured to configure a LCH for transmission of the scheduling request based on the identified priority.

In some examples of the method, apparatuses, and non-transitory computer-readable medium described herein, the one or more configured resources may be associated with a first timer for prohibiting transmission of a scheduling request and the one or more second resources may be associated with a second timer for prohibiting transmission of a scheduling request.

Some examples of the method, apparatuses, and non-transitory computer-readable medium described herein may further include operations, features, means, or instructions for receiving or a processor and memory configured to receive a notification over the sidelink communication link that includes an indication that the remote UE may have released the one or more configured resources, and operations, features, means, or instructions for transmitting or a processor and memory configured to transmit, the notification over the relay communication link based on receiving the notification.

In some examples of the method, apparatuses, and non-transitory computer-readable medium described herein, the scheduling request includes a set of bits and the set of bits includes an indication of a priority associated with the scheduling request.

A method of wireless communication at a base station is described. The method may include establishing a communication link with a remote UE, the communication link including a sidelink communication link between the remote UE and a relay UE and a relay communication link between the relay UE and the base station. The method may include configuring, based on establishing the communication link, one or resources for transmission of a scheduling request from the remote UE to the relay UE over the sidelink communication link, transmitting, over the relay communication link, an indication of the one or more configured resources. The method may include receiving, over the relay communication link, a scheduling request for the remote UE based on transmitting the indication of the one or more configured resources. The method may include determining, based on reception of the scheduling request, that resources on the sidelink communication link are unavailable for transmission of a BSR.

An apparatus for wireless communication at a base station is described. The apparatus may include a processor and memory coupled to the processor, the processor and the memory configured to establish a communication link with a remote UE, the communication link including a sidelink communication link between the remote UE and a relay UE and a relay communication link between the relay UE and the base station, configure, based on establishing the communication link, one or resources for transmission of a scheduling request from the remote UE to the relay UE over the sidelink communication link. The processor and the memory may be further configured to transmit, over the relay communication link, an indication of the one or more configured resources. The processor and the memory may be further configured to receive, over the relay communication link, a scheduling request for the remote UE based on transmitting the indication of the one or more configured resources. The processor and the memory may be further configured to determine, based on reception of the scheduling request, that resources on the sidelink communication link are unavailable for transmission of a BSR.

Another apparatus for wireless communication at a base station is described. The apparatus may include means for establishing a communication link with a remote UE, the communication link including a sidelink communication link between the remote UE and a relay UE and a relay communication link between the relay UE and the base station, configuring, based on establishing the communication link, one or resources for transmission of a scheduling request from the remote UE to the relay UE over the sidelink communication link, transmitting, over the relay communication link, an indication of the one or more configured resources, receiving, over the relay communication link, a scheduling request for the remote UE based on transmitting the indication of the one or more configured resources, and determining, based on reception of the scheduling request, that resources on the sidelink communication link are unavailable for transmission of a BSR.

A non-transitory computer-readable medium storing code for wireless communication at a base station is described. The code may include instructions executable by a processor to establish a communication link with a remote UE, the communication link including a sidelink communication link between the remote UE and a relay UE and a relay communication link between the relay UE and the base station, configure, based on establishing the communication link, one or resources for transmission of a scheduling request from the remote UE to the relay UE over the sidelink communication link, transmit, over the relay communication link, an indication of the one or more configured resources, receive, over the relay communication link, a scheduling request for the remote UE based on transmitting the indication of the one or more configured resources, and determine, based on reception of the scheduling request, that resources on the sidelink communication link are unavailable for transmission of a BSR.

Some examples of the method, apparatuses, and non-transitory computer-readable medium described herein may further include operations, features, means, or instructions for transmitting or a processor and memory configured to transmit, over the relay communication link, a grant of resources for the sidelink communication link for a data transmission from the remote UE to the base station based on the determination that resources on the sidelink communication link may be unavailable, and operations, features, means, or instructions for receiving or the processor and the memory being configured to receive the data transmission over the relay communication link based on transmission of the grant.

In some examples of the method, apparatuses, and non-transitory computer-readable medium described herein, configuring the one or more resources may include operations, features, means, or instructions for configuring or a processor and memory being configured to configure the one or more resources on a sidelink feedback channel for transmission of the scheduling request.

In some examples of the method, apparatuses, and non-transitory computer-readable medium described herein, transmitting the indication of the one or more configured resources may include operations, features, means, or instructions for transmitting or a processor and memory being configured to transmit, over the relay communication link, a configuration of the one or more resources that includes a bitmap indicating one or more resource blocks including the one or more resources for the scheduling request.

In some examples of the method, apparatuses, and non-transitory computer-readable medium described herein, transmitting the indication of the one or more configured resources further may include operations, features, means, or instructions for transmitting or a processor and memory being configured to transmit, within the configuration, a cyclic shift for the one or more resource blocks including the one or more resources.

Some examples of the method, apparatuses, and non-transitory computer-readable medium described herein may further include operations, features, means, or instructions for transmitting or a processor and memory being configured to transmit, over the relay communication link, a second indication of one or more second resources configured by the base station for transmission of a scheduling request from the remote UE to the relay UE over the sidelink communication link.

In some examples of the method, apparatuses, and non-transitory computer-readable medium described herein, the one or more configured resources may be associated with a first QoS for first communications on the communication link and the one or more second resources may be associated with a second QoS for second communications on the communication link.

In some examples of the method, apparatuses, and non-transitory computer-readable medium described herein, the one or more configured resources may be associated with a first set of LCHs and the one or more second resources may be associated with a second set of LCHs, the first set of LCHs associated with a first range of LCPs and the second set of LCHs associated with a second range of LCPs.

Some examples of the method, apparatuses, and non-transitory computer-readable medium described herein may further include operations, features, means, or instructions for identifying or a processor and memory being configured to identify a priority of the received scheduling request based on a LCH associated with the received scheduling request.

In some examples of the method, apparatuses, and non-transitory computer-readable medium described herein, the one or more configured resources may be associated with a first timer for prohibiting transmission of a scheduling request and the one or more second resources may be associated with a second timer for prohibiting transmission of a scheduling request.

Some examples of the method, apparatuses, and non-transitory computer-readable medium described herein may further include operations, features, means, or instructions for receiving or a processor and memory configured to receive a notification over the relay communication link that includes an indication that the remote UE may have released the one or more configured resources.

In some examples of the method, apparatuses, and non-transitory computer-readable medium described herein, the scheduling request includes a set of bits and the set of bits includes an indication of a priority associated with the scheduling request.

DETAILED DESCRIPTION

Figure 1:
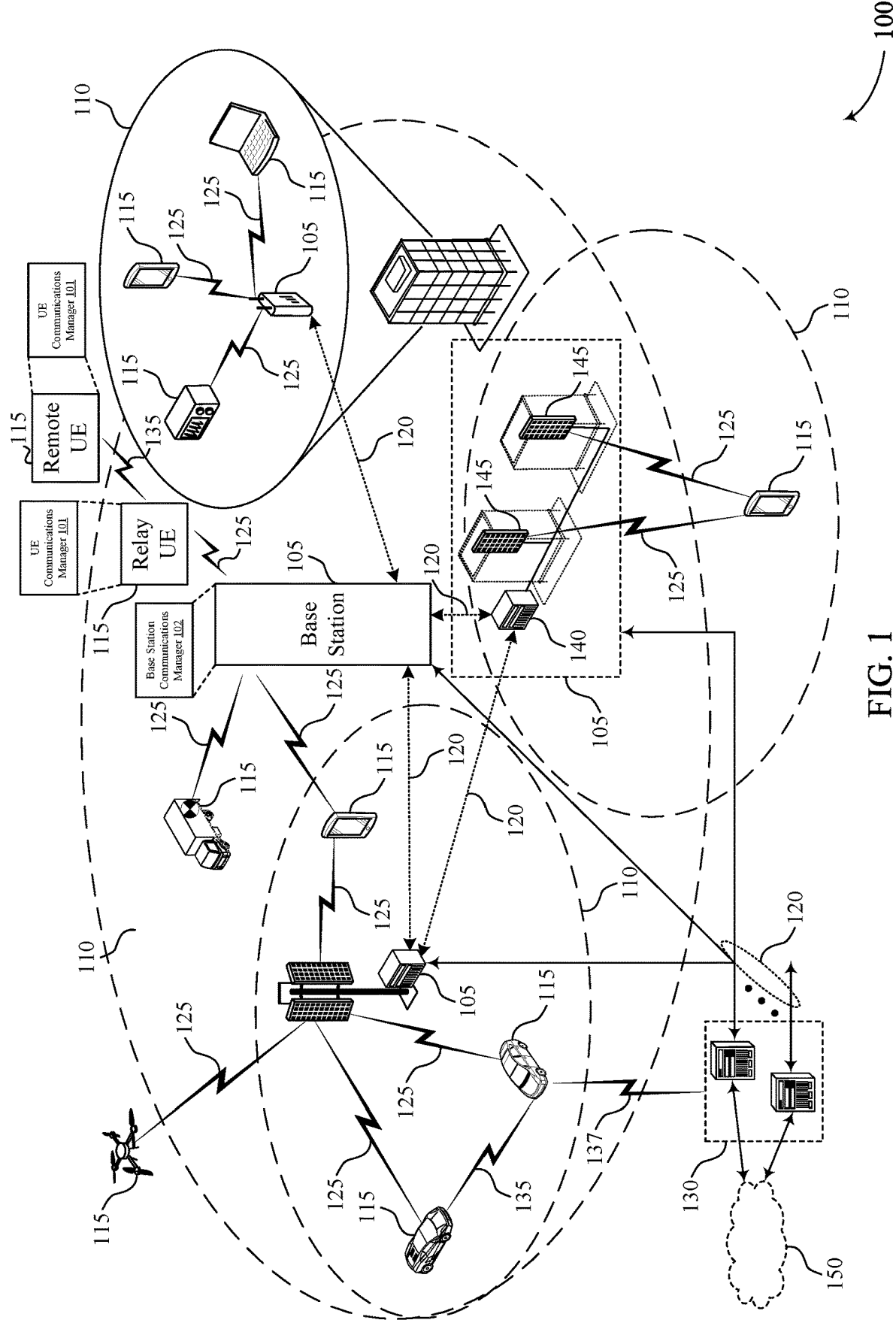
FIG. 1 illustrates an example of a wireless communications system that supports scheduling sidelink transmission with relay in accordance with one or more aspects of the present disclosure.

The described techniques relate to improved methods, systems, devices, and apparatuses that support scheduling sidelink transmission with relay. A remote user equipment (UE) may establish a communication link with a base station via a relay UE. For instance, the relay UE may establish a first communication link (e.g., a sidelink communication link) with the remote UE and may establish a second communication link (e.g., a relay communication link) with the base station. Establishing the communication link may enable the base station to schedule communications between the remote UE and the relay UE.

Techniques that may enable a base station to indicate resources to the remote UE via the relay UE (e.g., sidelink scheduling) may be described herein. For instance, the base station may provide, to the relay UE, an indication of one or more resources configured for transmitting a buffer status report (BSR) from the remote UE to the relay UE. The relay UE may forward this indication to the remote UE. The remote UE, after receiving the indication, may transmit the BSR over the one or more resources configured by the base station. The indication may be included in a dynamic sidelink grant or a sidelink grant that preconfigures resources.

Additionally or alternatively, a base station may, in some cases, communicate with the remote UE over an indirect communication link. For example, the remote UE and the base station may communicate via the first communication link between the remote UE and the relay UE and the second communication link (e.g., direct link) between the relay UE and the base station. In the uplink, the remote UE may transmit information (e.g., one or more messages) to the relay UE over the first communication link, and the relay UE may relay or forward (e.g., transmit) the information to the base station over the second communication link. In the downlink, the base station may transmit information to the relay UE over the second communication link and the relay UE may relay or forward (e.g., transmit) the information to the remote UE over the first communication link.

For uplink transmissions from the remote UE to the base station over the indirect communication link, the base station may, in some cases, dynamically schedule uplink resources on the first communication link between the remote and relay UEs. Data for uplink transmissions may arrive at a buffer of the remote UE, which may trigger a BSR if the buffer is empty when the data arrives or if the priority of the data is higher than that of other data on any other logical channels. In cases where uplink transmissions on the second communication link or the first communication link are dynamically scheduled by the base station, the BSR may represent or include a request for sidelink or other resources from the base station for transmission of the data.

If resources (e.g., sidelink resources) are unavailable for transmission of the BSR, the BSR may remain pending at the remote UE and may trigger transmission of a scheduling request to the base station (e.g., via the relay UE). Methods or resource configurations for transmission of a scheduling request over a first communication link, such as the first communication link between the relay and remote UE s, may support transmission of the BSR and may further support communications between the remote UE and the base station. After or as part of establishing the communication link between the remote UE, the relay UE, and the base station, the base station may configure resources on the first communication link for transmission of one or more scheduling requests. For example, the base station may configure the resources on a feedback channel (e.g., a sidelink feedback channel) or may configure the resources on any location in a time and frequency domain.

In some cases, the base station may configure multiple sets of resources, where each set of resources may be associated with a QoS or a logical channel priority (LCP), or ranges thereof. Thus, the relay UE may implicitly determine a QoS or an LCP associated with a received scheduling request based on a set of resources used for transmission of the scheduling request. In some cases, if the scheduling request includes multiple bits, a field of the scheduling request may indicate a QoS or LCP for the scheduling request.

The base station may transmit an indication of the configured resources to the relay UE (e.g., over the second communication link), and the relay UE may transmit (e.g., forward or relay) an indication of the configured resources to the remote UE (e.g., over the first communication link). The remote UE may identify uplink data for transmission to the base station, and may trigger a BSR based on the uplink data. The remote UE may identify that resources on the first communication link are unavailable for transmission of the BSR, and may transmit a scheduling request based on the unavailability of the resources. For example, the remote UE may transmit the scheduling request to the relay UE over the first communication link, using one or more of the configured resources (e.g., a portion of the configured resources) configured via the indication. The relay UE may receive the scheduling request and may transmit (e.g., forward or relay) a scheduling request to the base station requesting resources (e.g., sidelink resources) for transmission of the BSR from the remote UE to the relay UE. In some cases, the remote UE may maintain a counter that is incremented for each transmission of a scheduling request for the BSR, where the remote UE may release resources (e.g., sidelink resources) if the counter reaches a threshold value.

In some cases, the base station may successfully receive a scheduling request from the remote UE (e.g., via the second communication link with the relay UE) and may assign or grant one or more resources on the first communication link for transmission of the BSR from the remote UE to the relay UE. The remote UE may transmit the BSR to the relay UE using the one or more assigned resources and the relay UE may transmit the BSR (e.g., forward or relay the BSR) to the base station. Based on the BSR, the base station may assign or grant one or more resources (e.g., sidelink resources) and/or relay resources for transmission of the uplink data from the remote UE to the relay UE, and then from the relay UE to the base station. The remote UE may receive the grant of resources and may transmit the uplink data accordingly.

Aspects of the disclosure are initially described in the context of wireless communications systems. Additional aspects of the disclosure are described in the context of an additional wireless communications system, sidelink scheduling procedures, a sidelink resource configuration, and process flows. Aspects of the disclosure are further illustrated by and described with reference to apparatus diagrams, system diagrams, and flowcharts that relate to scheduling sidelink transmission with relay.

FIG. 1 illustrates an example of a wireless communications system 100 that supports scheduling sidelink transmission with relay in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through communication link 137.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some cases in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a relay UE 115 may be used to enable communications between a remote UE 115 and a base station 105. Data may be communicated between the remote UE 115 and the relay UE 115 by sidelink communication. In some cases, multiple remote UEs 115 may be supported by the same relay UE 115. An example of a relay UE 115 may be described in further detail with regards to FIG. 2.

In some cases, the relay UE 115 may use device to device (D2D) communications. A first mode of D2D that the relay UE 115 may use may involve a base station 105 allocating resources (e.g., dynamic or configured resources) for sidelink transmissions between the relay UE 115 and a remote UE 115. A second mode of D2D that the relay UE 115 may use may involve the relay UE 115 autonomously selecting sidelink resources for communication (e.g., the base station 105 may not be involved). The methods as described herein may be used when the first mode of D2D is being used.

When UE communications manager 101 is included in a remote UE 115, the UE communications manager 101 may establish a communication link with a base station 105, where the communication link includes a sidelink communication link between the remote UE 115 and the relay UE 115 and a relay communication link between the relay UE 115 and the base station 105. The UE communications manager may transmit, over the sidelink communication link, an SR. The UE communications manager 101 may receive, over the sidelink communication link and based on transmitting the SR, an indication of one or more sidelink shared channel resources configured by the base station 105 for a sidelink transmission (e.g., a BSR corresponding to data stored at the remote UE 115). The UE communications manager 101 may transmit, over the sidelink communication link, the sidelink transmission over at least a portion of the one or more sidelink shared channel resources.

When UE communications manager 101 is included in a relay UE 115, the UE communications manager 101 may establish a communication link between a remote UE 115 and a base station 105, where the communication link includes a sidelink communication link between the remote UE 115 and the relay UE 115 and a relay communication link between the relay UE 115 and the base station 105. The UE communications manager 101 may receive, over the sidelink communication link, an SR. The UE communications manager 101 may transmit, over the sidelink communication link and based on receiving the SR, an indication of one or more sidelink shared channel resources configured by the base station 105 for a sidelink transmission (e.g., a BSR corresponding to data stored at the remote UE 115). The UE communications manager 101 may receive, over the sidelink communication link, the sidelink transmission over the one or more sidelink shared channel resources. The UE communications manager 101 may transmit, over the relay communication link, an indication that the BSR was successfully received and decoded by the relay UE 115.

Base station communications manager 102, which may be included in a base station 105, may establish a communication link with a remote UE 115, the communication link including a sidelink communication link between the remote UE 115 and a relay UE 115 and a relay communication link between the relay UE 115 and the base station 105. Base station communications manager 102 may transmit, over the relay communication link, an indication of one or more sidelink shared channel resources for a sidelink transmission from the remote UE 115 to the relay UE 115. Base station communications manager 102 may receive, over the relay communication link, an indication that the sidelink transmission was successfully received and decoded by the relay UE 115 based on transmitting the indication of the one or more sidelink shared channel resources.

In some wireless communications systems, a base station 105 may communicate with a remote UE 115 over an indirect communication link. For example, the remote UE 115 and the base station 105 may communicate via a sidelink link (e.g., a PC5 interface) between the remote UE 115 and a relay UE 115 and a relay link (e.g., direct link) between the relay UE 115 and the base station 105. In the uplink, the remote UE 115 may transmit information (e.g., one or more messages) to the relay UE 115 over the sidelink link, and the relay UE 115 may relay or forward (e.g., transmit) the information to the base station 105 over the relay link. In the downlink, the base station 105 may transmit information to the relay UE 115 over the relay link and the relay UE 115 may relay or forward (e.g., transmit) the information to the remote UE 115 over the sidelink link.

In some cases, a relay UE 115 may support similar communication links with multiple remote UEs 115 for communications with a base station 105. A communication link between a remote UE 115, a relay UE 115, and a base station may represent a Layer 2 relay (e.g., a UE-to-network relay). The remote UE 115 may discover the relay UE prior to establishment of the communication link, for example, using a discover procedure based on one or more relay service codes that may be configured by the network or provisioned by a policy control function (PCF) to the remote UE 115 during registration with the base station 105 (e.g., when establishing a Uu link). A remote UE 115 may discover the relay UE 115 by monitoring for the one or more corresponding relay service codes. During link establishment, the relay UE 115 may establish a dedicated protocol data unit (PDU) session associated with the one or more relay service codes.

In some cases, the network may maintain a convergence protocol over the communication link between the base station 105, the relay UE 115, and the remote UE 115, and may restrict convergence protocol between the relay UE 115 and the remote UE 115. Network access stratum and non-access stratum connections may also be maintained over the communication link. In some case, a radio access network (RAN) may control the sidelink link (e.g., PC5 interface) using network radio resource control (RRC) signaling.

In some cases, uplink transmissions on the relay link or the sidelink may be dynamically scheduled by the base station 105, where the dynamically scheduled uplink transmissions may support HARQ or other feedback. Uplink transmissions may include an uplink BSR, which may represent or include a request sidelink or other resources from the base station 105 for transmission of data (e.g., uplink data) from the remote UE 115. If sidelink resources are unavailable for transmission of the BSR, the BSR may remain pending at the remote UE 115 and may trigger transmission of a scheduling request to the base station 105 (e.g., via the relay UE 115). Methods or resource configurations for transmission of a scheduling request over a sidelink link, such as the sidelink link between the relay and remote UEs 115, may support transmission of the BSR and may further support communications between the remote UE 115 and the base station 105.

For example, after or as part of establishing the communication link between the remote UE 115, the relay UE 115, and the base station 105, the base station 105 may configure resources on the sidelink link for transmission of one or more scheduling requests. The base station 105 may transmit an indication of the configured resources to the relay UE 115 (e.g., over the relay link), and the relay UE 115 may transmit (e.g., forward or relay) an indication of the configured resources to the remote UE 115 (e.g., over the sidelink link).

The remote UE 115 may identify uplink data for transmission to the base station 105, and may trigger a BSR based on the uplink data. The remote UE 115 may identify that resources on the sidelink link are unavailable for transmission of the BSR, and may transmit a scheduling request based on the unavailability of the resources. For example, the remote UE 115 may transmit the scheduling request to the relay UE 115 over the sidelink link, using one or more of the configured resources (e.g., a portion of the configured resources) configured via the indication. The relay UE 115 may receive the scheduling request and may transmit (e.g., forward or relay) a scheduling request to the base station 105 requesting sidelink resources for transmission of the BSR from the remote UE 115 to the relay UE 115. In some cases, the base station 105 may successfully receive the scheduling request from the remote UE 115 (e.g., via the relay link with the relay UE 115) and may assign or grant one or more resources on the sidelink link for transmission of the BSR from the remote UE 115 to the relay UE 115.

One or more of the operations performed by the base station 105 may be performed by a base station communications manager 102, which may be an example of a communications manager 2815, 2915, 3005, or 3110 as described with reference to FIGS. 28 through 31. In some cases, a transceiver may perform receiving or transmitting operations and a scheduler may determine a resource configuration.

One or more of the operations performed by the remote UE 115 or the relay UE 115 may be performed by a UE communications manager 101, which may be an example of a communications manager 2415, 2515, 2605, or 2710 as described with reference to FIGS. 24 through 27. In some cases, a transceiver may perform the receiving or transmitting operations and a processor may trigger a BSR and determine to transmit a scheduling request based on an unavailability of resources for the BSR.

Figure 2:
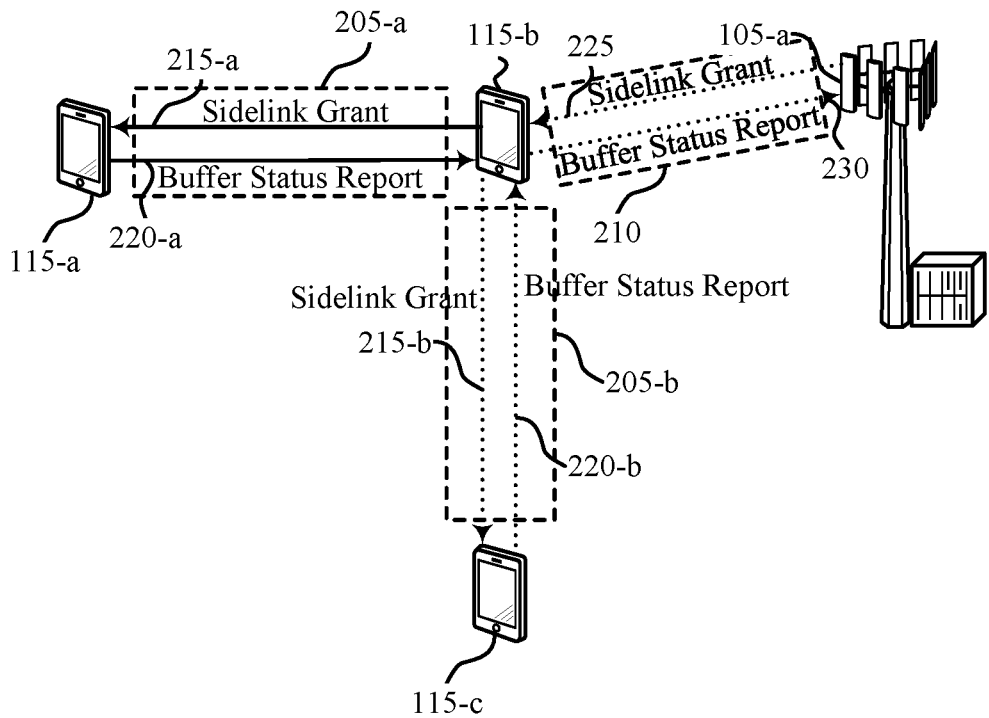
FIG. 2 illustrates an example of a wireless communications system that supports scheduling sidelink transmission with relay in accordance with one or more aspects of the present disclosure.

FIG. 2 illustrates an example of a wireless communications system 200 that supports scheduling sidelink transmission with relay in accordance with one or more aspects of the present disclosure. In some examples, wireless communications system 200 may implement aspects of wireless communications system 100. For instance, base station 105-a may be an example of a base station 105 as described with reference to FIG. 1 and UEs 115-a and 115-b may be examples of UEs 115 as described with reference to FIG. 1. UE 115-a may be an example of a remote UE 115 and UE 115-b may be an example of a relay UE 115. Relay UE 115-b may establish a sidelink communication link 205-a with remote UE 115-a; a sidelink communication link 205-b with UE 115-c; and a relay communication link 210 with base station 105-a. Although a relay UE 115-b is described herein, there may be examples where another device (e.g., a relay node or a relay base station 105) performs the functions of relay UE 115-b.

In some cases, the relay UE 115-b may transmit a sidelink grant 215-a to remote UE 115-a over the sidelink communication link 205-a. Similarly, relay UE 115-b may transmit a sidelink grant 215-b to remote UE 115-c over sidelink communication link 205-b. A sidelink grant 215 may indicate one or more resources configured for transmission of a BSR 220. Remote UE 115-a may transmit BSR 220-a to the relay UE 115-b over the one or more resources configured by sidelink grant 215-a and UE 115-c may transmit BSR 220-b over the one or more resources configured by sidelink grant 215-b. Each BSR may indicate a buffer size of one or more buffers at the corresponding remote UE 115 (e.g., UE 115-a for BSR 220-a and UE 115-b for BSR 220-b), where each buffer may correspond to a different logical channel group (LCG). In some cases, BSR 220 may be included within a MAC CE. In some cases, relay UE 115-b may generate a BSR 230 using one or more received BSRs 220 (e.g., BSRs 220-a and/or 220-b) and may transmit the BSR 230 to base station 105-a.

Remote UEs 115-a and 115-c may trigger a BSR 220 if one or more conditions are met. For instance, remote UE 115-a may trigger BSR 220-a if new data arrives at UE 115-a and the buffer for the new data at UE 115-a is empty. Additionally or alternatively, remote UE 115-a may trigger BSR 220-a if new data arrives at UE 115-a and the priority of the new data is higher than that for any non-empty logical channel (LCH) at remote UE 115-a. UE 115-c may trigger BSR 220-b according to the similar conditions. The BSR 220 transmitted from a remote UE 115 may be referred to as a PC5-sidelink BSR.

Once the BSR is triggered, the remote UE 115 performing the triggering may proceed in one or more ways. In some examples, the PC5-sidelink BSR may trigger a scheduling request (SR) if a sidelink resource is not available and may remain pending until the SR is sent. If a sidelink resource is available, the remote UE 115 may transmit the PC5-sidelink BSR without triggering a SR. More details about the remote UE 115 transmitting SRs may be described with reference to FIG. 3. In other examples, the remote UE 115 may have preconfigured physical sidelink shared channel (PSSCH) resources over which the remote UE 115 may transmit the BSR 220. When a BSR 220 is triggered, as described herein, the remote UE 115 may transmit the BSR over the next available preconfigured sidelink resource (e.g., the next available preconfigured PSSCH resource). More details about the remote UE 115 transmitting BSRs 220 over preconfigured resources may be described with reference to FIG. 4.

In some cases, relay UE 115-b may receive a sidelink grant 225 from base station 105-a indicating one or more resources configured for transmitting a BSR 220 from a remote UE 115 to relay UE 115-b, where the sidelink grant 225 may be directed to the remote UE 115. Relay UE 115-b, if sidelink grant 225 is directed to remote UE 115-a, may indicate the one or more resources of sidelink grant 225 in sidelink grant 215-a. Additionally or alternatively, if sidelink grant 225 is directed to remote UE 115-c, relay UE 115-b may indicate the one or more resources of sidelink grant 225 in sidelink grant 215-b. In some cases, relay UE 115-b may transmit an SR to base station 105-*b* (e.g., after receiving an SR from a remote UE 115), which may trigger base station 105-*a* to transmit the sidelink grant 225.

In some cases, the MAC CE of the BSR 220 may include the priority of LCGs reported in the BSR. The network may configure different sets of LCGs at different UEs 115 and an LCH in an LCG may be configured with a different priority at a first UE 115 (e.g., UE 115-*a*) versus a second UE 115 (e.g., relay UE 115-*b*). Without priority information, the relay UE 115-*b* may fail to determine the highest priority of a received BSR 220. As such, the relay UE 115-*b*, after receiving an SR from a remote UE 115, may fail to determine which SR configuration to use to transmit an SR to base station 105-*a*. Transmitting the SR according to the SR configuration may indicate, to base station 105-*a*, which UE 115 is requesting to transmit a BSR 220, which may enable base station 105-*a* to address a sidelink grant to the remote UE 115. As such, enabling relay UE 115-*b* to identify the priority of LCGs at a remote UE 115 may enable base station 105-*a* to address sidelink grants to the remote UE 115.

Alternatively, the network may configure the same set of LCGs and the same priority assignment for LCGs for relay UE 115-*b* and the remote UEs 115 communicating with relay UE 115-*b* (e.g., remote UEs 115-*a* and 115-*c*). In such cases, the BSR 220 may not include the priority of LCGs reported in the BSR. The process of configuring the remote UEs 115 to have the same set of LCGs and the same priority assignment for LCGs may be done in one or more ways. In one example, base station 105-*a*, during a relay establishment procedure, may transmit control signaling (e.g., Uu radio resource control (RRC) signaling) indicating the configuration to relay UE 115-*b*, which may in turn be transmit the configuration to remote UEs 115-*a* and 115-*c* via control signaling (e.g., PC5 RRC). In another example, base station 105-*a* may directly send an RRC message to the remote UEs 115 (e.g., remote UEs 115-*a* and 115-*c*) through a tunnel.

In one or more aspects, the described techniques may support improvements in wireless communications. For instance, by scheduling transmissions via relay UE 115-*b*, base station 105-*a* may schedule transmissions for remote UEs 115 (e.g., 115-*a* and 115-*c*) that are outside of a coverage area 110 of base station 105-*a*. Additionally, the techniques as described herein may enable base station 105-*a* to receive BSRs for remote UEs 115.

Figure 3:
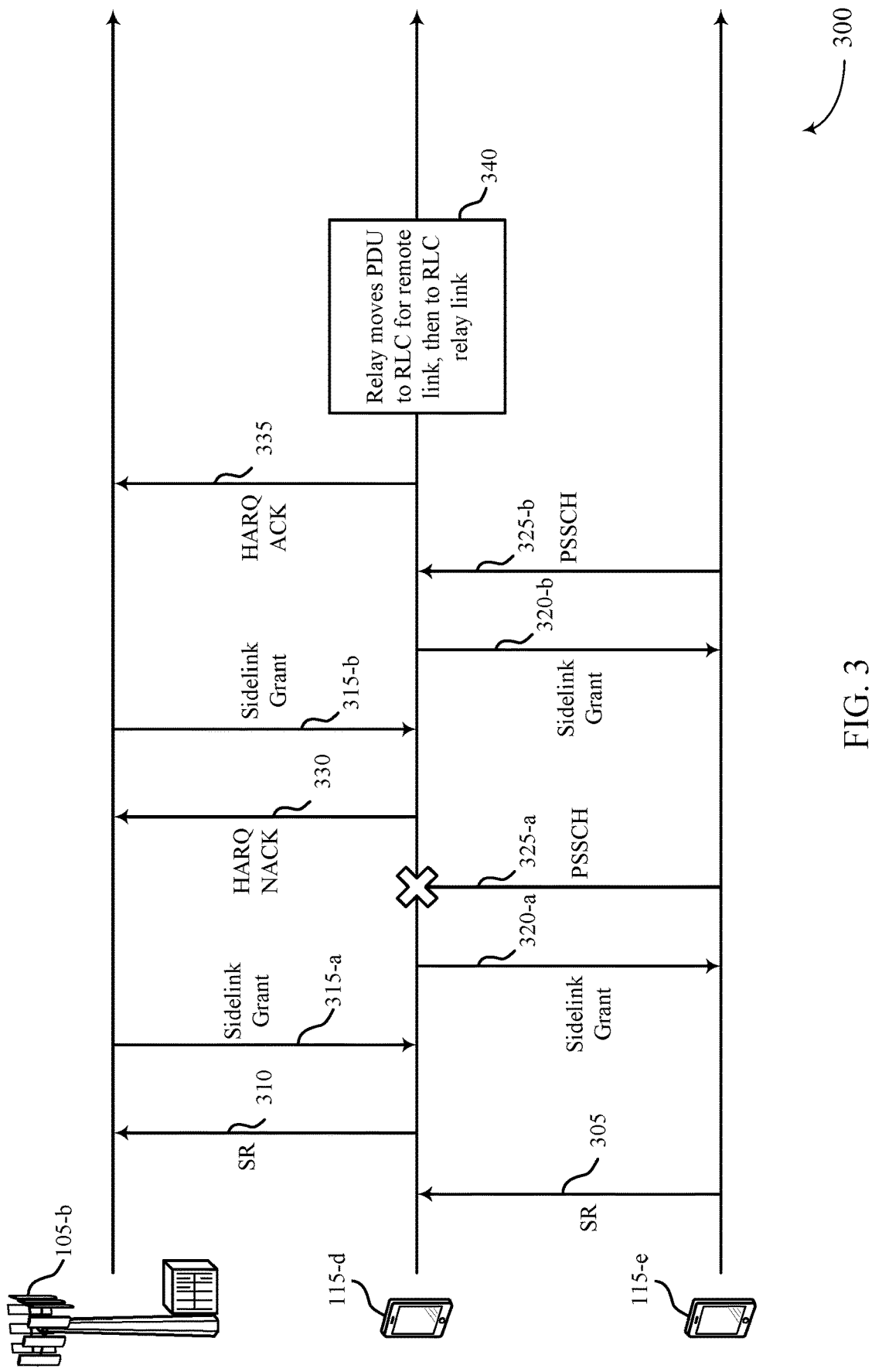
FIG. 3 illustrates an example of a sidelink scheduling procedure that supports scheduling sidelink transmission with relay in accordance with one or more aspects of the present disclosure.

FIG. 3 illustrates an example of a sidelink scheduling procedure 300 that supports scheduling sidelink transmission with relay in accordance with one or more aspects of the present disclosure. In some examples, sidelink scheduling procedure 300 may implement aspects of wireless communications system 100. For instance, base station 105-*b* may be an example of a base station 105 as described with reference to FIG. 1 and UEs 115-*d* and 115-*e* may be examples of UEs 115 as described with reference to FIG. 1. Although a relay UE 115-*d* is described herein, there may be examples where another device (e.g., a relay node or a relay base station 105) performs the functions of relay UE 115-*d*.

Initially, remote UE 115-*e* may transmit a first SR 305 to relay UE 115-*d*. Remote UE 115-*e* may trigger the SR, which may be referred to as a PC5-sidelink SR, when there is a pending BSR 525 (e.g., a pending PC5-sidelink BSR). As described herein, remote UE 115-*e* may transmit the first SR 305 for the case where the sidelink communication link 205 between UEs 115-*d* and 115-*e* is dynamically scheduled. UE 115-*e* may transmit the first SR 305 over resources configured by the network. In cases where remote UE 115-*e* has an available PSSCH resource, remote UE 115-*e* may refrain from transmitting the first SR 305 and may instead transmit the BSR 525 over the PSSCH resource. The resource may be a dynamically scheduled PSSCH resource or may be a configured grant which is preconfigured by base station 105-*b* (e.g., on a remote link or via relay UE 115-*d*).

In some cases, remote UE 115-*d* may be configured with multiple sidelink SR configurations, which may enable quality of service (QoS) differentiation. For instance, the network may configure multiple sets of one or more physical feedback shared channel (PFSCH) resources for sidelink SR, which may be referred to as a SR configuration. Each SR configuration may be associated with a different set of LCHs. LCHs with similar priorities may be associated with the same SR configuration. As such, the network (e.g., relay UE 115-*d*) may determine, from over what PFSCH resource the first SR 305 was received, whether the first SR 305 is a high priority request or a low priority request. Each SR configuration set may have its own set of prohibit timers and maximum transmission counters. In cases where the first SR 305 is a multi-bit SR, remote UE 115-*e* may signal the priority of the first SR 305 through the payload of the multi-bit SR.

Relay UE 115-*d*, after receiving the first SR 305, may transmit a second SR 310 to base station 105-*b* (e.g., first SR 305 may trigger second SR 310 on physical uplink control channel (PUCCH)). After receiving the second SR 310, base station 105-*b* may transmit a sidelink grant 315-*a* addressed to remote UE 115-*e* to relay UE 115-*d*. The sidelink grant 315-*a* may indicate one or more resources configured for transmitting a BSR 325-*a* from remote UE 115-*e* to relay UE 115-*d*. Relay UE 115-*d*, after receiving the sidelink grant 315-*a*, may transmit a sidelink grant 320-*a* to remote UE 115-*e* indicating the one or more resources configured for transmitting the BSR 325-*a*.

Remote UE 115-*e*, after receiving the sidelink grant 320-*a*, may transmit a BSR 325-*a* over the one or more resources. Additionally, remote UE 115-*e* may transmit data corresponding to the BSR 325-*a* (e.g., data whose buffer status the BSR 325-*a* is reporting). Relay UE 115-*d* may fail to successfully receive and decode the BSR 325-*a* and/or data. As such, relay UE 115-*d* may transmit a HARQ negative acknowledgement (NACK) 330 to base station 105-*b*, which may indicate to base station 105-*b* that relay UE 115-*d* failed to receive and decode the BSR 325-*a* and/or the data.

After receiving the HARQ NACK 330, base station 105-*b* may transmit a sidelink grant 315-*b*, which may be a retransmission of sidelink grant 315-*a*. Sidelink grant 315-*b* may indicate one or more resources configured for transmitting a BSR 325-*b* from remote UE 115-*e* to relay UE 115-*d*. Relay UE 115-*d*, after receiving the sidelink grant 315-*b*, may transmit a sidelink grant 320-*b* to remote UE 115-*e* indicating the one or more resource configured for transmitting the BSR 325-*b*. Sidelink grant 320-*b* may be a retransmission of sidelink grant 320-*a*.

Remote UE 115-*e*, after receiving the sidelink grant 320-*b*, may transmit a BSR 325-*b* over the one or more resources. BSR 325-*b* may be retransmission of BSR 325-*a*. Additionally, remote UE 115-*e* may retransmit data the corresponding to the BSR 325-*a* (e.g., data whose buffer status the BSR 325-*b* is reporting). Relay UE 115-*d* may successfully receive and decode the BSR 325-*b* and/or data. As such, relay UE 115-*d* may transmit a HARQ acknowledgement (ACK) 335 to base station 105-*b*, which may indicate to base station 105-*b* that relay UE 115-*d* successfully received and decoded the BSR 325 and/or the data. At 340, relay UE 115-*d* may move PDUs of the BSR 325-*b* to radio link control (RLC) for the sidelink communication link 205, and then to RLC for the relay communication link 210.

Figure 4:
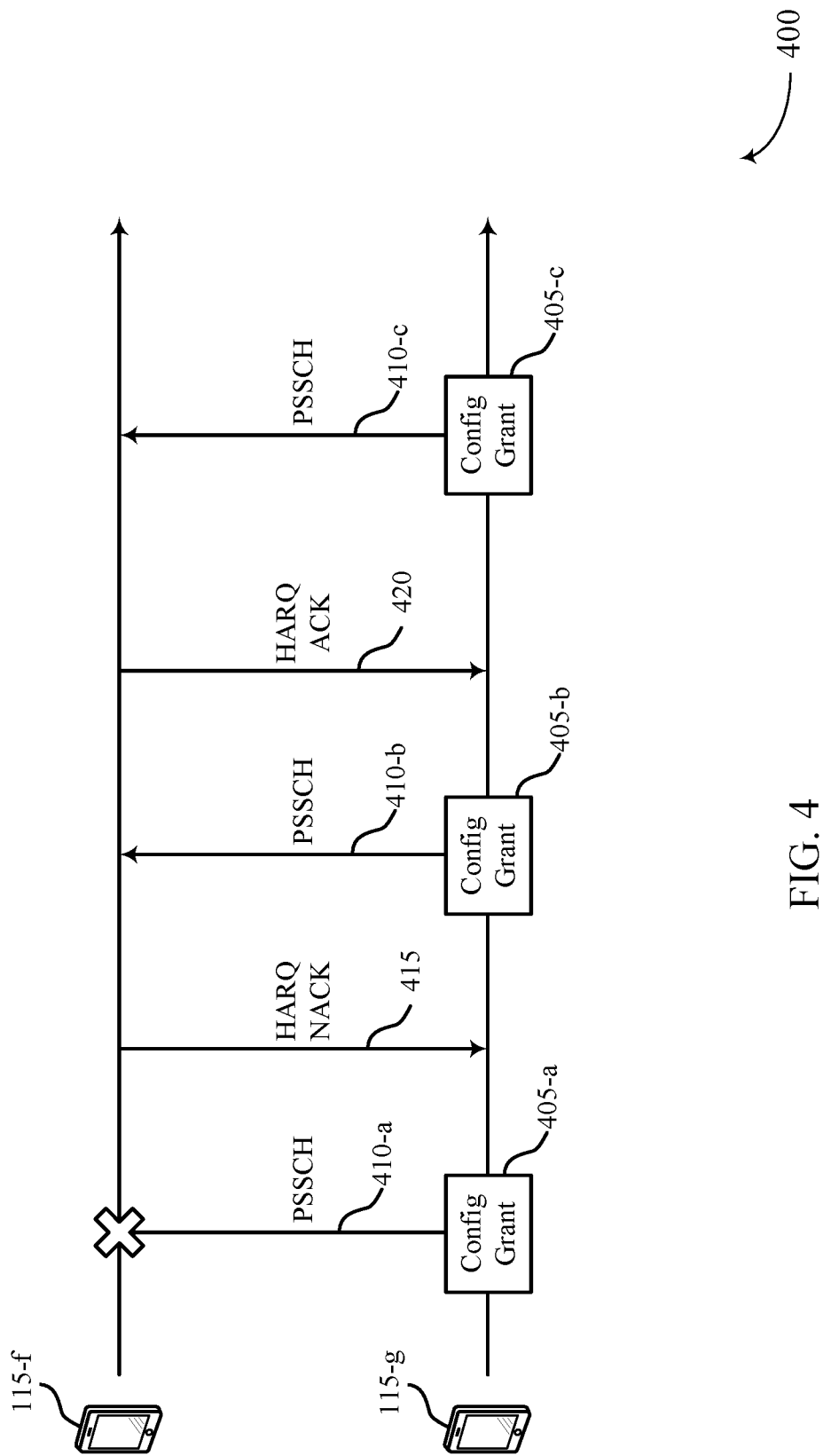
FIG. 4 illustrates an example of a sidelink scheduling procedure that supports scheduling sidelink transmission with relay in accordance with one or more aspects of the present disclosure.

FIG. 4 illustrates an example of a sidelink scheduling procedure 400 that supports scheduling sidelink transmission with relay in accordance with one or more aspects of the present disclosure. In some examples, sidelink scheduling procedure 400 may implement aspects of wireless communications system 100. For instance, UEs 115-*f* and 115-*g* may be examples of UEs 115 as described with reference to FIG. 1. In the present example, transmissions on the remote link (e.g., the sidelink communication link 205 between relay UE 115-*f* and remote UE 115-*g*) may not be dynamically scheduled. Although a relay UE 115-*f* is described herein, there may be examples where another device (e.g., a relay node or a relay base station 105) performs the functions of relay UE 115-*f*.

Initially UE 115-*g* may identify one or more configured grant resources 405 for transmitting a PSSCH transmission (e.g., a BSR and/or corresponding data). In the present example, UE 115-*g* may transmit a PSSCH transmission 410-*a* over configured grant resource 405-*a*. Relay UE 115-*f* may fail to successfully receive and decode the PSSCH transmission 410-*a* and may transmit a HARQ NACK 415 to remote UE 115-*g*. The HARQ NACK 415 may be transmitted over PFSCH.

Remote UE 115-*g*, after receiving the HARQ NACK 415 may transmit PSSCH transmission 410-*b* over configured grant resource 405-*b*, where PSSCH transmission 410-*b* may be a retransmission of PSSCH transmission 410-*a*. Remote UE 115-*g* may transmit a retransmission of PSSCH transmission 410-*a* due to receiving the HARQ NACK 415 from relay UE 115-*f*. Relay UE 115-*g* may successfully receive and decode the PSSCH transmission 410-*b* and may transmit a HARQ ACK 420 to UE 115-*g*. In some case, the retransmission (e.g., PSSCH transmission 410-*b*) may be over a next transmission occasion of the configured grant (e.g., the next configured grant resource 405) after receiving the HARQ NACK 415 and/or after the configured grant resource 405 over which the previous PSSCH transmission 410 was transmitted (e.g., configured grant resource 405-*b*). The HARQ ACK 420 may be transmitted over PFSCH. In some cases, UE 115-*g* may multiplex a HARQ process ID in sidelink control information (SCI) with PSSCH transmissions 410-*a* and 410-*b*.

Remote UE 115-*g*, after receiving the HARQ ACK 420, may transmit a PSSCH transmission 410-*c* over configured grant resource 405-*c*, where PSSCH transmission 410-*c* may not be a retransmission of PSSCH transmissions 410-*a* or 410-*b* since UE 115-*g* received the HARQ ACK 420. In some cases, UE 115-*g* may multiplex a new data indicator (NDI) and/or a HARQ process ID in SCI with the PSSCH transmission 410-*c* (e.g., NDI may be toggled).

Figure 5:
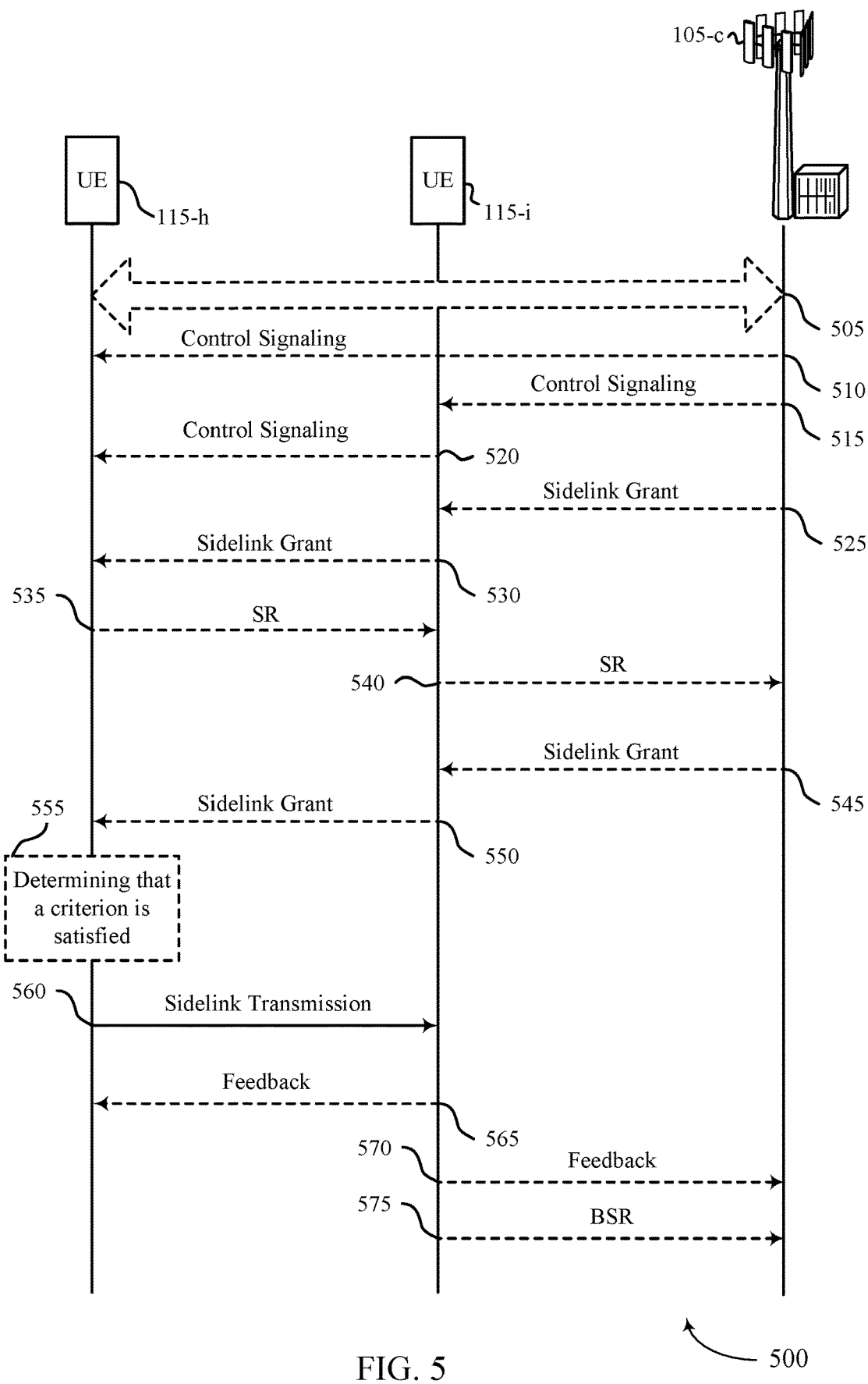
FIG. 5 illustrates an example of a process flow that supports scheduling sidelink transmission with relay in accordance with one or more aspects of the present disclosure.

FIG. 5 illustrates an example of a process flow 500 that supports scheduling sidelink transmission with relay in accordance with one or more aspects of the present disclosure. In some examples, process flow 500 may implement aspects of wireless communications system 100. For instance, base station 105-*c* may be an example of a base station 105 as described with reference to FIG. 1 and UEs 115-*h* and 115-*i* may be examples of UEs 115 as described with reference to FIG. 1. Although a relay UE 115-*i* is described herein, there may be examples where another device (e.g., a relay node or a relay base station 105) performs the functions of relay UE 115-*i*.

At 505, relay UE 115-*i* may establish a communication link with base station 105-*c* and remote UE 115-*h*. The communication link may include a sidelink communication link between remote UE 115-*h* and relay UE 115-*i* and a relay communication link between relay UE 115-*i* and base station 105-*c*.

At 510, base station 105-*c* may transmit a control signal to remote UE 115-*h* indicating a priority for each of a set of LCGs of remote UE 115-*h*. Additionally, base station 105-*c* may transmit a second control signal to another UE 115 indicating the priority of each of the set of LCGs of remote UE 115-*h*.

At 515, base station 105-*c* may transmit a control signal to relay UE 115-*i* (e.g., over the relay communications link) indicating a priority of each of a set of LCGs of remote UE 115-*h*.

At 520, relay UE 115-*i* may transmit a control signal to remote UE 115-*h* (e.g., over the sidelink communications link) indicating a priority for each of the set of LCGs indicated at 515. Additionally, relay UE 115-*i* may transmit an additional control signal to an additional UE 115 indicating the priority for each of the set of LCGs of remote UE 115-*h*.

At 525, base station 105-*c* may transmit to relay UE 115-*i* (e.g., over the relay communication link) an indication of one or more sidelink feedback channel resources configured for transmission of an SR from remote UE 115-*h* to relay UE 115-*i*. In some cases, base station 105-*c* may transmit to relay UE 115-*i* (e.g., over the relay communication link) an indication of one or more additional sidelink feedback control channel resources configured for transmission of the SR from remote UE 115-*h* to relay UE 115-*i*. In some cases, the one or more sidelink feedback channel resources may be associated with a first priority and the one or more additional sidelink feedback resources may be associated with a second priority.

At 530, relay UE 115-*i* may transmit to remote UE 115-*h* (e.g., over the sidelink communication link) the indication of the one or more sidelink feedback channel resources. In cases that relay UE 115-*i* receives the indication of the one or more additional sidelink feedback control channel resources, relay UE 115-*i* may transmit to remote UE 115-*h* the indication of the one or more additional sidelink feedback control channel resources.

At 535, remote UE 115-*h* may transmit to relay UE 115-*i* (e.g., over the sidelink communication link) an SR. The SR may be transmitted over at least a portion of the one or more sidelink feedback channel resources indicated at 530. In some cases, the SR may be transmitted over the at least the portion of the one or more sidelink feedback channel resources based on the data stored at remote UE 115-*h* being associated with an LCG with the first priority. In some cases, the SR may be transmitted over a dedicated feedback channel (e.g., a PFSCH). In some cases, the SR may explicitly indicate a priority of an LCG associated with data stored at remote UE 115-*h*.

At 540, relay UE 115-*i* may transmit to base station 105-*c* (e.g., over the relay communication link) an SR. Relay UE 115-*i* may transmit the SR based on receiving the SR at 535.

At 545, base station 105-*c* may transmit to relay UE 115-*i* (e.g., over the relay communication link) an indication of one or more sidelink shared channel resources for a sidelink transmission (e.g., a BSR) from remote UE 115-*h* to relay UE 115-*i*. If the sidelink transmission is a BSR, the BSR may correspond to data stored at remote UE 115-*h*. In some cases, transmitting the indication of the one or more sidelink shared channel resources may be based on receiving the SR transmitted at 540.

At 550, base station 105-*c* may transmit an indication of the one or more sidelink shared channel resources configured by base station 105-c (e.g., transmitted by base station 105-c at 545) for transmission of the sidelink transmission. The one or more sidelink feedback channel resources may be associated with a first prohibit timer and a first maximum transmission counter, and the one or more additional sidelink feedback channel resources may be associated with a second prohibit timer and a second maximum transmission counter.

At 555, remote UE 115-h may determine that a criterion for transmitting the sidelink transmission is satisfied. The criterion may include remote UE 115-h receiving the data at an empty buffer, the data being associated with an LCH that has a higher priority (e.g., has a higher configured priority number) than one or more LCHs associated with additional data stored at remote UE 115-h, or a combination thereof.

At 560, remote UE 115-h may transmit a sidelink transmission to relay UE 115-i (e.g., over the sidelink communication link) over at least a portion of the one or more configured shared channel resources (e.g., received at 550). Remote UE 115-h may transmit the sidelink transmission based on the criterion at 555 being satisfied. The sidelink transmission may indicate a priority of one or more LCGs associated with the data stored at remote UE 115-h. In some cases, remote UE 115-h may transmit the sidelink transmission over one or more preconfigured sidelink shared channel resources.

At 565, relay UE 115-i may transmit to remote UE 115-h (e.g., over the sidelink communication link) an indication that the sidelink transmission was successfully received and decoded by relay UE 115-i (e.g., an ACK). Relay UE 115-i may transmit the indication at 565 in cases where remote UE 115-h transmits the sidelink transmission over preconfigured one or more resources.

In some cases, prior to transmitting the sidelink transmission at 560, remote UE 115-h may transmit the sidelink transmission over the sidelink communication link over second one or more preconfigured resources. If relay UE 115-i fails to receive and successfully decode the sidelink transmission, relay UE 115-i may transmit to remote UE 115-h (e.g., over the sidelink communication link) an indication that relay UE 115-i failed to successfully receive and decode the sidelink transmission (e.g., a NACK). In such cases, remote UE 115-h may transmit the sidelink transmission at 560 based on receiving the indication that the relay UE 115-i failed to successfully receive and decode the sidelink transmission.

At 570, relay UE 115-i may transmit to base station 105-c (e.g., over the relay communication link) an indication that the sidelink transmission was successfully received and decoded by relay UE 115-i (e.g., an ACK). Relay UE 115-i may transmit the indication at 565 in cases where remote UE 115-h transmits the sidelink transmission over resources configured by the sidelink grant received at 550.

If relay UE 115-i fails to receive and decode the sidelink transmission at 560, relay UE 115-i may transmit to base station 105-c (e.g., over the relay communication link) an indication that relay UE 115-i failed to successfully receive and decode the sidelink transmission (e.g., a NACK). In such cases, base station 105-c may transmit to relay UE 115-i (e.g., over the relay communication link) an indication of second one or more sidelink shared channel resources for retransmission of the sidelink transmission.

At 575, in cases where the sidelink transmission is a BSR or a data transmission, relay UE 115-i may transmit to base station 105-c (e.g., over the relay communication link) the corresponding BSR or data transmission received at 560.

Figure 6:
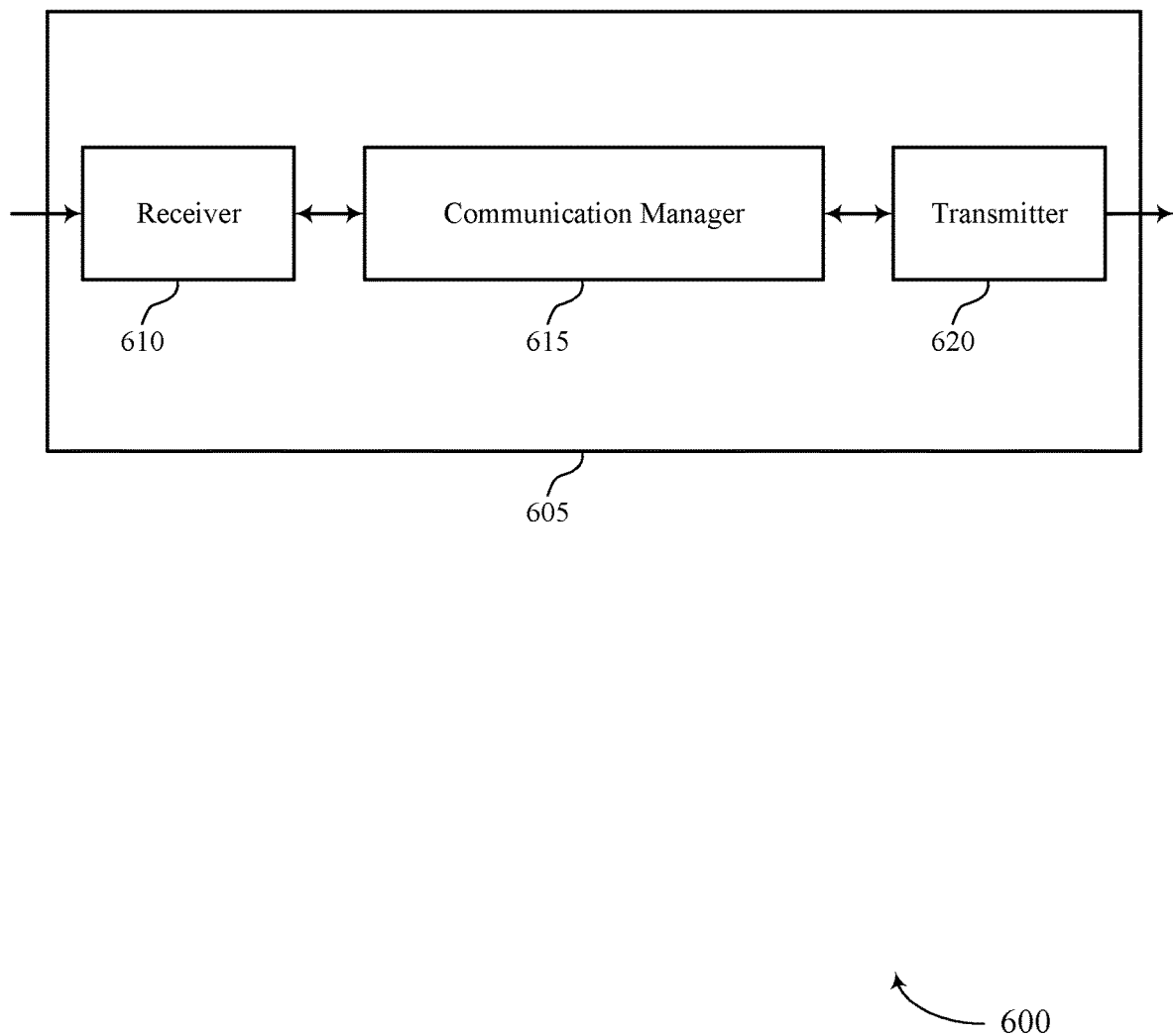
FIGS. 6 and 7 show block diagrams of devices that support scheduling sidelink transmission with relay in accordance with one or more aspects of the present disclosure.

FIG. 6 shows a block diagram 600 of a device 605 that supports scheduling sidelink transmission with relay in accordance with one or more aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to scheduling sidelink transmission with relay, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may establish a communication link with a base station, the communication link including a sidelink communication link between the remote UE and a relay UE and a relay communication link between the relay UE and the base station, transmit, over the sidelink communication link, an SR, receive, over the sidelink communication link and based on transmitting the SR, an indication of one or more sidelink shared channel resources configured by the base station for a sidelink transmission by the remote UE, and transmit, over the sidelink communication link, the sidelink transmission over at least a portion of the one or more configured sidelink shared channel resources. The communication manager 615 may, additionally or alternatively, establish a communication link with a base station and a remote UE, the communication link including a sidelink communication link between the remote UE and the relay UE and a relay communication link between the relay UE and the base station, receive, over the sidelink communication link, an SR, transmit, over the sidelink communication link, an indication of one or more sidelink shared channel resources configured by the base station for a sidelink transmission by the remote UE, receive, over the sidelink communication link, the sidelink transmission over the one or more configured sidelink shared channel resources, and transmit, over the relay communication link, an indication that the sidelink transmission was successfully received and decoded by the relay UE.

In some examples, communication manager 615 may establish a sidelink communication link with a relay UE; may determine that a criterion for transmitting a sidelink transmission is satisfied; may transmit, over the sidelink communication link, the sidelink transmission over one or more preconfigured sidelink shared channel resources based on determining that the criterion is satisfied; and may receive, over the sidelink communication link, an indication that the sidelink transmission was successfully received and decoded by the second UE. Communication manager 615 may, additionally or alternatively, establish a sidelink communication link with a remote UE; may receive, over the sidelink communication link, a sidelink transmission over one or more preconfigured sidelink shared channel resources; and may transmit, over the sidelink communication link, an indication that the sidelink transmission was successfully received and decoded by the relay UE. The communication manager 615 may be an example of aspects of the communication manager 910 described herein.

In one or more aspects, the described techniques performed by the communication manager 615 as described herein may support improvements in relayed sidelink communications. For example, communication manager 615 may decrease communication delays and latency, and increase available power at a wireless device (e.g., a UE 115) by supporting transmission of a scheduling request on configured sidelink resources. Transmission of the scheduling request on the configured sidelink resources may reduce overhead resource use or reduce power consumption at a device (or any combination thereof) compared to other systems and techniques, for example, that do not support sidelink resources that are configured for scheduling requests. Accordingly, communication manager 615 may save power and increase battery life at a wireless device (e.g., a UE 115) by strategically reducing an amount of signaling or processing performed by a wireless device (e.g., a UE 115) when requesting resources via a scheduling request.

The communication manager 615 may be an example of means for performing various aspects of managing smart repeaters as described herein. The communication manager 615, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communication manager 615, or its sub-components, may be implemented in code (e.g., as communications management software or firmware) executed by a processor, or any combination thereof. If implemented in code executed by a processor, the functions of the communication manager 615, or its sub-components may be executed by a general-purpose processor, a DSP, an ASIC, a FPGA or other programmable logic device.

In some examples, the communication manager 615 may be configured to perform various operations (e.g., receiving, determining, transmitting) using or otherwise in cooperation with the receiver 610, the transmitter 620, or both.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
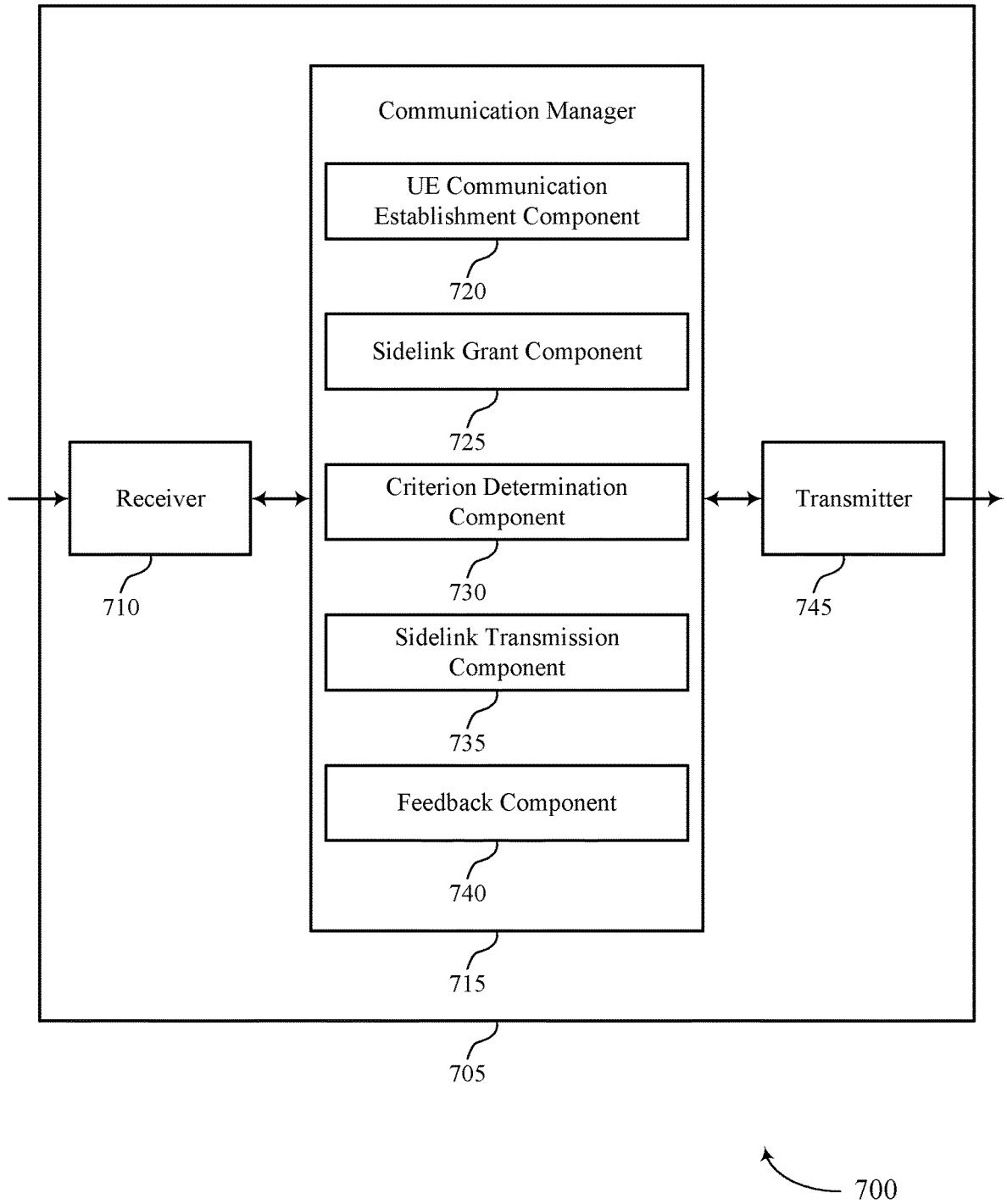

FIG. 7 shows a block diagram 700 of a device 705 that supports scheduling sidelink transmission with relay in accordance with one or more aspects of the present disclosure. The device 705 may be an example of aspects of a device 605, or a UE 115 as described herein. The device 705 may include a receiver 710, a communication manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to scheduling sidelink transmission with relay, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include an UE communication establishment component 720, a sidelink grant component 725, a criterion determination component 730, a sidelink transmission component 735, and a feedback component 740. The communication manager 715 may be an example of aspects of the communication manager 910 described herein.

The UE communication establishment component 720 may establish a communication link with a base station, the communication link including a sidelink communication link between the remote UE and a relay UE and a relay communication link between the relay UE and the base station. The UE communication establishment component 720 may establish a communication link with a base station and a remote UE, the communication link including a sidelink communication link between the remote UE and the relay UE and a relay communication link between the relay UE and the base station. In some cases, UE communication establishment component may establish a sidelink communication link with a remote UE or a relay UE.

The sidelink grant component 725 may receive, over the sidelink communication link, an indication of one or more sidelink shared channel resources configured by the base station for a sidelink transmission by the remote UE. The sidelink grant component 725 may transmit, over the sidelink communication link, an indication of one or more sidelink shared channel resources configured by the base station for a sidelink transmission by the remote UE.

The criterion determination component 730 may determine that a criterion for transmitting the sidelink transmission is satisfied.

The sidelink transmission component 735 may transmit, over the sidelink communication link, the sidelink transmission over at least a portion of the one or more configured sidelink shared channel resources (e.g., based on the criterion being satisfied). The sidelink transmission component 735 may receive, over the sidelink communication link, the sidelink transmission over the one or more configured sidelink shared channel resources. In some cases, the sidelink transmission component 735 may transmit, over the sidelink communication link, the sidelink transmission over one or more preconfigured sidelink shared channel resources based on determining that the criterion is satisfied. In some cases, the sidelink transmission component 735 may receive, over the sidelink communication link, a sidelink transmission over one or more preconfigured sidelink shared channel resources.

The feedback component 740 may transmit, over the relay communication link, an indication that the sidelink transmission was successfully received and decoded by the relay UE. In some cases, the feedback component 740 may receive, over the relay communication link, an indication that the sidelink transmission was successfully received and decoded by the relay UE. In some cases, the feedback component 740 may transmit, over the sidelink communication link, an indication that the sidelink transmission was successfully received and decoded by the relay UE.

The transmitter 745 may transmit signals generated by other components of the device 705. In some examples, the transmitter 745 may be collocated with a receiver 710 in a transceiver module. For example, the transmitter 745 may be an example of aspects of the transceiver 915 described with reference to FIG. 9. The transmitter 745 may utilize a single antenna or a set of antennas.

Figure 8:
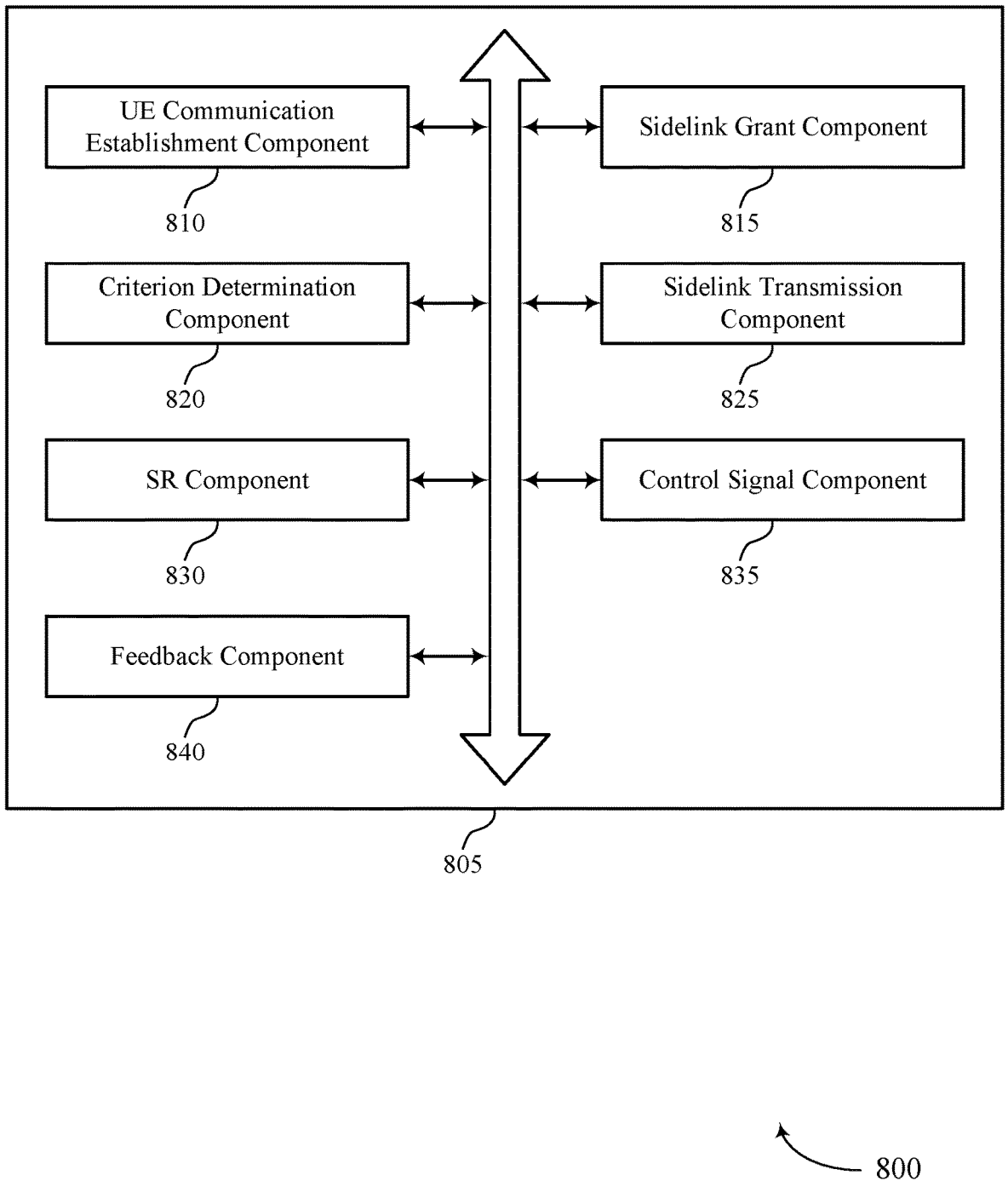
FIG. 8 shows a block diagram of a communication manager that supports scheduling sidelink transmission with relay in accordance with one or more aspects of the present disclosure.

FIG. 8 shows a block diagram 800 of a communication manager 805 that supports scheduling sidelink transmission with relay in accordance with one or more aspects of the present disclosure. The communication manager 805 may be an example of aspects of a communication manager 615, a communication manager 715, or a communication manager 910 described herein. The communication manager 805 may include an UE communication establishment component 810, a sidelink grant component 815, a criterion determination component 820, a sidelink transmission component 825, a SR component 830, a control signal component 835, and a feedback component 840. Each of these modules may communicate, directly or indirectly, with one another (e.g., via one or more buses).

The UE communication establishment component 810 may establish a communication link with a base station, the communication link including a sidelink communication link between the remote UE and a relay UE and a relay communication link between the relay UE and the base station. In some examples, the UE communication establishment component 810 may establish a communication link with a base station and a remote UE, the communication link including a sidelink communication link between the remote UE and the relay UE and a relay communication link between the relay UE and the base station. In some examples, the UE communication establishment component 810 may establish a sidelink communication link with a remote UE or relay UE.

The sidelink grant component 815 may receive, over the sidelink communication link (e.g., and based on SR component 830 transmitting an SR), an indication of one or more sidelink shared channel resources configured by the base station for a sidelink transmission by the remote UE. In some examples, the sidelink grant component 815 may transmit, over the sidelink communication link (e.g., and based on SR component 830 receiving an SR), an indication of one or more sidelink shared channel resources configured by the base station for a sidelink transmission by the remote UE. In some examples, the sidelink grant component 815 may receive, over the sidelink communication link, an indication of one or more sidelink feedback channel resources configured by the base station for the SR from the remote UE to the relay UE, where the SR is transmitted over at least a portion of the one or more sidelink feedback channel resources.

In some examples, the sidelink grant component 815 may receive, over the sidelink communication link, an indication of one or more additional sidelink feedback channel resources configured by the base station for the SR from the remote UE to the relay UE, where the one or more sidelink feedback channel resources are associated with a first priority and the one or more additional sidelink feedback channel resources are associated with a second priority, and where the SR is transmitted over the at least the portion of the one or more sidelink feedback channel resources based on the data being associated with a LCG with the first priority. In some examples, the sidelink grant component 815 may receive, over the relay communication link, an indication of one or more sidelink feedback channel resources configured for transmission of the SR from the remote UE to the relay UE. In some examples, the sidelink grant component 815 may transmit, over the sidelink communication link, the indication of the one or more sidelink feedback channel resources, where the SR is received over at least a portion of the one or more sidelink feedback channel resources.

In some examples, the sidelink grant component 815 may receive, over the relay communication link, an indication of one or more additional sidelink feedback channel resources configured for transmission of the SR from the remote UE to the relay UE. In some examples, the sidelink grant component 815 may transmit, over the sidelink communication link, the indication of the one or more additional sidelink feedback control channel resources, where the one or more sidelink feedback channel resources are associated with a first priority and the one or more additional sidelink feedback resources are associated with a second priority, and where the SR is received over the at least the portion of the one or more sidelink feedback channel resources based on the data being associated with a LCG with the first priority. In some examples, the sidelink grant component 815 may receive, over the relay communication link, the indication of one or more resources based on transmitting the second SR. In some examples, the sidelink grant component 815 may transmit, over the sidelink communication link, an indication of second one or more sidelink shared channel resources configured by the base station for the sidelink transmission. In some cases, the sidelink transmission may be a BSR corresponding to data stored at the remote UE.

The criterion determination component 820 may determine that a criterion for transmitting the sidelink transmission is satisfied. In some cases, the criterion includes the remote UE receiving the data at an empty buffer, the data being associated with an LCH that has a higher priority than one or more additional LCHs associated with additional data stored at the remote UE, or a combination thereof.

The sidelink transmission component 825 may transmit, over the sidelink communication link, the sidelink transmission over at least a portion of the one or more configured sidelink shared channel resources (e.g., based on the criterion being satisfied). In some examples, the sidelink transmission component 825 may receive, over the sidelink communication link, the sidelink transmission over the one or more configured sidelink shared channel resources.

In some cases, sidelink transmission component 825 may transmit, over the sidelink communication link, the sidelink transmission over one or more preconfigured sidelink shared channel resources based on determining that the criterion is satisfied. In some cases, sidelink transmission component 825 may transmit, over the sidelink communication link, the sidelink transmission over second one or more preconfigured sidelink shared channel resources, where the second one or more preconfigured sidelink shared channel resources occur prior to the one or more preconfigured sidelink shared channel resources. Additionally or alternatively, sidelink transmission component 825 may receive, over the sidelink communication link, a sidelink transmission over one or more preconfigured sidelink shared channel resources. In some examples, sidelink transmission component 825 may transmit the sidelink transmission over the one or more preconfigured sidelink shared channel resources based on receiving the indication that the relay UE failed to successfully receive and decode the sidelink transmission. In some cases, sidelink transmission component 825 may receive the sidelink transmission over the one or more preconfigured sidelink shared channel resources based on transmitting the indication that the relay UE failed to successfully receive and decode the sidelink transmission.

The SR component 830 may transmit, over the sidelink communication link, a SR, where receiving the indication of the one or more sidelink shared channel resources is based on transmitting the SR. In some examples, the SR component 830 may receive, over the sidelink communication link, a SR, where transmitting the indication of the one or more sidelink shared channel resources is based on receiving the SR. In some examples, the SR component 830 may transmit, over the relay communication link, a second SR over the relay communication link based on receiving the SR over the sidelink communication link. In some examples, the SR component 830 may receive, over the sidelink communication link, a second SR.

The control signal component 835 may receive a control signal over the sidelink communications link indicating a priority for each of a set of LCG. In some examples, the control signal component 835 may receive a control signal from the base station indicating a priority for each of a set of LCGs of the remote UE. In some examples, the control signal component 835 may receive a first control signal over the relay communications link indicating a priority for each of a set of LCGs of the remote UE. In some examples, the control signal component 835 may transmit a second control signal over the sidelink communications link indicating the priority for each of the set of LCGs of the remote UE. In some examples, the control signal component 835 may transmit, to an additional UE, a third control signal indicating the priority for each of the set of LCGs of the remote UE.

The feedback component 840 may transmit, over the relay communication link, an indication that the sidelink transmission was successfully received and decoded by the relay UE. In some examples, the feedback component 840 may receive, over the relay communication link, an indication that the sidelink transmission was successfully received and decoded by the relay UE. In some cases, feedback component 840 may receive, over the sidelink communication link, an indication that the sidelink transmission was successfully received and decoded by the relay UE. In some examples, feedback component 840 may transmit, over the sidelink communication link, an indication that the sidelink transmission was successfully received and decoded by the relay UE. The feedback component 840 may receive, over the sidelink communication link, an indication that the relay UE failed to successfully receive and decode the sidelink transmission. The feedback component 840 may determine that the relay UE has failed to receive the sidelink transmission over second one or more preconfigured sidelink shared channel resources, the second one or more sidelink shared channel resources occurring prior to the one or more preconfigured sidelink shared channel resources. The feedback component 840 may transmit, over the sidelink communication link, an indication that the relay UE has failed to successfully receive and decode the sidelink transmission.

In some cases, feedback component 840 may determine that the relay UE has failed to successfully receive and decode the sidelink transmission over the second one or more sidelink shared channel resources and may transmit, over the relay communication link, an indication that the relay UE has failed to successfully receive and decode the sidelink transmission based on the determining, where receiving the indication of the one or more sidelink shared channel resources may be based on transmitting the indication that the relay UE has failed to successfully receive and decode the sidelink transmission.

Figure 9:
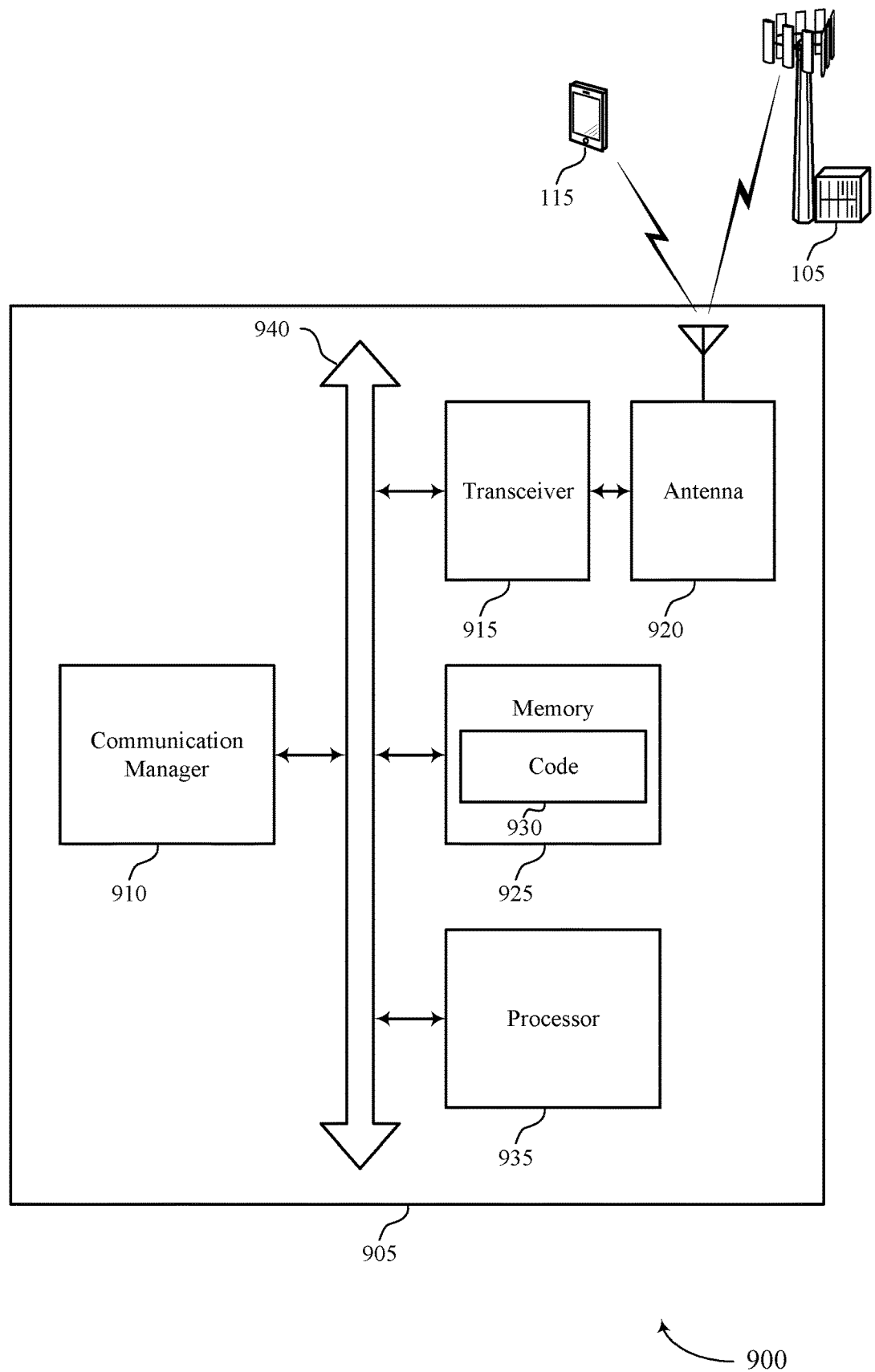
FIG. 9 shows a diagram of a system including a device that supports scheduling sidelink transmission with relay in accordance with one or more aspects of the present disclosure.

FIG. 9 shows a diagram of a system 900 including a device 905 that supports scheduling sidelink transmission with relay in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may establish a communication link with a base station, the communication link including a sidelink communication link between the remote UE and a relay UE and a relay communication link between the relay UE and the base station, transmit, over the sidelink communication link, an SR, receive, over the sidelink communication link and based on transmitting the SR, an indication of one or more sidelink shared channel resources configured by the base station for a sidelink transmission by the remote UE, and transmit, over the sidelink communication link, the sidelink transmission over at least a portion of the one or more configured sidelink shared channel resources. The communication manager 910 may, additionally or alternatively, establish a communication link with a base station and a remote UE, the communication link including a sidelink communication link between the remote UE and the relay UE and a relay communication link between the relay UE and the base station, receive, over the sidelink communication link, an SR, transmit, over the sidelink communication link and based on receiving the SR, an indication of one or more sidelink shared channel resources configured by the base station for a sidelink transmission by the remote UE, receive, over the sidelink communication link, the sidelink transmission over the one or more configured sidelink shared channel resources, and transmit, over the relay communication link, an indication that the sidelink transmission was successfully received and decoded by the relay UE.

The communication manager 910 may establish a sidelink communication link with a relay UE; may determine that a criterion for transmitting a sidelink transmission is satisfied; may transmit, over the sidelink communication link, the sidelink transmission over one or more preconfigured sidelink shared channel resources based on determining that the criterion is satisfied; and may receive, over the sidelink communication link, an indication that the sidelink transmission was successfully received and decoded by the relay UE. The communication manager 910 may establish a sidelink communication link with a remote UE; may receive, over the sidelink communication link, a sidelink transmission over one or more preconfigured sidelink shared channel resources; and may transmit, over the sidelink communication link, an indication that the sidelink transmission was successfully received and decoded by the remote UE.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support PREAMBLE. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting scheduling sidelink transmission with relay).

Figure 10:
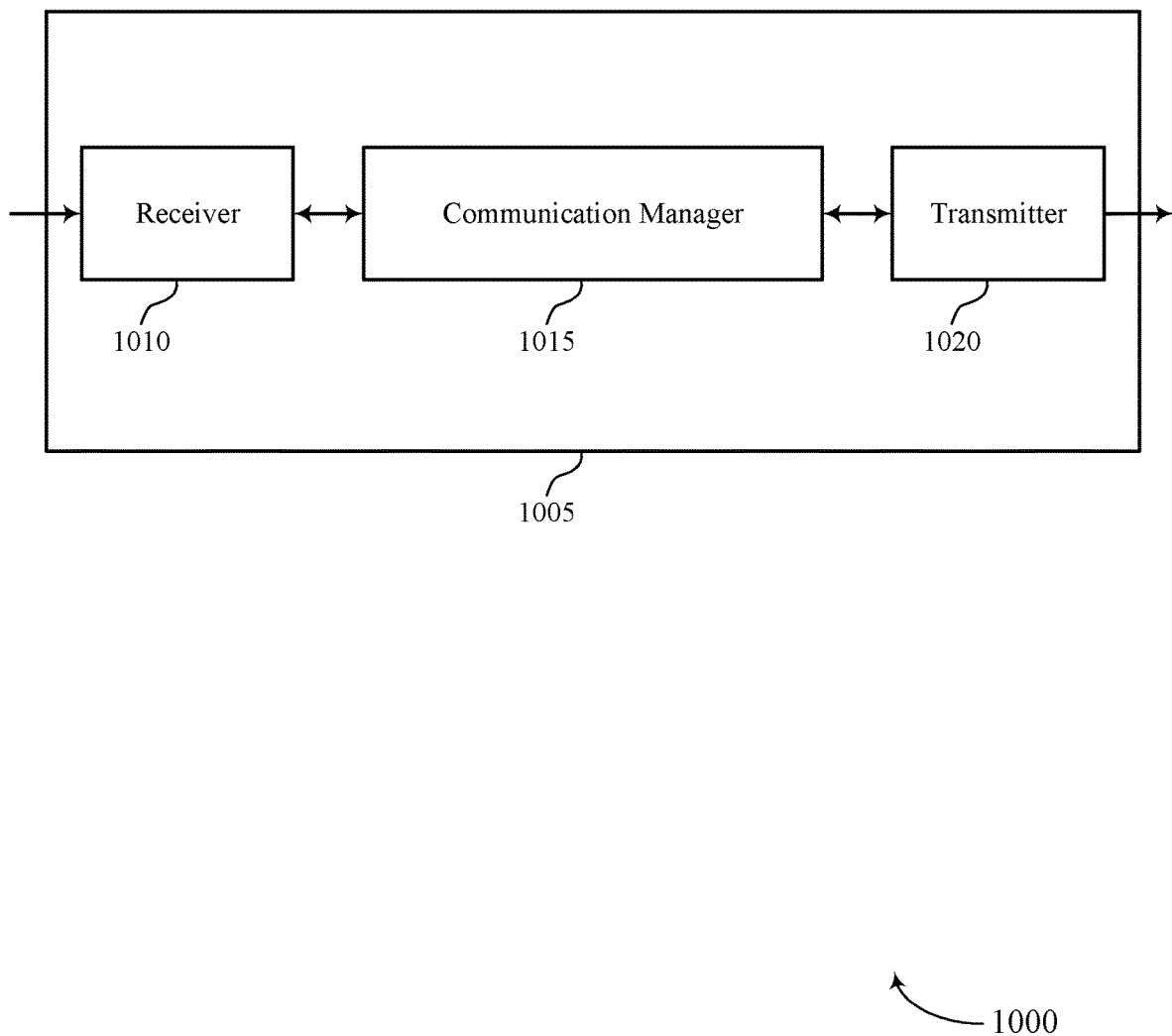
FIGS. 10 and 11 show block diagrams of devices that support scheduling sidelink transmission with relay in accordance with one or more aspects of the present disclosure.

FIG. 10 shows a block diagram 1000 of a device 1005 that supports scheduling sidelink transmission with relay in accordance with one or more aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to scheduling sidelink transmission with relay, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may establish a communication link with a remote UE, the communication link including a sidelink communication link between the remote UE and a relay UE and a relay communication link between the relay UE and the base station, transmit, over the relay communication link, an indication of one or more sidelink shared channel resources for a sidelink transmission from the remote UE to the relay UE, and receive an indication that the sidelink transmission was successfully received and decoded by the relay UE based on transmitting the indication of the one or more sidelink shared channel resources. The communication manager 1015 may be an example of aspects of the communication manager 1310 described herein.

In one or more aspects, the described techniques performed by the communication manager 1015 as described herein may support improvements in relayed sidelink communications. For example, the techniques performed by communication manager 1015 may enable a base station 105 to schedule resources for and receive data from a UE without direct communication with the UE. Additionally or alternatively, the techniques performed by communication manager 1015 may enable a base station 105 to schedule resources for and receive data from a UE outside of a coverage area of the base station. Accordingly, the techniques described herein may increase an effective range of communication.

The communication manager 1015 may be an example of means for performing various aspects of managing smart repeaters as described herein. The communication manager 1015, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communication manager 1015, or its sub-components, may be implemented in code (e.g., as communications management software or firmware) executed by a processor, or any combination thereof. If implemented in code executed by a processor, the functions of the communication manager 1015, or its sub-components may be executed by a general-purpose processor, a DSP, an ASIC, a FPGA or other programmable logic device.

In some examples, the communication manager 1015 may be configured to perform various operations (e.g., receiving, determining, transmitting) using or otherwise in cooperation with the receiver 1010, the transmitter 1020, or both.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
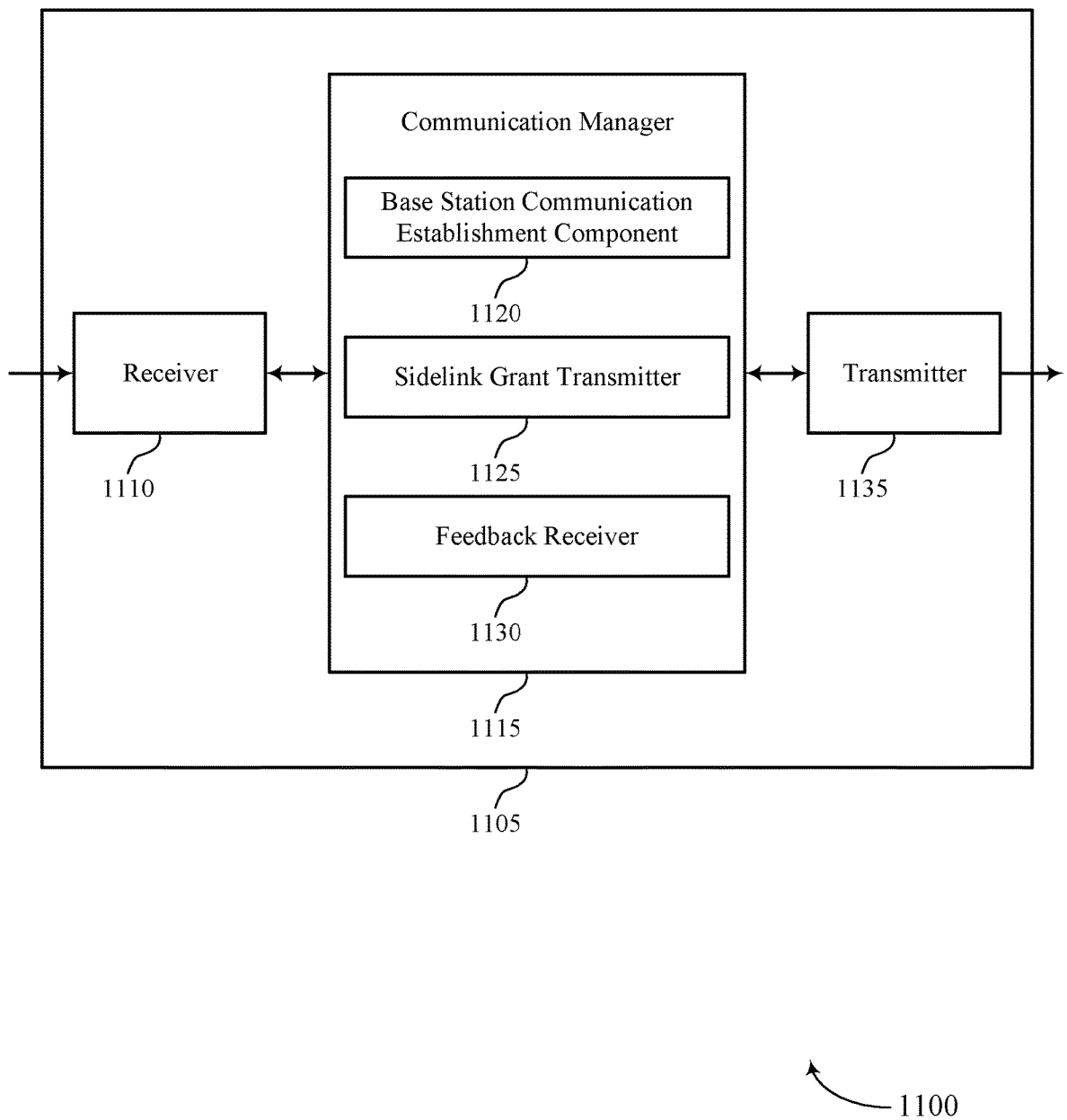

FIG. 11 shows a block diagram 1100 of a device 1105 that supports scheduling sidelink transmission with relay in accordance with one or more aspects of the present disclosure. The device 1105 may be an example of aspects of a device 1005, or a base station 105 as described herein. The device 1105 may include a receiver 1110, a communication manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to scheduling sidelink transmission with relay, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a base station communication establishment component 1120, a sidelink grant transmitter 1125, and a feedback receiver 1130. The communication manager 1115 may be an example of aspects of the communication manager 1310 described herein.

The base station communication establishment component 1120 may establish a communication link with a remote UE, the communication link including a sidelink communication link between the remote UE and a relay UE and a relay communication link between the relay UE and the base station.

The sidelink grant transmitter 1125 may transmit, over the relay communication link, an indication of one or more sidelink shared channel resources for a sidelink transmission from the remote UE to the relay UE.

The feedback receiver 1130 may receive an indication that the sidelink transmission was successfully received and decoded by the relay UE based on transmitting the indication of the one or more sidelink shared channel resources.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
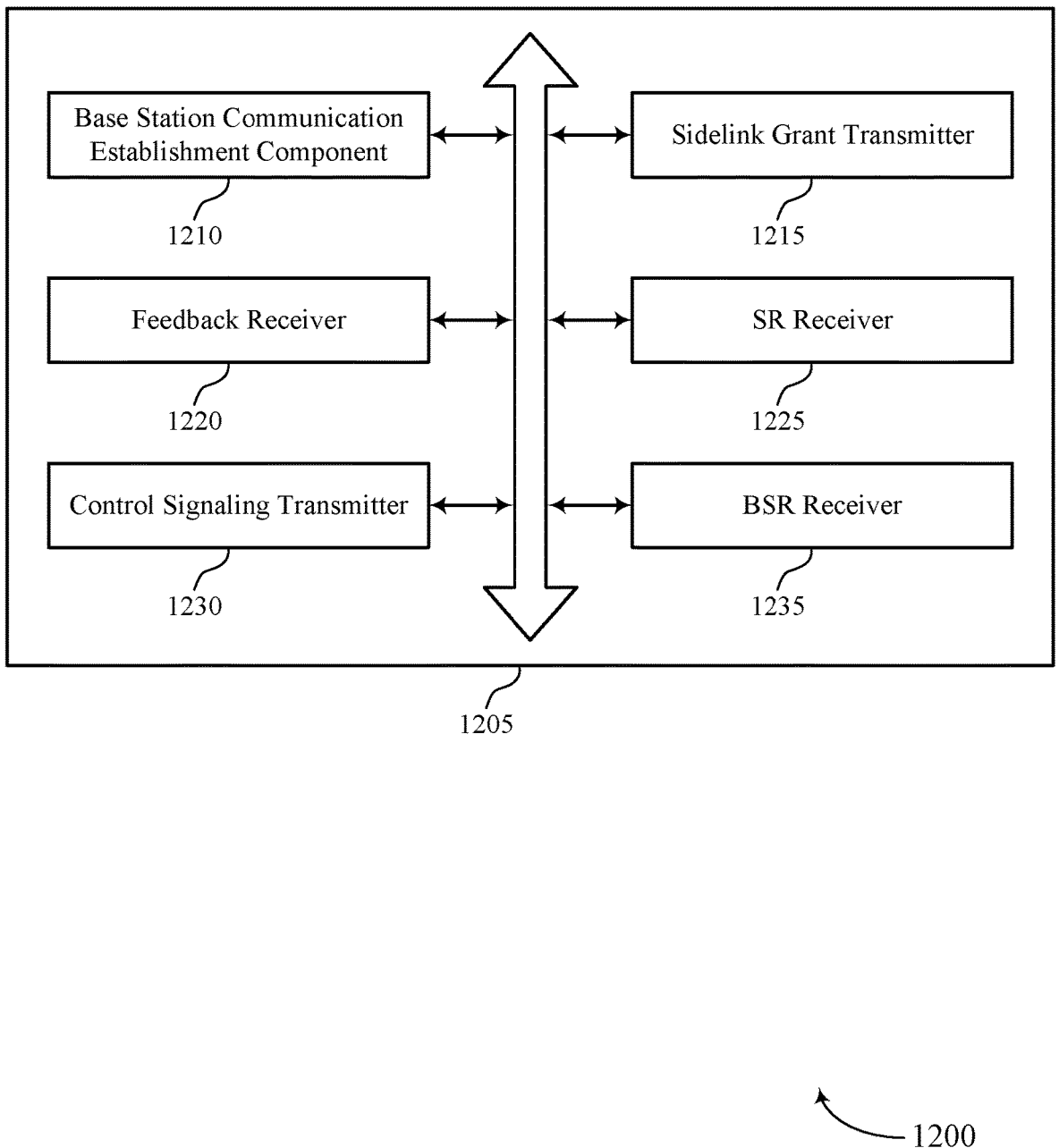
FIG. 12 shows a block diagram of a communication manager that supports scheduling sidelink transmission with relay in accordance with one or more aspects of the present disclosure.

FIG. 12 shows a block diagram 1200 of a communication manager 1205 that supports scheduling sidelink transmission with relay in accordance with one or more aspects of the present disclosure. The communication manager 1205 may be an example of aspects of a communication manager 1015, a communication manager 1115, or a communication manager 1310 described herein. The communication manager 1205 may include a base station communication establishment component 1210, a sidelink grant transmitter 1215, a feedback receiver 1220, a SR receiver 1225, a control signaling transmitter 1230, and a BSR receiver 1235. Each of these modules may communicate, directly or indirectly, with one another (e.g., via one or more buses).

The base station communication establishment component 1210 may establish a communication link with a remote UE, the communication link including a sidelink communication link between the remote UE and a relay UE and a relay communication link between the relay UE and the base station.

The sidelink grant transmitter 1215 may transmit, over the relay communication link, an indication of one or more sidelink shared channel resources for a sidelink transmission from the remote UE to the relay UE. In some examples, the sidelink grant transmitter 1215 may transmit, over the relay communication link, an indication of one or more sidelink feedback channel resources configured for transmission of a second SR from the remote UE to the relay UE. In some examples, the sidelink grant transmitter 1215 may transmit, over the relay communication link, an indication of one or more additional sidelink feedback control channel resources configured for transmission of the second SR from the remote UE to the relay UE. In some examples, the sidelink grant transmitter 1215 may transmit, over the relay communication link, an indication of second one or more sidelink shared channel resources for retransmission of the sidelink transmission, where receiving the indication that the sidelink transmission was successfully received and decoded may be based on transmitting the indication of the second one or more sidelink shared channel resources. In some cases, the sidelink transmission may be a BSR corresponding to data stored at the remote UE.

The feedback receiver 1220 may receive an indication that the sidelink transmission was successfully received and decoded by the relay UE based on transmitting the indication of the one or more sidelink shared channel resources. In some examples, the feedback receiver 1220 may receive, over the relay communication link, an indication that the relay UE has failed to successfully receive and decode the sidelink transmission.

The SR receiver 1225 may receive a SR associated with the remote UE over the relay communication link, where transmitting the indication of the one or more sidelink shared channel resources is based on receiving the SR.

The control signaling transmitter 1230 may transmit a control signal over the relay communications link indicating a priority for each of a set of LCGs of the remote UE. In some examples, the control signaling transmitter 1230 may transmit a control signal to the remote UE indicating a priority for each of a set of LCGs of the remote UE. In some examples, the control signaling transmitter 1230 may transmit a second control signal to another UE indicating the priority of each of the set of LCGs of the remote UE.

In cases where the sidelink transmission includes a BSR, BSR receiver 1235 may receive the BSR over the relay communication link.

Figure 13:
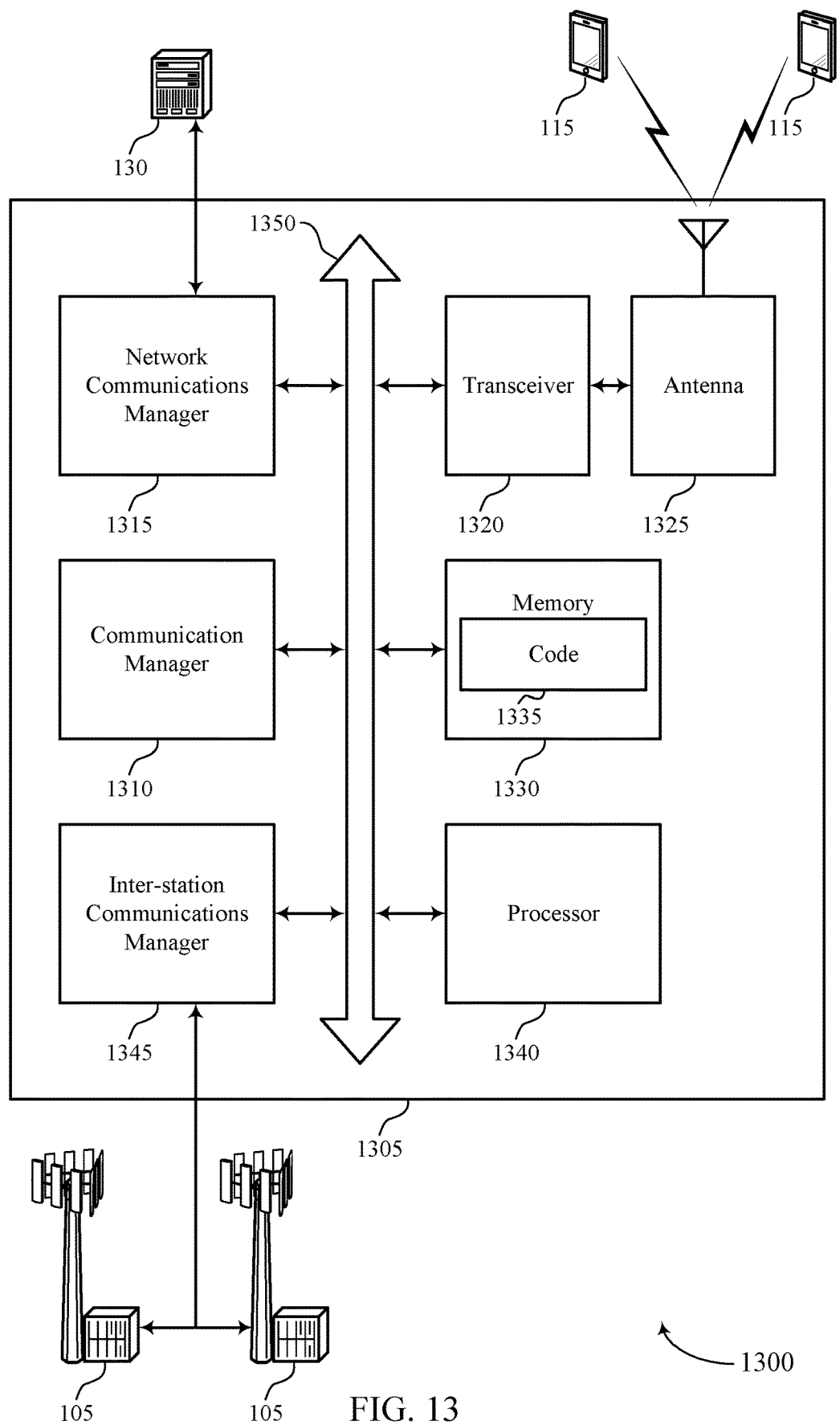
FIG. 13 shows a diagram of a system including a device that supports scheduling sidelink transmission with relay in accordance with one or more aspects of the present disclosure.

FIG. 13 shows a diagram of a system 1300 including a device 1305 that supports scheduling sidelink transmission with relay in accordance with one or more aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may establish a communication link with a remote UE, the communication link including a sidelink communication link between the remote UE and a relay UE and a relay communication link between the relay UE and the base station, transmit, over the relay communication link, an indication of one or more sidelink shared channel resources for a sidelink transmission from the remote UE to the relay UE, and receive an indication that the sidelink transmission was successfully received and decoded by the relay UE based on transmitting the indication of the one or more sidelink shared channel resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting scheduling sidelink transmission with relay).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
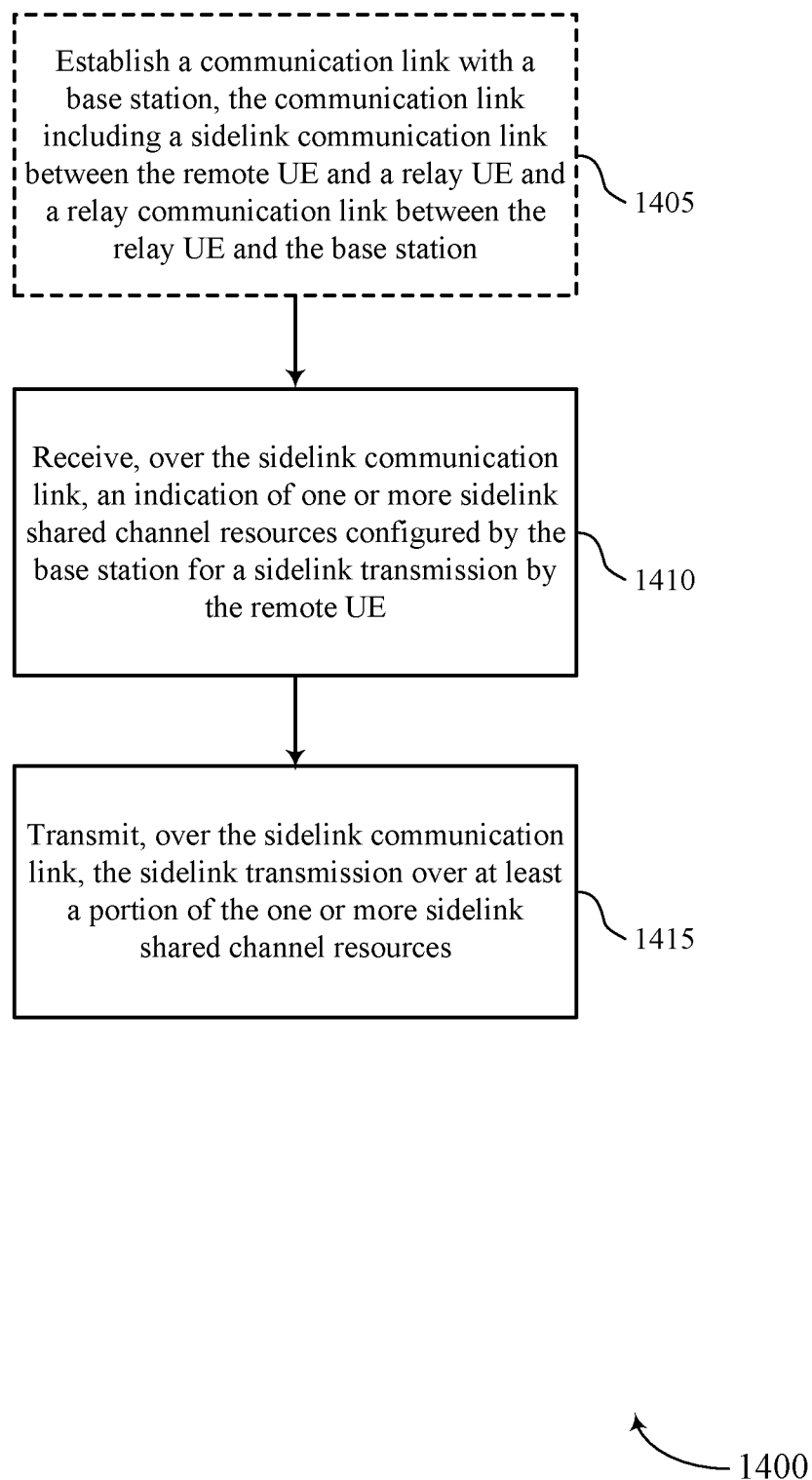
FIGS. 14 through 20 show flowcharts illustrating methods that support scheduling sidelink transmission with relay in accordance with one or more aspects of the present disclosure.

FIG. 14 shows a flowchart illustrating a method 1400 that supports scheduling sidelink transmission with relay in accordance with one or more aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may establish a communication link with a base station, the communication link including a sidelink communication link between the remote UE and a relay UE and a relay communication link between the relay UE and the base station. The operations of 1405 may be performed according to the methods described herein. In some examples, aspects of the operations of 1405 may be performed by an UE communication establishment component as described with reference to FIGS. 6 through 9.

At 1410, the UE may receive, over the sidelink communication link, an indication of one or more sidelink shared channel resources configured by the base station for a sidelink transmission by the remote UE. The operations of 1410 may be performed according to the methods described herein. In some examples, aspects of the operations of 1410 may be performed by a sidelink grant component as described with reference to FIGS. 6 through 9.

At 1415, the UE may transmit, over the sidelink communication link, the sidelink transmission over at least a portion of the one or more configured sidelink shared channel resources based on the criterion being satisfied. The operations of 1415 may be performed according to the methods described herein. In some examples, aspects of the operations of 1415 may be performed by a sidelink transmission component as described with reference to FIGS. 6 through 9.

Figure 15:
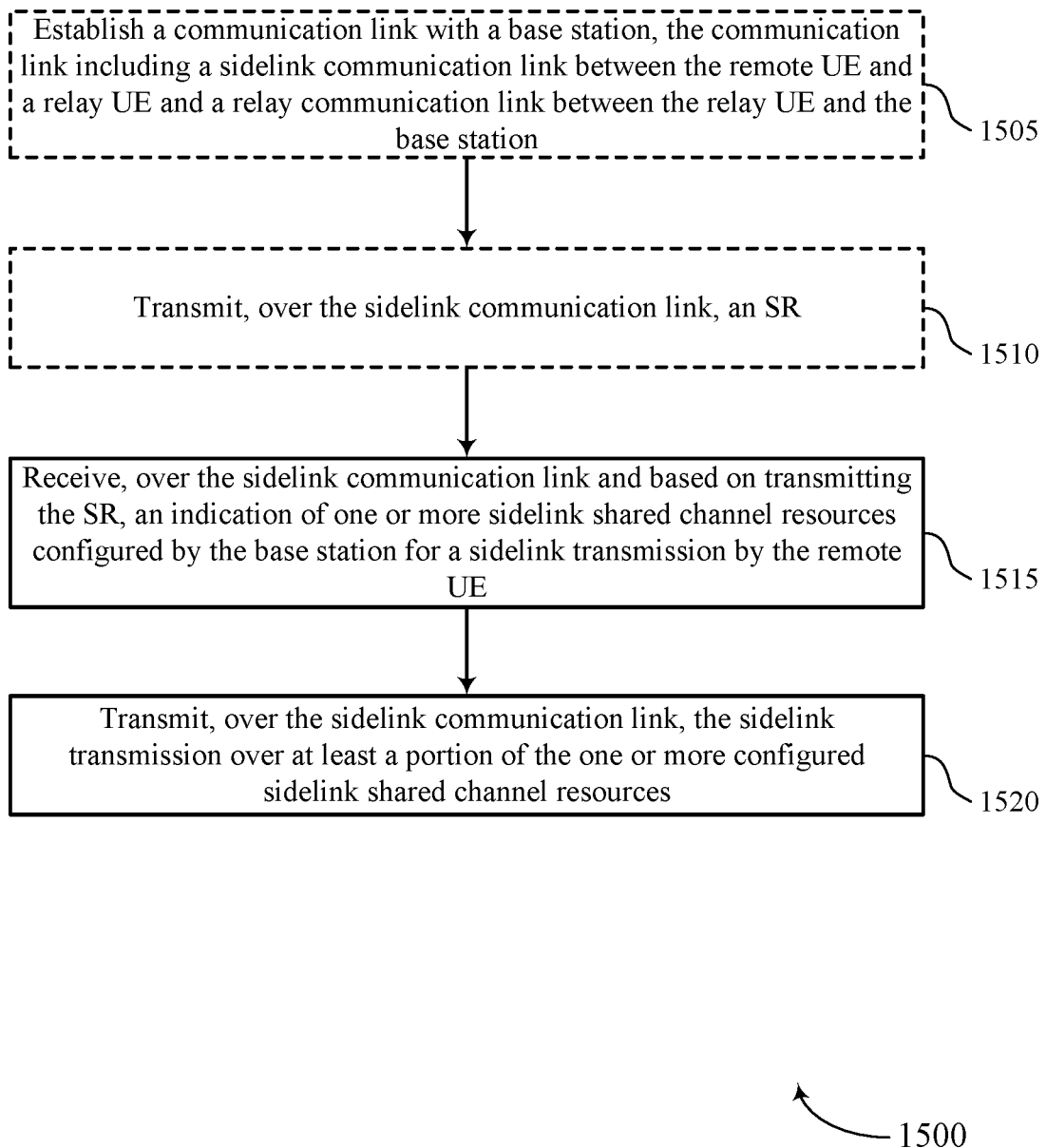

FIG. 15 shows a flowchart illustrating a method 1500 that supports scheduling sidelink transmission with relay in accordance with one or more aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may establish a communication link with a base station, the communication link including a sidelink communication link between the remote UE and a relay UE and a relay communication link between the relay UE and the base station. The operations of 1505 may be performed according to the methods described herein. In some examples, aspects of the operations of 1505 may be performed by an UE communication establishment component as described with reference to FIGS. 6 through 9.

At 1510, the UE may transmit, over the sidelink communication link, an SR. The operations of 1510 may be performed according to the methods described herein. In some examples, aspects of the operations of 1510 may be performed by a SR component as described with reference to FIGS. 6 through 9.

At 1515, the UE may receive, over the sidelink communication link, an indication of one or more sidelink shared channel resources configured by the base station for a sidelink transmission by the remote UE. The operations of 1515 may be performed according to the methods described herein. In some examples, aspects of the operations of 1515 may be performed by a sidelink grant component as described with reference to FIGS. 6 through 9.

At 1520, the UE may transmit, over the sidelink communication link, the sidelink transmission over at least a portion of the one or more configured sidelink shared channel resources based on the criterion being satisfied. The operations of 1520 may be performed according to the methods described herein. In some examples, aspects of the operations of 1520 may be performed by a sidelink transmission component as described with reference to FIGS. 6 through 9.

Figure 16:
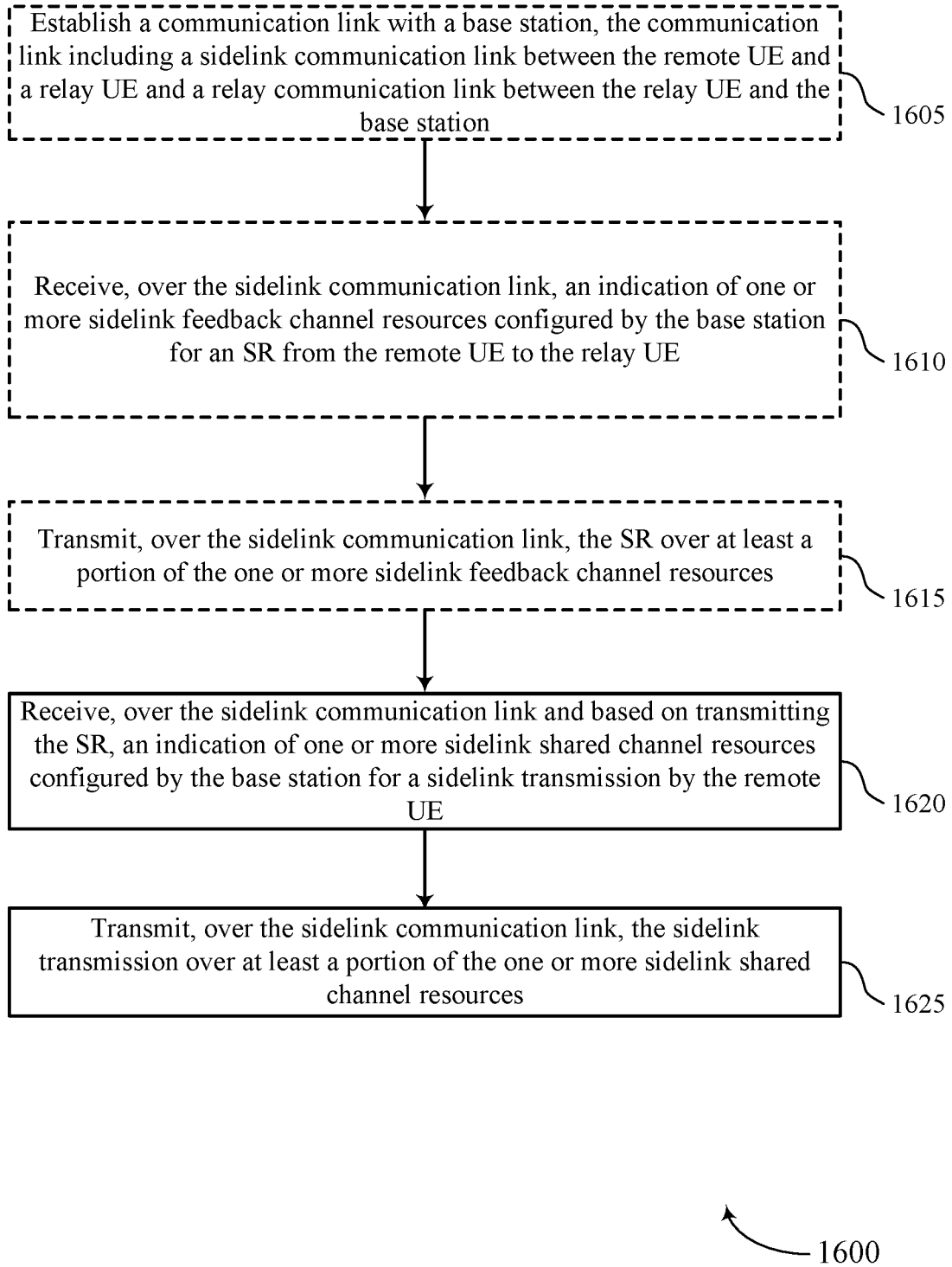

FIG. 16 shows a flowchart illustrating a method 1600 that supports scheduling sidelink transmission with relay in accordance with one or more aspects of the present disclosure. The operations of method 1600 may be implemented by a UE 115 or its components as described herein. For example, the operations of method 1600 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1605, the UE may establish a communication link with a base station, the communication link including a sidelink communication link between the remote UE and a relay UE and a relay communication link between the relay UE and the base station. The operations of 1605 may be performed according to the methods described herein. In some examples, aspects of the operations of 1605 may be performed by an UE communication establishment component as described with reference to FIGS. 6 through 9.

At 1610, the UE may receive, over the sidelink communication link, an indication of one or more sidelink feedback channel resources configured by the base station for an SR from the remote UE to the relay UE. The operations of 1610 may be performed according to the methods described herein. In some examples, aspects of the operations of 1610 may be performed by a sidelink grant component as described with reference to FIGS. 6 through 9.

At 1615, the UE may transmit, over the sidelink communication link, the SR over at least a portion of the one or more sidelink feedback channel resources. The operations of 1615 may be performed according to the methods described herein. In some examples, aspects of the operations of 1615 may be performed by a SR component as described with reference to FIGS. 6 through 9.

At 1620, the UE may receive, over the sidelink communication link and based on transmitting the SR, an indication of one or more sidelink shared channel resources configured by the base station for a sidelink transmission by the remote UE. The operations of 1620 may be performed according to the methods described herein. In some examples, aspects of the operations of 1620 may be performed by a sidelink grant component as described with reference to FIGS. 6 through 9.

At 1625, the UE may transmit, over the sidelink communication link, the sidelink transmission over at least a portion of the one or more configured sidelink shared channel resources. The operations of 1625 may be performed according to the methods described herein. In some examples, aspects of the operations of 1625 may be performed by a sidelink transmission component as described with reference to FIGS. 6 through 9.

Figure 17:
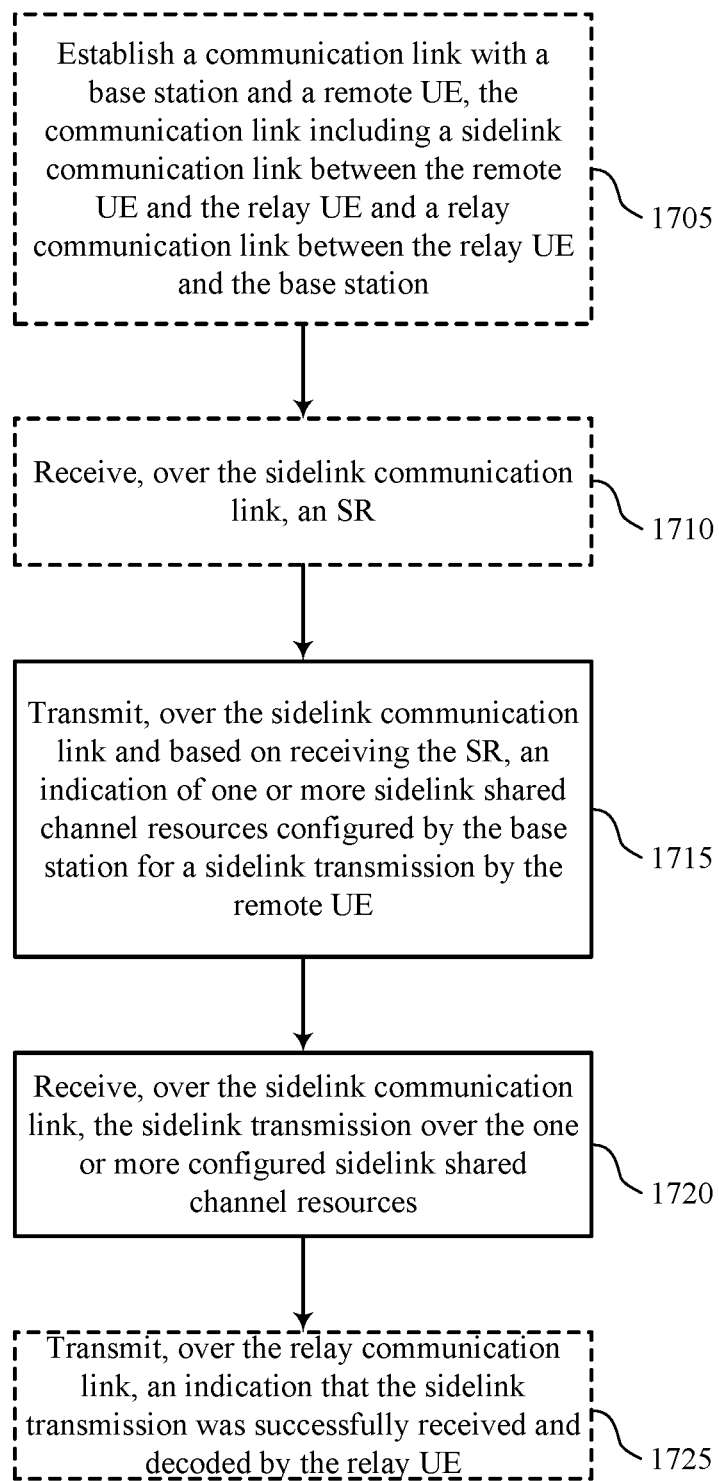

FIG. 17 shows a flowchart illustrating a method 1700 that supports scheduling sidelink transmission with relay in accordance with one or more aspects of the present disclosure. The operations of method 1700 may be implemented by a UE 115 or its components as described herein. For example, the operations of method 1700 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1705, the UE may establish a communication link with a base station and a remote UE, the communication link including a sidelink communication link between the remote UE and the relay UE and a relay communication link between the relay UE and the base station. The operations of 1705 may be performed according to the methods described herein. In some examples, aspects of the operations of 1705 may be performed by an UE communication establishment component as described with reference to FIGS. 6 through 9.

At 1710, the UE may receive, over the sidelink communication link, an SR. The operations of 1710 may be performed according to the methods described herein. In some examples, aspects of the operations of 1710 may be performed by an SR component as described with reference to FIGS. 6 through 9.

At 1715, the UE may transmit, over the sidelink communication link, an indication of one or more sidelink shared channel resources configured by the base station for a sidelink transmission by the remote UE. The operations of 1715 may be performed according to the methods described herein. In some examples, aspects of the operations of 1715 may be performed by a sidelink grant component as described with reference to FIGS. 6 through 9.

At 1720, the UE may receive, over the sidelink communication link, the sidelink transmission over the one or more configured sidelink shared channel resources. The operations of 1720 may be performed according to the methods described herein. In some examples, aspects of the operations of 1720 may be performed by a sidelink transmission component as described with reference to FIGS. 6 through 9.

At 1725, the UE may transmit, over the relay communication link, an indication that the sidelink transmission was successfully received and decoded by the relay UE. The operations of 1725 may be performed according to the methods described herein. In some examples, aspects of the operations of 1725 may be performed by a feedback component as described with reference to FIGS. 6 through 9.

Figure 18:
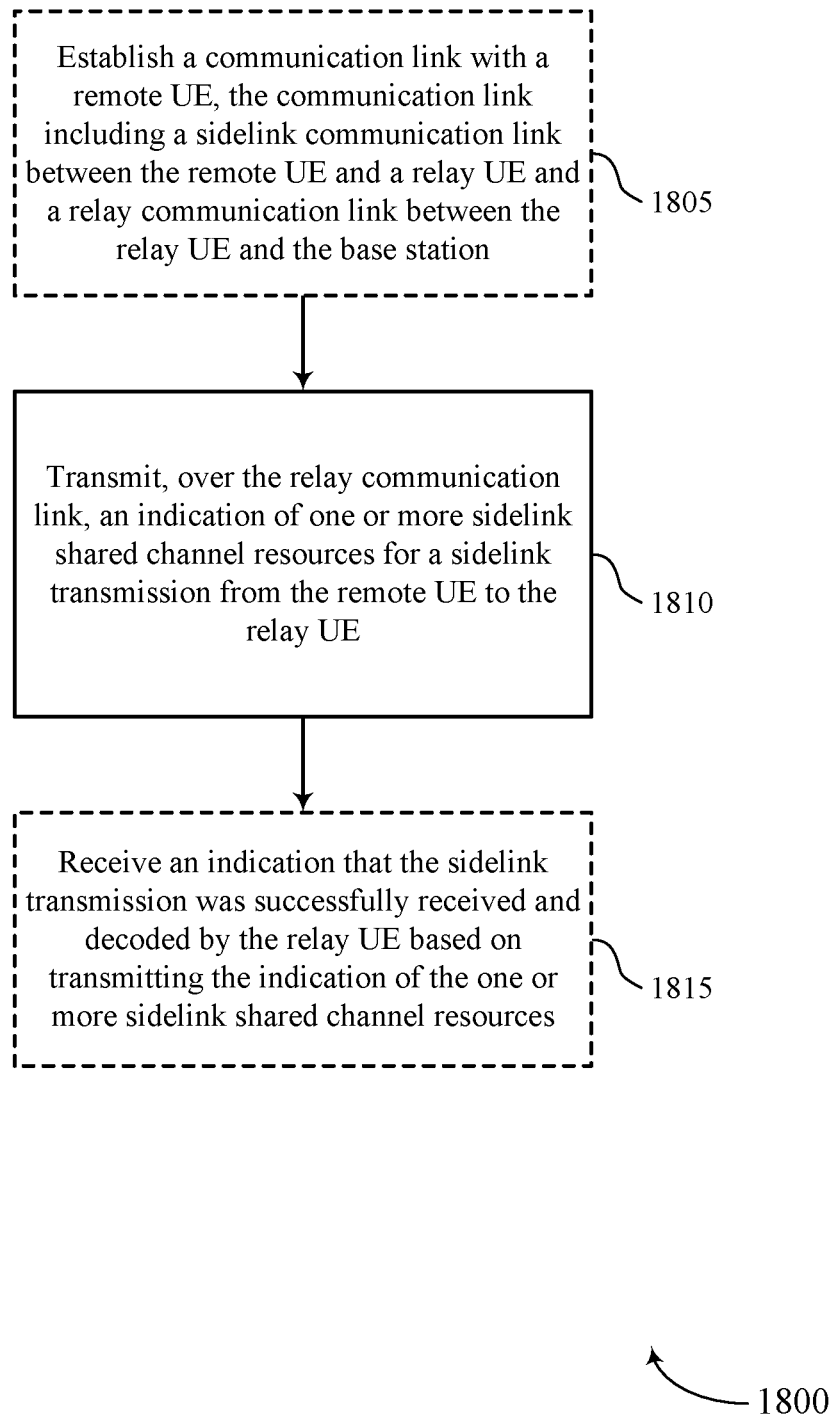

FIG. 18 shows a flowchart illustrating a method 1800 that supports scheduling sidelink transmission with relay in accordance with one or more aspects of the present disclosure. The operations of method 1800 may be implemented by a base station 105 or its components as described herein. For example, the operations of method 1800 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1805, the base station may establish a communication link with a remote UE, the communication link including a sidelink communication link between the remote UE and a relay UE and a relay communication link between the relay UE and the base station. The operations of 1805 may be performed according to the methods described herein. In some examples, aspects of the operations of 1805 may be performed by a base station communication establishment component as described with reference to FIGS. 10 through 13.

At 1810, the base station may transmit, over the relay communication link, an indication of one or more sidelink shared channel resources for a sidelink transmission from the remote UE to the relay UE. The operations of 1810 may be performed according to the methods described herein. In some examples, aspects of the operations of 1810 may be performed by a sidelink grant transmitter as described with reference to FIGS. 10 through 13.

At 1815, the base station may receive an indication that the sidelink transmission was successfully received and decoded by the relay UE based on transmitting the indication of the one or more sidelink shared channel resources. The operations of 1815 may be performed according to the methods described herein. In some examples, aspects of the operations of 1815 may be performed by a feedback receiver as described with reference to FIGS. 10 through 13.

Figure 19:
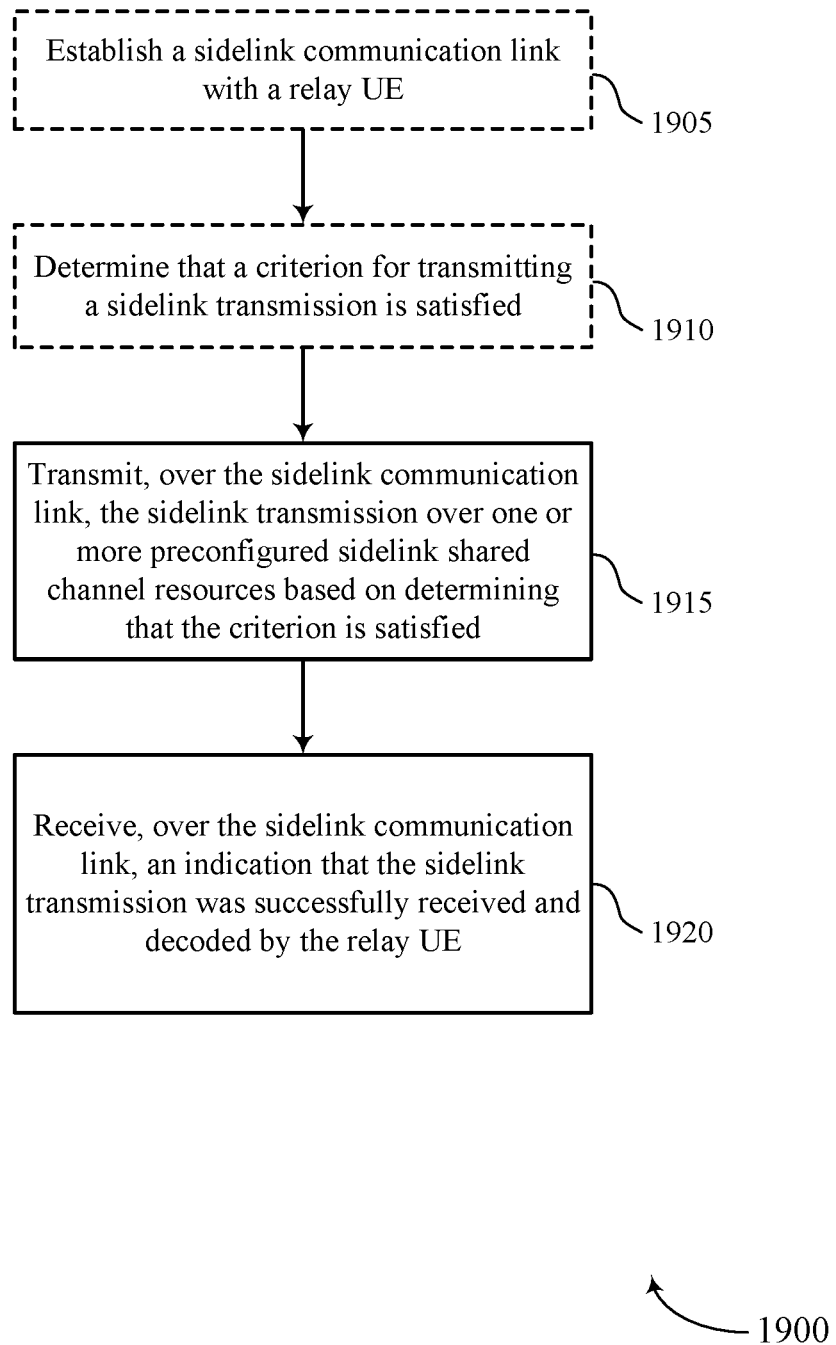

FIG. 19 shows a flowchart illustrating a method 1900 that supports scheduling sidelink transmission with relay in accordance with one or more aspects of the present disclosure. The operations of method 1900 may be implemented by a remote UE 115 or its components as described herein. For example, the operations of method 1900 may be performed by a communication manager as described with reference to FIGS. 6 through 9. In some examples, a remote UE may execute a set of instructions to control the functional elements of the remote UE to perform the described functions. Additionally or alternatively, a UE may perform aspects of the described functions using special-purpose hardware.

At 1905. the remote UE may establish a sidelink communication link with a relay UE. The operations of 1905 may be performed according to the methods as described herein. In some examples, aspects of the operations of 1905 may be performed by a UE communication establishment component as described with reference to FIGS. 6 through 9.

At 1910, the remote UE may determine that a criterion for transmitting a sidelink transmission is satisfied. The operations of 1910 may be performed according to the methods as described herein. In some examples, aspects of the operations of 1910 may be performed by a criterion determination component as described with reference to FIGS. 6 through 9.

At 1915, the remote UE may transmit, over the sidelink communication link, the sidelink transmission over one or more preconfigured sidelink shared channel resources based on determining that the criterion is satisfied. The operations of 1915 may be performed according to the methods as described herein. In some examples, aspects of the operations of 1915 may be performed by a sidelink transmission component as described with reference to FIGS. 6 through 9.

At 1920, the remote UE may receive, over the sidelink communication link, an indication that the sidelink transmission was successfully received and decoded by the relay UE. The operations of 1920 may be performed according to the methods as described herein. In some examples, aspects of the operations of 1920 may be performed by a feedback component as described with reference to FIGS. 6 through 9.

Figure 20:
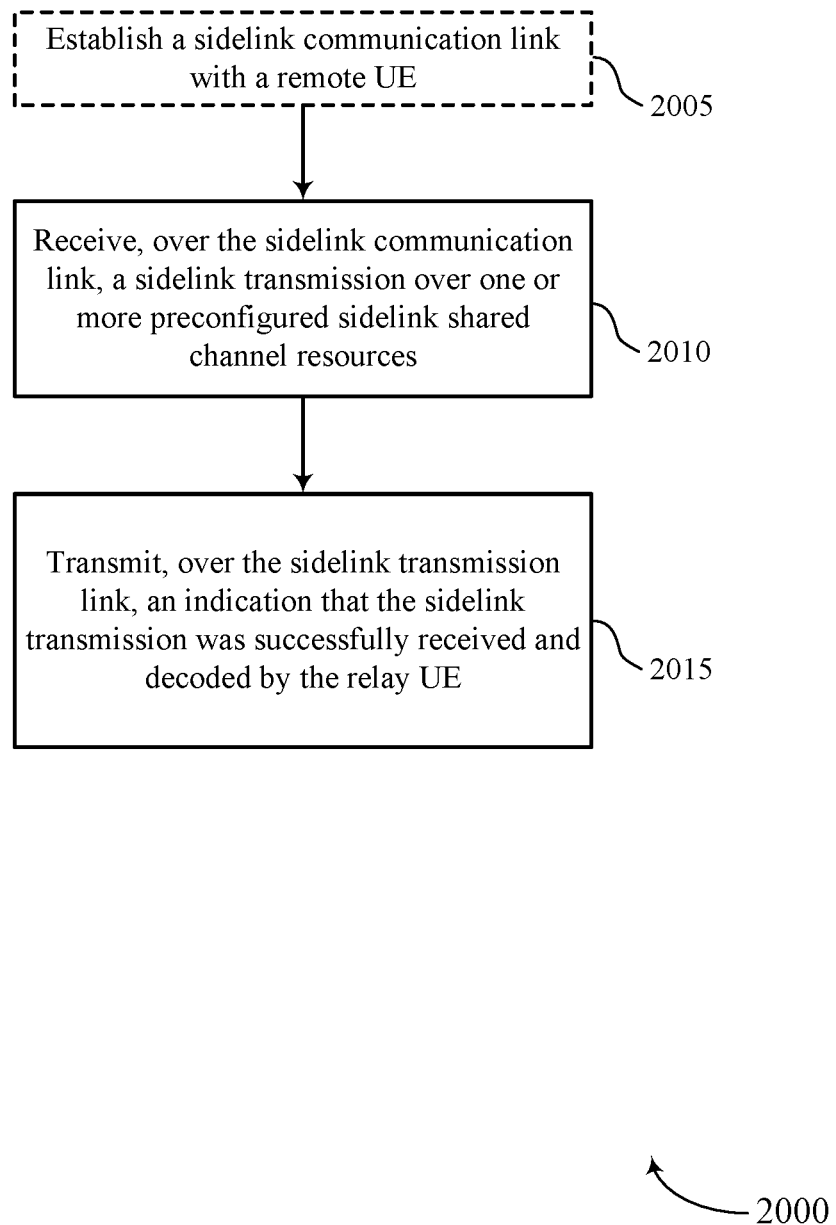

FIG. 20 shows a flowchart illustrating a method 1900 that supports scheduling sidelink transmission with relay in accordance with one or more aspects of the present disclosure. The operations of method 2000 may be implemented by a relay UE 115 or its components as described herein. For example, the operations of method 2000 may be performed by a communication manager as described with reference to FIGS. 6 through 9. In some examples, a relay UE may execute a set of instructions to control the functional elements of the relay UE to perform the described functions. Additionally or alternatively, a UE may perform aspects of the described functions using special-purpose hardware.

At 2005, the relay UE may establish a sidelink communication link with a remote UE. The operations of 2005 may be performed according to the methods described herein. In some examples, aspects of the operations of 2005 may be performed by a UE communication establishment component as described with reference to FIGS. 6 through 9.

At 2010, the relay UE may receive, over the sidelink communication link, a sidelink transmission over one or more preconfigured sidelink shared channel resources. The operations of 2010 may be performed according to the methods described herein. In some examples, aspects of the operations of 2010 may be performed by a sidelink transmission component as described with reference to FIGS. 6 through 9.

At 2015, the relay UE may transmit, over the sidelink transmission link, an indication that the sidelink transmission was successfully received and decoded by the relay UE. The operations of 2015 may be performed according to the methods described herein. In some examples, aspects of the operations of 2015 may be performed by a feedback component as described with reference to FIGS. 6 through 9.

Figure 21:
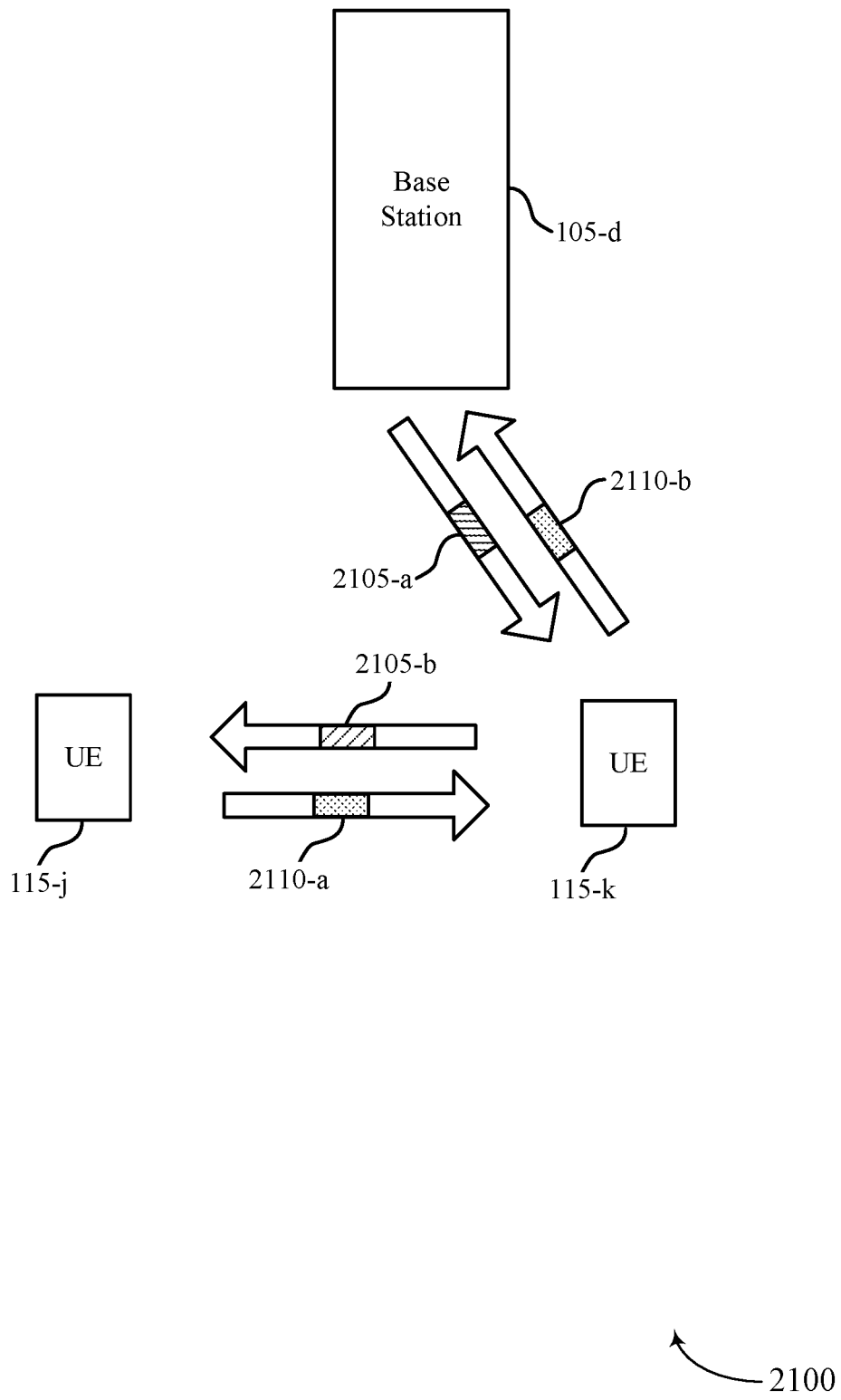
FIG. 21 illustrates an example of a wireless communications system that supports configurations for sidelink scheduling requests in accordance with one or more aspects of the present disclosure.

FIG. 21 illustrates an example of a wireless communications system 2100 that supports configurations for sidelink scheduling requests in accordance with one or more aspects of the present disclosure. In some examples, wireless communications system 2100 may implement aspects of wireless communications system 100. For example, wireless communications system 2100 may include a base station 105-$d$, a UE 115-$k$, and a UE 115-$j$, which may be examples of a base station 105 and UEs 115 described with reference to FIG. 1. Base station 105-$d$ may communicate with UE 115-$k$ over a direct communication link and may communicate with UE 115-$j$ over an indirect communication link, where UE 115-$j$ may represent a remote UE 115 and UE 115-$k$ may represent a relay UE 115. Although a relay UE 115-$k$ is described herein, there may be examples where another device (e.g., a relay node or a relay base station 105) performs the functions of relay UE 115-$k$.

For example, UE 115-$j$ and base station 105-$d$ may communicate via a sidelink link between UEs 115-$k$ and 115-$j$ and a relay link (e.g., direct link) between UE 115-$k$ and base station 105-$d$. In the uplink, UE 115-$j$ may transmit information (e.g., one or more messages) to UE 115-$k$ over the sidelink link, and UE 115-$k$ may relay or forward the information to base station 105-$d$ over the relay link. In the downlink, base station 105-$d$ may transmit information to UE 115-$k$ over the relay link and UE 115-$k$ may relay or forward the information to UE 115-$j$ over the sidelink link. In some cases, UE 115-$j$ may be located outside of a coverage area of base station 105-$d$ and may communicate with base station 105-$d$ via the communication link with UE 115-$k$ (e.g., the indirect communication link). In some other cases, UE 115-*j* may be located within a coverage area of base station 105-*d* and may establish a direct communication link with base station 105-*d* (e.g., in addition to the indirect communication link). In such cases, UE 115-*j* may communicate with base station 105-*d* via the communication link with UE 115-*k*, via the direct communication link, or both.

For uplink transmissions from UE 115-*j* to base station 105-*d* over the indirect communication link, base station 105-*d* may dynamically schedule uplink resources on the sidelink link between UEs 115-*k* and 115-*j*, may preconfigure one or more uplink grants or resources for the sidelink link, or may omit scheduling or configuring any uplink resources (e.g., the UEs 115-*k* and 115-*j* may schedule uplink resources). Uplink transmissions on the relay link between UE 115-*k* and base station 105-*d* may include a MAC instance that is shared between UE 115-*k* and any remote UEs 115 (e.g., including UE 115-*j*) communicating with base station 105-*d* via UE 115-*k* or may include separate MAC instances for different remote UEs 115 (e.g., UE 115-*j*).

Data for uplink transmissions may arrive at a buffer of UE 115-*j*, which may trigger a BSR if the buffer is empty when the data arrives or if the priority of the data is higher than that of other data on any other logical channels. In cases where uplink transmissions on the relay link or the sidelink are dynamically scheduled by base station 105-*d*, the BSR may represent or include a request sidelink or other resources from base station 105-*d* for transmission of the data. If sidelink resources are available for transmission of the BSR, or if sidelink resources (e.g., physical sidelink control channel (PSCCH) resources) are preconfigured for a BSR, UE 115-*j* may transmit the BSR to UE 115-*k* over at least a portion of the available sidelink resources. UE 115-*k* may forward or relay the BSR to base station 105-*d*, and base station 105-*d* may configure or grant uplink resources (e.g., resources on the sidelink link and/or relay link) for transmission of the data based on the received BSR. In some cases, a method for transmitting the BSR from UE 115-*k* to base station 105-*d* may depend on a method for transmitting the BSR from UE 115-*j* to base station 105-*d*.

If sidelink resources are unavailable for transmission of the BSR, the BSR may remain pending at UE 115-*j* and may trigger transmission of a scheduling request 2110 to base station 105-*d* (e.g., via UE 115-*k*). Thus, methods or resource configurations for transmission of a scheduling request 2110 over a sidelink link, such as the sidelink link between UEs 115-*k* and 115-*j*, may support transmission of the BSR and the corresponding data and may further support communications between UE 115-*j* and base station 105-*d*.

The present disclosure provides methods and resource configurations for transmitting a scheduling request 2110 over sidelink resources. After or as part of establishing the communication link between UE 115-*j*, UE 115-*k*, and base station 105-*d*, base station 105-*d* may configure resources on the sidelink link for transmission of one or more scheduling requests 2110. For example, base station 105-*d* may configure the resources on a sidelink feedback channel (e.g., physical sidelink feedback channel (PSFCH)) or may configure the resources on any location in a time and frequency domain.

In some cases, base station 105-*d* may configure multiple sets of resources, where each set of resources may be associated with a QoS or an LCP, or ranges thereof. Thus, a device receiving a scheduling request 2110 (e.g., UE 115-*k*) on the sidelink link may implicitly determine a QoS or an LCP associated with the scheduling request 2110 based on a set of resources used for the scheduling request 2110. For example, UE 115-*j* may select a set of resources for transmitting a scheduling request 2110, where the set of resources may correspond to a QoS or an LCP of the scheduling request 2110. UE 115-*j* may transmit the scheduling request 2110 to UE 115-*k*, and UE 115-*k* may identify the corresponding QoS or LCP based on the set of resources on which the scheduling request 2110 is received. Each set of resources may also be configured with its own prohibit time for suppressing a scheduling request 2110. In some cases, if the scheduling request includes multiple bits, a field of the scheduling request may indicate a QoS or LCP for the scheduling request.

Base station 105-*d* may transmit an indication 2105-*a* of the configured resources to UE 115-*k* (e.g., over the relay link), and UE 115-*k* may transmit (e.g., forward or relay) an indication 2105-*b* of the configured resources to UE 115-*j* (e.g., over the sidelink link). If the resources are configured at any location in the time and frequency domain, the indication 2105 of the configured resources may include a bitmap to indicate the configured resources. For example, the bitmap may indicate one or more resource blocks (RBs) (e.g., physical RBs (PRBs)) allocated to the configured resources, as well as a cyclic shift associated with the one or more RBs.

UE 115-*j* may identify uplink data for transmission to base station 105-*d*, and may trigger a BSR based on the uplink data and as described herein. UE 115-*j* may identify that resources on the sidelink link are unavailable for transmission of the BSR, and may transmit a scheduling request 2110-*a* based on the unavailability of the resources. For example, UE 115-*j* may transmit the scheduling request 2110-*a* to UE 115-*k* over the sidelink link, using one or more of the configured resources (e.g., a portion of the configured resources) configured via the indication 2105. UE 115-*k* may receive the scheduling request 2110-*a* and may transmit (e.g., forward or relay) a scheduling request 2110-*b* to base station 105-*d* requesting sidelink resources for transmission of the BSR from UE 115-*j* to UE 115-*k*.

UE 115-*j* may maintain a counter for transmissions of scheduling requests 2110 for the BSR, and may initiate the counter when a first scheduling request 2110 (e.g., scheduling request 2110-*a*) is triggered or transmitted. UE 115-*j* may increment a value of the counter each time UE 115-*j* transmits a scheduling request 2110 to UE 115-*k*. If base station 105-*d* and/or UE 115-*k* successfully receives a scheduling request 2110 from UE 115-*j*, UE 115-*j* may reset the counter to an initial value (e.g., upon notification of successful reception of the scheduling request). In some cases, UE 115-*j* may determine that the scheduling request is successfully received based on receiving an assignment (e.g., grant) of sidelink resources for the BSR. If the counter reaches a threshold value (e.g., maximum value) before being reset, UE 115-*j* may release any resources on a sidelink feedback and/or shared channel (e.g., on a PSFCH or on a physical sidelink shared channel (PSSCH)), and may transmit a notification to UE 115-*k* that the resources are released. UE 115-*k* may relay the notification to base station 105-*d*.

In some cases, base station may successfully receive a scheduling request 2110 from UE 115-*j* (e.g., via the relay link with UE 115-*k*) and may assign or grant one or more resources on the sidelink link for transmission of the BSR from UE 115-*j* to UE 115-*k*. UE 115-*j* may transmit the BSR to UE 115-*k* using the one or more assigned resources and UE 115-*k* may transmit the BSR (e.g., forward or relay the BSR) to base station 105-*d*. Based on the BSR, base station 105-*d* may assign or grant one or more sidelink resources and/or relay resources for transmission of the uplink data from UE 115-*j* to UE 115-*k*, and then from UE 115-*k* to base station 105-*d*. UE 115-*j* may receive the grant of resources and may transmit the uplink data accordingly.

Figure 22:
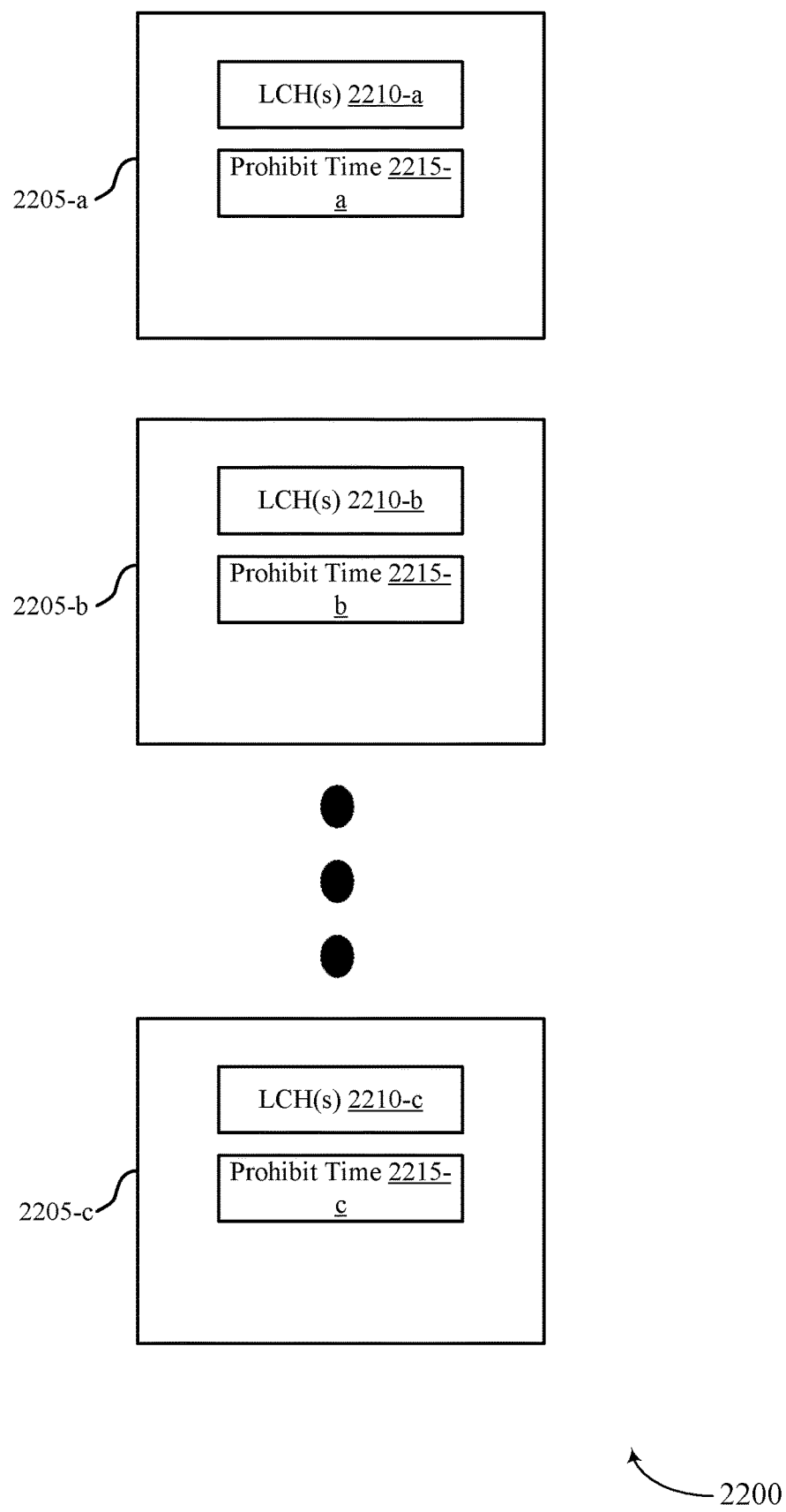
FIG. 22 illustrates an example of a sidelink resource configuration that supports configurations for sidelink scheduling requests in accordance with one or more aspects of the present disclosure.

FIG. 22 illustrates an example of a sidelink resource configuration 2200 that supports configurations for sidelink scheduling requests in accordance with one or more aspects of the present disclosure. In some examples, sidelink resource configuration 2200 may implement or be implemented by aspects of wireless communications systems 100 or 2100. For example, a base station 105 may configure sidelink resource configuration 2200 for communications with a remote UE 115, via a communication link that may include a relay UE 115 to relay the communications to and from the remote UE 115. The base station 105 may transmit an indication of the sidelink resource configuration to the relay UE 115, and the relay UE 115 may forward or transmit the indication to the remote UE 115, as described with reference to FIG. 21. The base station 105 and UEs 115 may be examples of a base station 105 and UEs 115 described herein with reference to FIGS. 1 and 21. Although a relay UE 115 is described herein, there may be examples where another device (e.g., a relay node or a relay base station 105) performs the functions of relay UE 115.

The base station 105 may configure multiple sets of resources 2205 to enable QoS or LCP differentiation. For example, the base station 105 may configure multiple sets of resources 2205 and may associate each set of resources 2205 with a QoS or an LCP, or ranges thereof. In one example, the base station 105 may configure a first set of resources 2205-*a*, a second set of resources 2205-*b*, and so forth until an nth set of resources 2205-*c*. The base station 105 may associate each set of resources 2205 with a QoS or an LCP, or with a range of QoS values or a range of LCPs. For example, the base station 105 may associate each set of resources 2205 with different sets of one or more LCHs 2210. Each set of LCHs 2210 (e.g., with each set associated with a different set of resources 2205) may include LCHs 2210 with similar LCPs or QoS. In some cases, an LCH 2210 may be associated with one set of resources 2205, and in some cases, an LCH 2210 may be associated with multiple sets of resources 2205 (e.g., the LCH 2210 may be included in multiple sets of LCHs 2210).

A device receiving a scheduling request (e.g., the relay UE 115) on the sidelink link may implicitly determine a QoS or an LCP associated with the scheduling request based on a set of resources 2205 used for the scheduling request. For example, the remote UE 115 may select the first set of resources 2205-*a* for transmitting a first scheduling request, where the first set of resources 2205-*a* may include a first set of one or more LCHs 2210-*a* associated with a first range of LCPs. The remote UE 115 may transmit the scheduling request to the relay UE 115 using the first set of resources 2205-*a*, and the relay UE 115 may identify the corresponding QoS or LCP (e.g., or range thereof) based on the first set of resources 2205-*a*. The relay UE 115 may prioritize the scheduling request based on the identified priority.

The base station 105 may additionally or alternatively associate a prohibit time 2215 with each set of resources 2205 (e.g., each set of resources 2205 may have its own prohibit time 2215). A prohibit time may be or represent an amount of time for which the remote UE 115 suppresses transmission of a scheduling request. For example, the remote UE 115 may initiate a prohibit timer for a set of resources 2205, which may run until reaching a prohibit time 2215 associated with the set of resources 2205. While the prohibit timer is running, the remote UE 115 may refrain from triggering a scheduling request based on a pending BSR at the remote UE 115.

Figure 23:
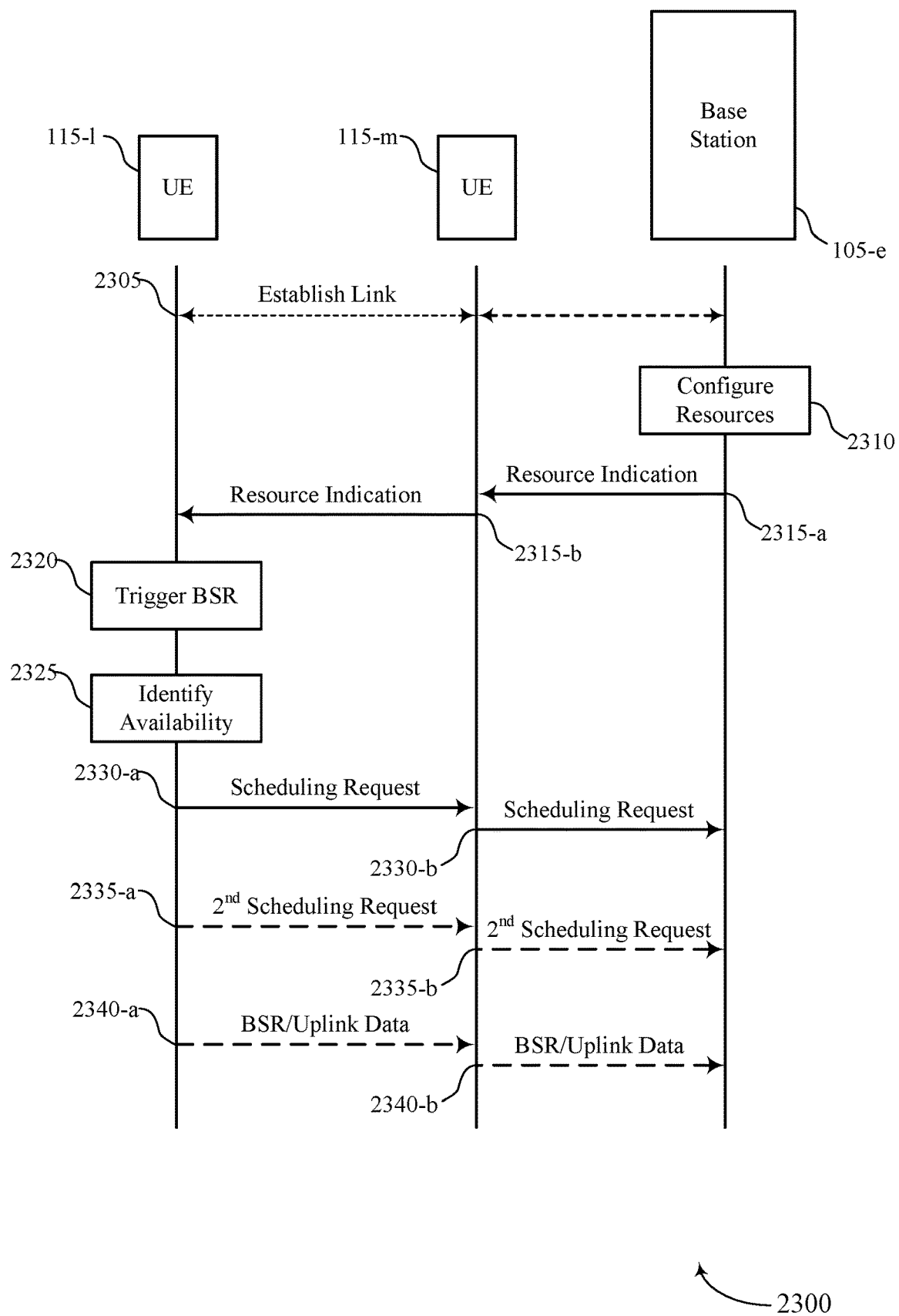
FIG. 23 illustrates an example of a process flow that supports configurations for sidelink scheduling requests in accordance with one or more aspects of the present disclosure.

FIG. 23 illustrates an example of a process flow 2300 that supports configurations for sidelink scheduling requests in accordance with one or more aspects of the present disclosure. In some examples, process flow 2300 may implement or be implemented by aspects of wireless communications systems 100 or 2100. In some cases, process flow 2300 may implement or be implemented by aspects of sidelink resource configuration 2200. Process flow may be implemented by a base station 105-*e*, a UE 115-*l*, and a UE 115-*m*, where UE 115-*l* may represent a remote UE 115 and UE 115-*m* may represent a relay UE 115. Base station 105-*e* and UEs 115-*l* and 115-*m* may represent examples of a base station 105 and UEs 115 described herein with reference to FIGS. 1 and 21-22. Base station 105-*e* may communicate with UE 115-*l* via a communication link that may include UE 115-*m* (e.g., to relay the communications to and from UE 115-*l*). Although a relay UE 115-*m* is described herein, there may be examples where another device (e.g., a relay node or a relay base station 105) performs the functions of relay UE 115-*m*.

In the following description of process flow 2300, the operations between UE 115-1, UE 115-*m*, and base station 105-*b* may be transmitted in a different order than the order shown, or the operations performed by UE 115-*l*, UE 115-*m*, and base station 105-*b* may be performed in different orders or at different times. Specific operations may also be left out of process flow 2300, or other operations may be added to process flow 2300. Although UE 115-*l*, UE 115-*m*, and base station 105-*b* are shown performing the operations of process flow 2300, some aspects of some operations may also be performed by one or more other wireless devices.

At 2305, base station 105-*b*, UE 115-*l*, and UE 115-*m* may establish a communication link, where the communication link may include a sidelink link between UE 115-1 and UE 115-*m* and a relay link between UE 115-*m* and base station 105-*b*.

At 2310, base station 105-*b* may configure, based on establishing the communication link, one or more resources for transmission of a scheduling request from UE 115-1 to UE 115-*m* over the sidelink link. For example, base station 105-*b* may configure the one or more resources to be on a sidelink feedback channel (e.g., PSFCH) or on any location in a time and frequency domain. In some cases, as described with reference to FIGS. 2 and 3, base station 105-*b* may configure the one or more resources into one or more sets of resources, where each set of resources may be associated with a set of LCHs (e.g., and associated LCP or QoS) and a prohibit time.

At 2315-*a*, base station 105-*b* may transmit, over the relay link and to UE 115-*m*, an indication of the one or more configured resources. In some cases, the indication may include a bitmap indicating the one or more configured resources (e.g., one or more RBs corresponding to the one or more resources) and a corresponding cyclic shift.

At 2315-*b*, UE 115-*m* may transmit, over the sidelink link and to UE 115-*l*, the indication of the one or more configured resources.

At 2320, UE 115-*l* may trigger a BSR for transmission of data to base station 105-*b* over the communication link. For example, UE 115-*l* may identify or receive data in a buffer of UE 115-*l* and may trigger the BSR based on the identified data (e.g., based on the identified data being new data or based on a priority of the identified data).

At 2325, UE 115-*l* may identify, based on triggering the BSR, that resources on the sidelink link are unavailable for transmission of the BSR. For example, base station 105-*b* may dynamically assign or grant resources on the sidelink link, and UE 115-*l* may identify that the assigned resources are unassociated with transmission of a BSR or that resources on the sidelink link are unassigned to UE 115-*l*.

At 2330-*a*, UE 115-*l* may transmit, to UE 115-*m* and over the sidelink link, a scheduling request using at least a portion of the one or more configured resources and based on identifying that the resources on the sidelink link are unavailable. For example, UE 115-*l* may transmit the scheduling request based on the one or more configured resources indicated by base station 105-*b*. In some cases, UE 115-*l* may select the at least a portion of the one or more configured resources based on a QoS or an LCP associated with the scheduling request, as described herein with reference to FIGS. 21 and 22. In some cases, UE 115-*l* may initiate a counter based on transmitting the scheduling request.

At 2330-*b*, UE 115-*m* may transmit (e.g., relay or forward) the scheduling request to base station 105-*b* over the relay link based on reception of the scheduling request over the sidelink link. In some cases, the received scheduling request may indicate to UE 115-*m* that resources on the sidelink link are unavailable for transmission of the BSR, and UE 115-*m* may transmit the scheduling request to base station 105-*b* based on the indication that the resources are unavailable.

At 2335-*a*, in some cases, UE 115-*l* may transmit, over the sidelink link and to UE 115-*m*, a second scheduling request based on the triggered BSR. For example, UE 115-*l* may transmit the second scheduling request based on determining that UE 115-*m* or base station 105-*b* may not have received the scheduling request. In one example, UE 115-*l* may determine that UE 115-*m* or base station 105-*b* may not have received the scheduling request if UE 115-*l* has failed to receive an assignment or grant of resources for transmission of the BSR. In some cases, UE 115-*l* may increment the counter based on transmission of the second scheduling request.

At 2335-*b*, in some cases, UE 115-*m* may transmit, over the relay link and to base station 105-*b*, the second scheduling request based on reception of the second scheduling request. In some cases, UE 115-*m* may receive the second scheduling request and may determine that UE 115-*m* or base station 105-*b* may not have received the scheduling request based on receiving the second scheduling request. Further, in some cases, UE 115-*m* may transmit the second scheduling request based on determining that UE 115-*m* or base station 105-*b* may not have received the scheduling request based on receiving the scheduling request.

At 2340-*a*, in some cases, UE 115-*l* may transmit the BSR or may transmit uplink data to UE 115-*l* over the sidelink link. For example, UE 115-*l* may receive a grant or assignment of resources on the sidelink link for transmission of the BSR and based on transmitting at least one scheduling request (e.g., the scheduling request and/or the second scheduling request). UE 115-*l* may transmit the BSR on the assigned resources and based on triggering the BSR and on receiving the assigned resources. In some cases, based on transmitting the BSR, UE 115-*l* may receive a grant or assignment of resources for transmission of data over the sidelink link (e.g., to UE 115-*m*, where UE 115-*m* may forward or relay the data to base station 105-*b*). UE 115-*l* may transmit the data in the uplink and over the grant or assignment of resources for the transmission of the data.

In some cases, UE 115-*l* may determine to release resources on the sidelink link based on a value of the counter (e.g., may release the one or more configured resources). For example, UE 115-*l* may determine to release all resources configured for PSSCH and/or PSCCH resources on the sidelink link. UE 115-*l* may transmit a notification over the sidelink link to UE 115-*m* to indicate that UE 115-*l* has released the resources.

At 2340-*b*, in some cases, UE 115-*m* may transmit the BSR, the data, or the notification of the released resources to base station 105-*b* based on reception of the BSR, the data, or the notification.

Figure 24:
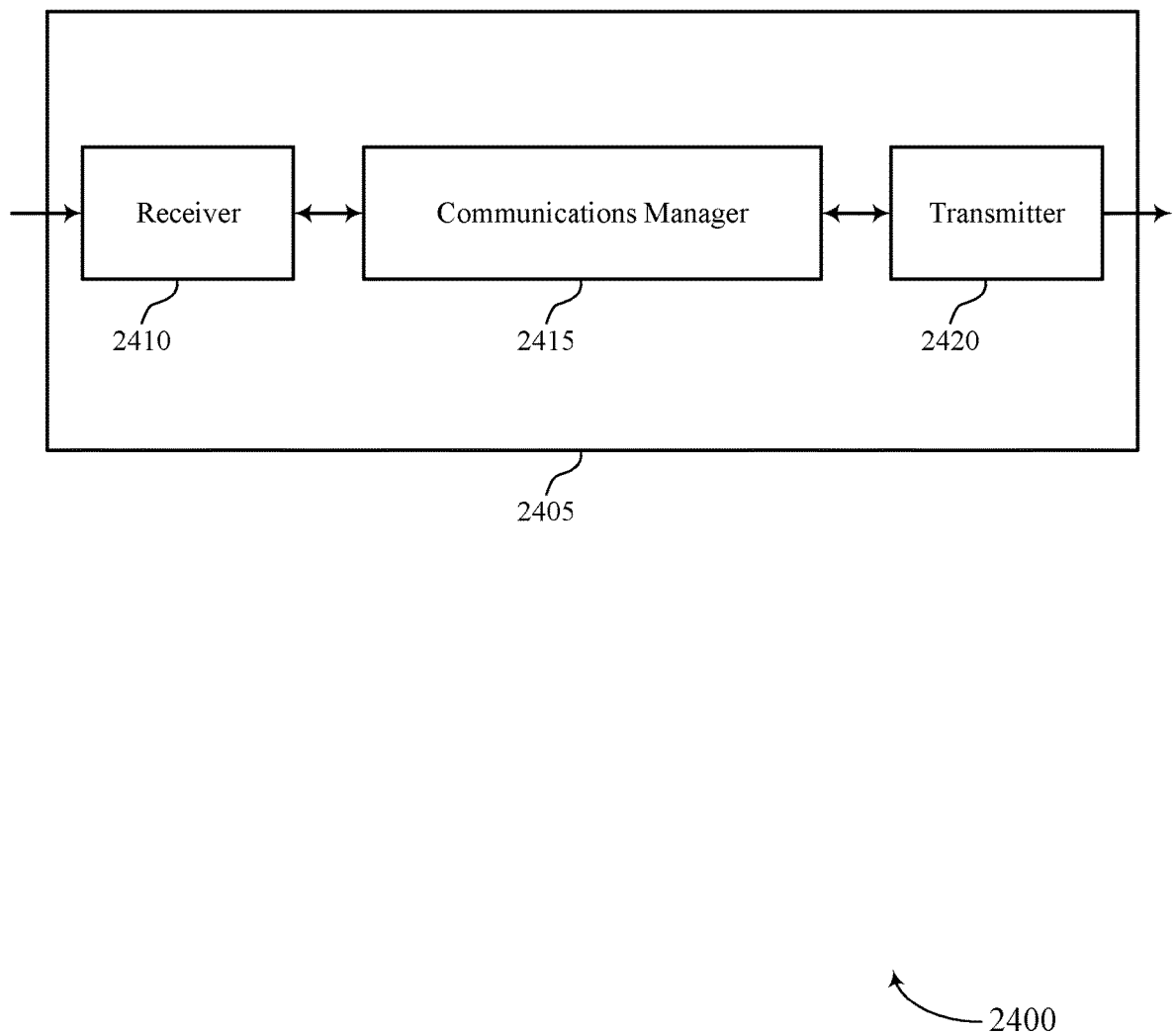
FIGS. 24 and 25 show block diagrams of devices that support configurations for sidelink scheduling requests in accordance with one or more aspects of the present disclosure.

FIG. 24 shows a block diagram 2400 of a device 2405 that supports configurations for sidelink scheduling requests in accordance with one or more aspects of the present disclosure. The device 2405 may be an example of aspects of a UE 115 as described herein. The device 2405 may include a receiver 2410, a communications manager 2415, and a transmitter 2420. The device 2405 may also include a processor. Each of these components may be in communication with one another (e.g., via one or more buses).

The receiver 2410 may receive information such as packets, user data, or control information associated with various information channels (e.g., control channels, data channels, and information related to configurations for sidelink scheduling requests, etc.). Information may be passed on to other components of the device 2405. The receiver 2410 may be an example of aspects of the transceiver 2720 described with reference to FIG. 27. The receiver 2410 may utilize a single antenna or a set of antennas.

The communications manager 2415 may establish a communication link with a base station, the communication link including a sidelink communication link between the remote UE and a relay UE and a relay communication link between the relay UE and the base station, receive, over the sidelink communication link, an indication of one or more resources configured by the base station for transmission of a scheduling request to the relay UE over the sidelink communication link, trigger a BSR for transmission of data to the base station over the communication link, identify, based on triggering the BSR, that resources on the sidelink communication link are unavailable for transmission of the BSR, and transmit, to the relay UE and over the sidelink communication link, a scheduling request using at least a portion of the one or more configured resources and based on identifying that the resources on the sidelink communication link are unavailable.

The communications manager 2415 may also establish a communication link with a base station and a remote UE, the communication link including a sidelink communication link between the remote UE and the relay UE and a relay communication link between the relay UE and the base station, receive, over the relay communication link, an indication of one or more resources configured by the base station for transmission of a scheduling request from the remote UE to the relay UE over the sidelink communication link, transmit, over the sidelink communication link, the indication of the one or more configured resources, receive, over the sidelink communication link, a scheduling request using at least a portion of the one or more configured resources, the scheduling request indicating that resources on the sidelink communication link are unavailable for transmission of a BSR, and transmit the scheduling request over the relay communication link based on the indication that resources on the sidelink communication link are unavailable and on reception of the scheduling request over the sidelink communication link. The communications manager 2415 may be an example of aspects of the communications manager 2710 described herein.

The communications manager 2415 may be an example of means for performing various aspects of managing smart repeaters as described herein. The communications manager 2415, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 2415, or its sub-components, may be implemented in code (e.g., as communications management software or firmware) executed by a processor, or any combination thereof. If implemented in code executed by a processor, the functions of the communications manager 2415, or its sub-components may be executed by a general-purpose processor, a DSP, an ASIC, a FPGA or other programmable logic device.

In some examples, the communications manager 2415 may be configured to perform various operations (e.g., receiving, determining, transmitting) using or otherwise in cooperation with the receiver 2410, the transmitter 2420, or both.

The communications manager 2415, or its sub-components, may be physically located at various positions, including being distributed such that portions of functions are implemented at different physical locations by one or more physical components. In some examples, the communications manager 2415, or its sub-components, may be a separate and distinct component in accordance with various aspects of the present disclosure. In some examples, the communications manager 2415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2420 may transmit signals generated by other components of the device 2405. In some examples, the transmitter 2420 may be collocated with a receiver 2410 in a transceiver module. For example, the transmitter 2420 may be an example of aspects of the transceiver 2720 described with reference to FIG. 27. The transmitter 2420 may utilize a single antenna or a set of antennas.

In one or more aspects, the described techniques performed by the communications manager 2415 as described herein may support improvements in relayed sidelink communications. For example, communications manager 2415 may decrease communication delays and latency, and increase available power at a wireless device (e.g., a UE 115) by supporting transmission of a scheduling request on configured sidelink resources. Transmission of the scheduling request on the configured sidelink resources may reduce overhead resource use or reduce power consumption at a device (or any combination thereof) compared to other systems and techniques, for example, that do not support sidelink resources that are configured for scheduling requests. Accordingly, communications manager 2415 may save power and increase battery life at a wireless device (e.g., a UE 115) by strategically reducing an amount of signaling or processing performed by a wireless device (e.g., a UE 115) when requesting resources via a scheduling request.

Figure 25:
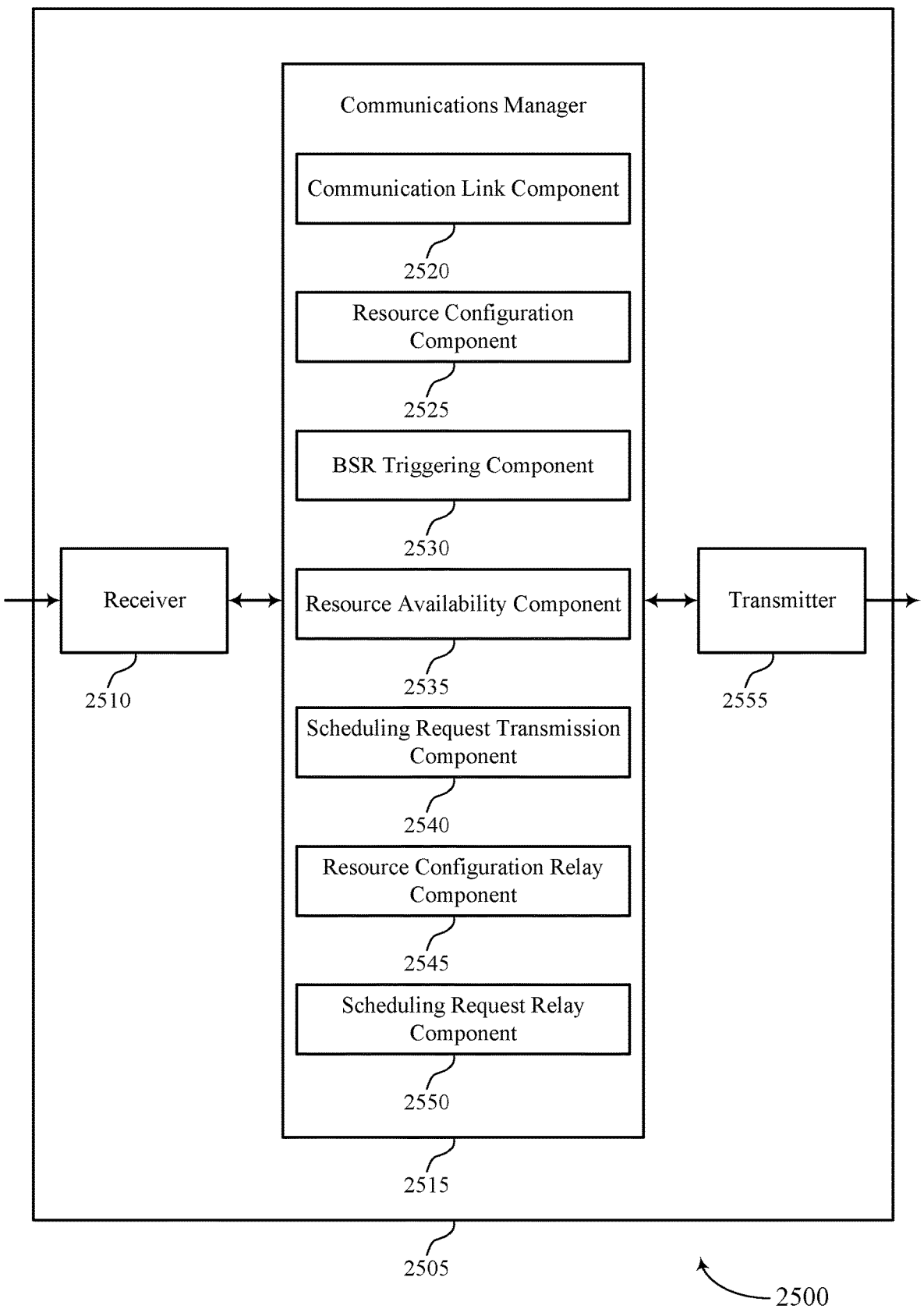

FIG. 25 shows a block diagram 2500 of a device 2505 that supports configurations for sidelink scheduling requests in accordance with one or more aspects of the present disclosure. The device 2505 may be an example of aspects of a device 2405, or a UE 115 as described herein. The device 2505 may include a receiver 2510, a communications manager 2515, and a transmitter 2555. The device 2505 may also include a processor. Each of these components may be in communication with one another (e.g., via one or more buses).

The receiver 2510 may receive information such as packets, user data, or control information associated with various information channels (e.g., control channels, data channels, and information related to configurations for sidelink scheduling requests, etc.). Information may be passed on to other components of the device 2505. The receiver 2510 may be an example of aspects of the transceiver 2720 described with reference to FIG. 27. The receiver 2510 may utilize a single antenna or a set of antennas.

The communications manager 2515 may be an example of aspects of the communications manager 515 as described herein. The communications manager 2515 may include a communication link component 2520, a resource configuration component 2525, a BSR triggering component 2530, a resource availability component 2535, a scheduling request transmission component 2540, a resource configuration relay component 2545, and a scheduling request relay component 2550. The communications manager 2515 may be an example of aspects of the communications manager 2710 described herein.

The communication link component 2520 may establish a communication link with a base station, the communication link including a sidelink communication link between the remote UE and a relay UE and a relay communication link between the relay UE and the base station. The resource configuration component 2525 may receive, over the sidelink communication link, an indication of one or more resources configured by the base station for transmission of a scheduling request to the relay UE over the sidelink communication link. The BSR triggering component 2530 may trigger a BSR for transmission of data to the base station over the communication link. The resource availability component 2535 may identify, based on triggering the BSR, that resources on the sidelink communication link are unavailable for transmission of the BSR. The scheduling request transmission component 2540 may transmit, to the relay UE and over the sidelink communication link, a scheduling request using at least a portion of the one or more configured resources and based on identifying that the resources on the sidelink communication link are unavailable.

The communication link component 2520 may establish a communication link with a base station and a remote UE, the communication link including a sidelink communication link between the remote UE and the relay UE and a relay communication link between the relay UE and the base station. The resource configuration relay component 2545 may receive, over the relay communication link, an indication of one or more resources configured by the base station for transmission of a scheduling request from the remote UE to the relay UE over the sidelink communication link and transmit, over the sidelink communication link, the indication of the one or more configured resources. The scheduling request relay component 2550 may receive, over the sidelink communication link, a scheduling request using at least a portion of the one or more configured resources, the scheduling request indicating that resources on the sidelink communication link are unavailable for transmission of a BSR and transmit the scheduling request over the relay communication link based on the indication that resources on the sidelink communication link are unavailable and on reception of the scheduling request over the sidelink communication link.

The transmitter 2555 may transmit signals generated by other components of the device 2505. In some examples, the transmitter 2555 may be collocated with a receiver 2510 in a transceiver module. For example, the transmitter 2555 may be an example of aspects of the transceiver 2720 described with reference to FIG. 27. The transmitter 2555 may utilize a single antenna or a set of antennas.

A processor of a wireless device (e.g., controlling the receiver 2510, the transmitter 2555, or the transceiver 2720 as described with reference to FIG. 27) may decrease communication delays and latency, and increase available power. The reduced delays may reduce energy consumption (e.g., via implementation of system components described with reference to FIG. 7) compared to other systems and techniques, for example, that do not support sidelink resources that are configured for scheduling requests, which may increase processing or signaling overhead and power consumption. Further, the processor of the UE 115 may identify one or more aspects of a sidelink resource configuration to perform the techniques described herein. The processor of the wireless device may use the sidelink resource configuration to perform one or more actions that may result in lower delays and power consumption, as well as save power and increase battery life at the wireless device (e.g., by transmitting a scheduling request on sidelink resources configured for scheduling request transmissions), among other improvements.

Figure 26:
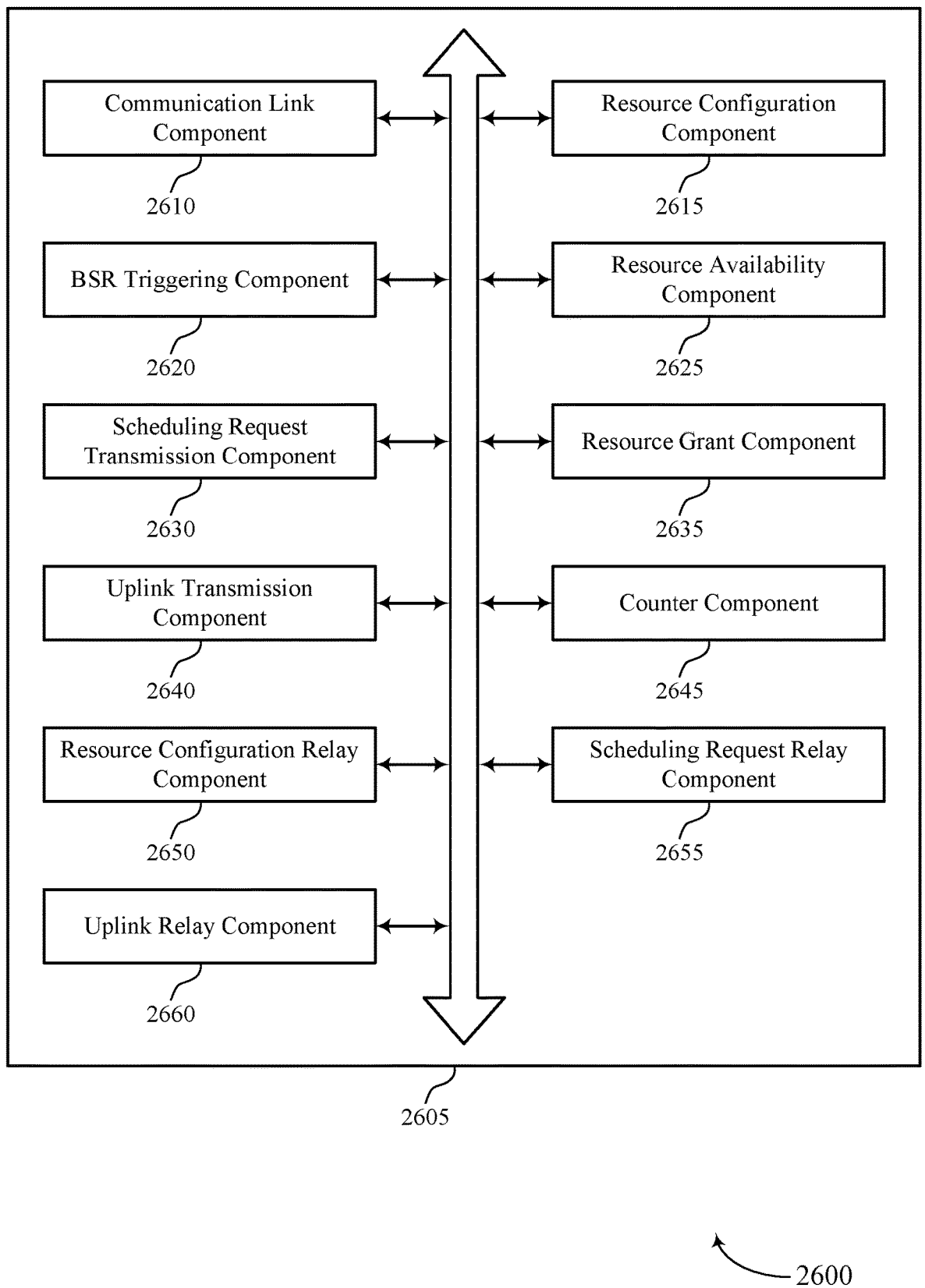
FIG. 26 shows a block diagram of a communications manager that supports configurations for sidelink scheduling requests in accordance with one or more aspects of the present disclosure.

FIG. 26 shows a block diagram 2600 of a communications manager 2605 that supports configurations for sidelink scheduling requests in accordance with one or more aspects of the present disclosure. The communications manager 2605 may be an example of aspects of a communications manager 2415, a communications manager 2515, or a communications manager 2710 described herein. The communications manager 2605 may include a communication link component 2610, a resource configuration component 2615, a BSR triggering component 2620, a resource availability component 2625, a scheduling request transmission component 2630, a resource grant component 2635, an uplink transmission component 2640, a counter component 2645, a resource configuration relay component 2650, a scheduling request relay component 2655, and an uplink relay component 2660. Each of these modules may communicate, directly or indirectly, with one another (e.g., via one or more buses).

The communication link component 2610 may establish a communication link with a base station, the communication link including a sidelink communication link between the remote UE and a relay UE and a relay communication link between the relay UE and the base station. In some examples, the communication link component 2610 may establish a communication link with a base station and a remote UE, the communication link including a sidelink communication link between the remote UE and the relay UE and a relay communication link between the relay UE and the base station.

The resource configuration component 2615 may receive, over the sidelink communication link, an indication of one or more resources configured by the base station for transmission of a scheduling request to the relay UE over the sidelink communication link. In some examples, the resource configuration component 2615 may receive, over the sidelink communication link, a configuration indicating one or more resources on a sidelink feedback channel for transmission of the scheduling request. In some examples, the resource configuration component 2615 may receive, over the sidelink communication link, a configuration of the one or more resources that includes a bitmap indicating one or more RBs including the one or more resources for transmission of the scheduling request.

In some examples, the resource configuration component 2615 may receive, within the configuration, a cyclic shift for the one or more RBs including the one or more resources for transmission of the scheduling request. In some examples, the resource configuration component 2615 may receive, over the sidelink communication link, a second indication of one or more second resources configured by the base station for transmission of a scheduling request to the relay UE over the sidelink communication link. In some examples, the resource configuration component 2615 may release the one or more configured resources based on the counter reaching the threshold value.

In some cases, the one or more configured resources are associated with a first QoS for first communications on the communication link and the one or more second resources are associated with a second QoS for second communications on the communication link. In some cases, the one or more configured resources are associated with a first set of LCHs and the one or more second resources are associated with a second set of LCHs, the first set of LCHs associated with a first range of LCH priorities and the second set of LCHs associated with a second range of LCH priorities. In some cases, the one or more configured resources are associated with a first timer for prohibiting transmission of a scheduling request and the one or more second resources are associated with a second timer for prohibiting transmission of a scheduling request.

The BSR triggering component 2620 may trigger a BSR for transmission of data to the base station over the communication link.

The resource availability component 2625 may identify, based on triggering the BSR, that resources on the sidelink communication link are unavailable for transmission of the BSR.

The scheduling request transmission component 2630 may transmit, to the relay UE and over the sidelink communication link, a scheduling request using at least a portion of the one or more configured resources and based on identifying that the resources on the sidelink communication link are unavailable. In some examples, the scheduling request transmission component 2630 may select the one or more configured resources for transmission of the scheduling request based on a LCP of the scheduling request and the first range of LCH priorities. In some examples, the scheduling request transmission component 2630 may transmit, over the sidelink communication link, a second scheduling request based on the triggered BSR. In some cases, the scheduling request includes a set of bits and the set of bits includes an indication of a priority associated with the scheduling request.

The resource grant component 2635 may receive, over the sidelink communication link, a grant of resources for the sidelink communication link for a data transmission to the base station based on transmission of the scheduling request. In some examples, the resource grant component 2635 may receive, over the relay communication link, a grant of resources for the sidelink communication link for a data transmission from the remote UE to the base station based on transmission of the scheduling request. In some examples, the resource grant component 2635 may transmit, over the sidelink communication link, the grant of resources.

The uplink transmission component 2640 may transmit the data over the sidelink communication link based on reception of the grant. In some examples, the uplink transmission component 2640 may transmit, over the sidelink communication link, the BSR based on transmission of the scheduling request. In some examples, the uplink transmission component 2640 may transmit, based on releasing the one or more configured resources, a notification over the sidelink communication link that includes an indication that the remote UE has released the one or more configured resources.

The counter component 2645 may initiate a counter based on transmission of the scheduling request. In some examples, the counter component 2645 may reset the counter to an initial value based on transmission of the BSR. In some examples, the counter component 2645 may increment the counter based on transmission of the second scheduling request. In some examples, the counter component 2645 may determine that the counter has reached a threshold value based on initiating the counter.

The resource configuration relay component 2650 may receive, over the relay communication link, an indication of one or more resources configured by the base station for transmission of a scheduling request from the remote UE to the relay UE over the sidelink communication link.

In some examples, the resource configuration relay component 2650 may transmit, over the sidelink communication link, the indication of the one or more configured resources. In some examples, the resource configuration relay component 2650 may receive, over the relay communication link, a configuration indicating one or more resources on a sidelink feedback channel for transmission of the scheduling request. In some examples, the resource configuration relay component 2650 may, over the relay communication link, a configuration of the one or more resources that includes a bitmap indicating one or more RBs including the one or more resources for transmission of the scheduling request.

In some examples, the resource configuration relay component 2650 may receive, within the configuration, a cyclic shift for the one or more RBs including the one or more resources for transmission of the scheduling request. In some examples, the resource configuration relay component 2650 may receive, over the relay communication link, a second indication of one or more second resources configured by the base station for transmission of a scheduling request from the remote UE to the relay UE over the sidelink communication link. In some examples, the resource configuration relay component 2650 may transmit, over the sidelink communication link, the second indication of the one or more second resources.

In some cases, the one or more configured resources are associated with a first QoS for first communications on the communication link and the one or more second resources are associated with a second QoS for second communications on the communication link. In some cases, the one or more configured resources are associated with a first set of LCHs and the one or more second resources are associated with a second set of LCHs, the first set of LCHs associated with a first range of LCH priorities and the second set of LCHs associated with a second range of LCH priorities. In some cases, the one or more configured resources are associated with a first timer for prohibiting transmission of a scheduling request and the one or more second resources are associated with a second timer for prohibiting transmission of a scheduling request.

The scheduling request relay component 2655 may receive, over the sidelink communication link, a scheduling request using at least a portion of the one or more configured resources, the scheduling request indicating that resources on the sidelink communication link are unavailable for transmission of a BSR. In some examples, the scheduling request relay component 2655 may transmit the scheduling request over the relay communication link based on the indication that resources on the sidelink communication link are unavailable and on reception of the scheduling request over the sidelink communication link.

In some examples, the scheduling request relay component 2655 may identify a priority of the received scheduling request based on the first range of LCH priorities and receiving the scheduling request on the at least a portion of the one or more configured resources. In some examples, the scheduling request relay component 2655 may configure a LCH for transmission of the scheduling request based on the identified priority. In some cases, the scheduling request includes a set of bits and the set of bits includes an indication of a priority associated with the scheduling request.

The uplink relay component 2660 may receive a data transmission over the sidelink communication link based on transmission of the grant. In some examples, the uplink relay component 2660 may transmit the data transmission over the relay communication link based on reception of the data transmission. In some examples, receiving a notification over the sidelink communication link that includes an indication that the remote UE has released the one or more configured resources. In some examples, the uplink relay component 2660 may transmit, the notification over the relay communication link based on receiving the notification.

Figure 27:
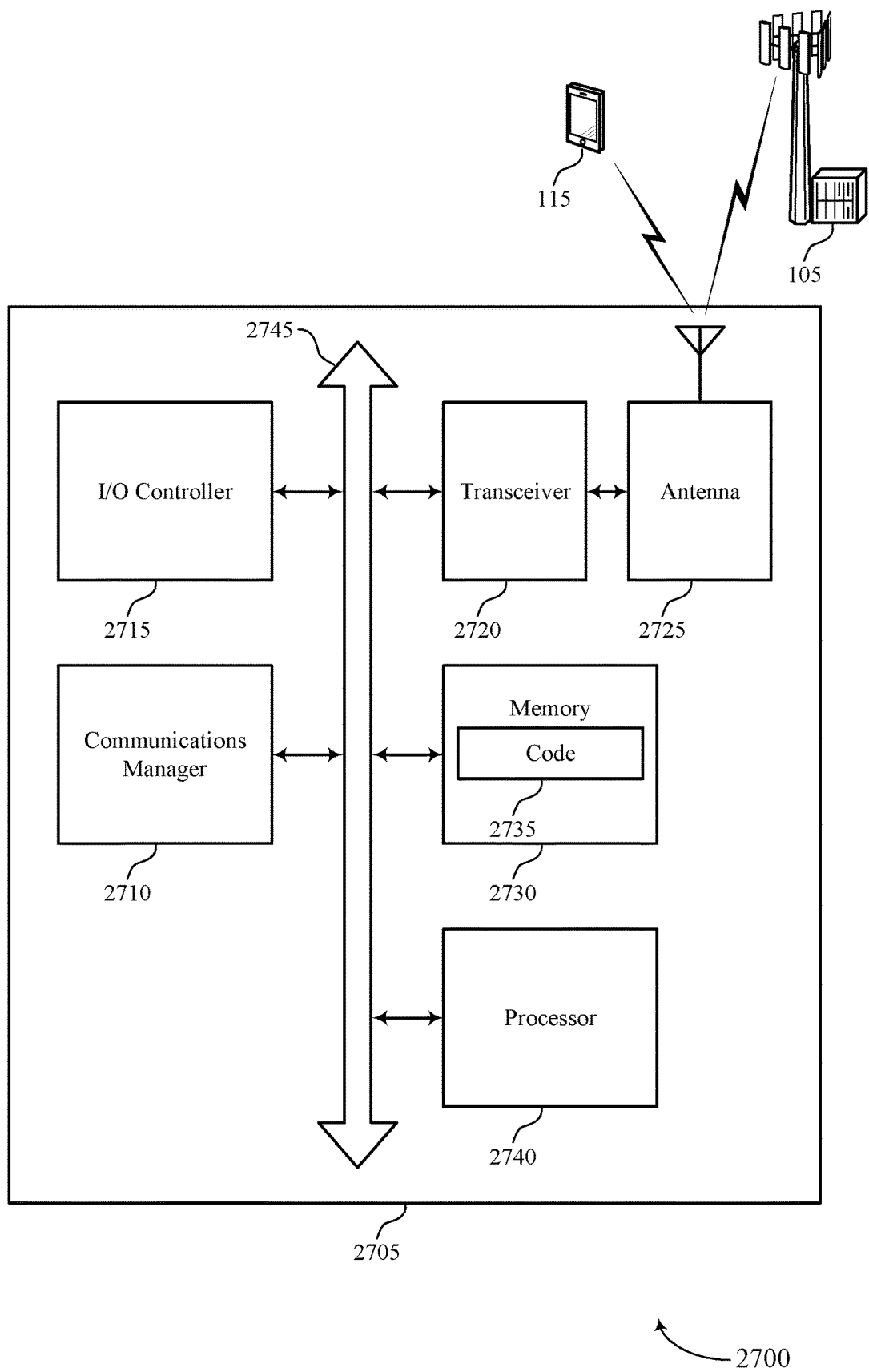
FIG. 27 shows a diagram of a system including a device that supports configurations for sidelink scheduling requests in accordance with one or more aspects of the present disclosure.

FIG. 27 shows a diagram of a system 2700 including a device 2705 that supports configurations for sidelink scheduling requests in accordance with one or more aspects of the present disclosure. The device 2705 may be an example of or include the components of device 2405, device 2505, or a UE 115 as described herein. The device 2705 may include components for bi-directional voice and data communications including components for transmitting and receiving communications, including a communications manager 2710, an I/O controller 2715, a transceiver 2720, an antenna 2725, memory 2730, and a processor 2740. These components may be in electronic communication via one or more buses (e.g., bus 2745).

The communications manager 2710 may establish a communication link with a base station, the communication link including a sidelink communication link between the remote UE and a relay UE and a relay communication link between the relay UE and the base station, receive, over the sidelink communication link, an indication of one or more resources configured by the base station for transmission of a scheduling request to the relay UE over the sidelink communication link, trigger a BSR for transmission of data to the base station over the communication link, identify, based on triggering the BSR, that resources on the sidelink communication link are unavailable for transmission of the BSR, and transmit, to the relay UE and over the sidelink communication link, a scheduling request using at least a portion of the one or more configured resources and based on identifying that the resources on the sidelink communication link are unavailable.

The communications manager 2710 may also establish a communication link with a base station and a remote UE, the communication link including a sidelink communication link between the remote UE and the relay UE and a relay communication link between the relay UE and the base station, receive, over the relay communication link, an indication of one or more resources configured by the base station for transmission of a scheduling request from the remote UE to the relay UE over the sidelink communication link, transmit, over the sidelink communication link, the indication of the one or more configured resources, receive, over the sidelink communication link, a scheduling request using at least a portion of the one or more configured resources, the scheduling request indicating that resources on the sidelink communication link are unavailable for transmission of a BSR, and transmit the scheduling request over the relay communication link based on the indication that resources on the sidelink communication link are unavailable and on reception of the scheduling request over the sidelink communication link.

The I/O controller 2715 may manage input and output signals for the device 2705. The I/O controller 2715 may also manage peripherals not integrated into the device 2705. In some cases, the I/O controller 2715 may represent a physical connection or port to an external peripheral. In some cases, the I/O controller 2715 may utilize an operating system such as iOS®, ANDROID®, MS-DOS®, MS-WINDOWS®, OS/2®, UNIX®, LINUX®, or another known operating system. In other cases, the I/O controller 2715 may represent or interact with a modem, a keyboard, a mouse, a touchscreen, or a similar device. In some cases, the I/O controller 2715 may be implemented as part of a processor. In some cases, a user may interact with the device 2705 via the I/O controller 2715 or via hardware components controlled by the I/O controller 2715.

The transceiver 2720 may communicate bi-directionally, via one or more antennas, wired, or wireless links as described above. For example, the transceiver 2720 may represent a wireless transceiver and may communicate bi-directionally with another wireless transceiver. The transceiver 2720 may also include a modem to modulate the packets and provide the modulated packets to the antennas for transmission, and to demodulate packets received from the antennas.

In some cases, the wireless device may include a single antenna 2725. However, in some cases the device may have more than one antenna 2725, which may be capable of concurrently transmitting or receiving multiple wireless transmissions.

The memory 2730 may include RAM and read only memory (ROM). The memory 2730 may store computer-readable, computer-executable code 2735 including instructions that, when executed, cause the processor to perform various functions described herein. In some cases, the memory 2730 may contain, among other things, a BIOS which may control basic hardware or software operation such as the interaction with peripheral components or devices.

The processor 2740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2740 may be configured to operate a memory array using a memory controller. In other cases, a memory controller may be integrated into the processor 2740. The processor 2740 may be configured to execute computer-readable instructions stored in a memory (e.g., the memory 2730) to cause the device 2705 to perform various functions (e.g., functions or tasks supporting configurations for sidelink scheduling requests).

The code 2735 may include instructions to implement aspects of the present disclosure, including instructions to support wireless communications. The code 2735 may be stored in a non-transitory computer-readable medium such as system memory or other type of memory. In some cases, the code 2735 may not be directly executable by the processor 2740 but may cause a computer (e.g., when compiled and executed) to perform functions described herein.

Figure 28:
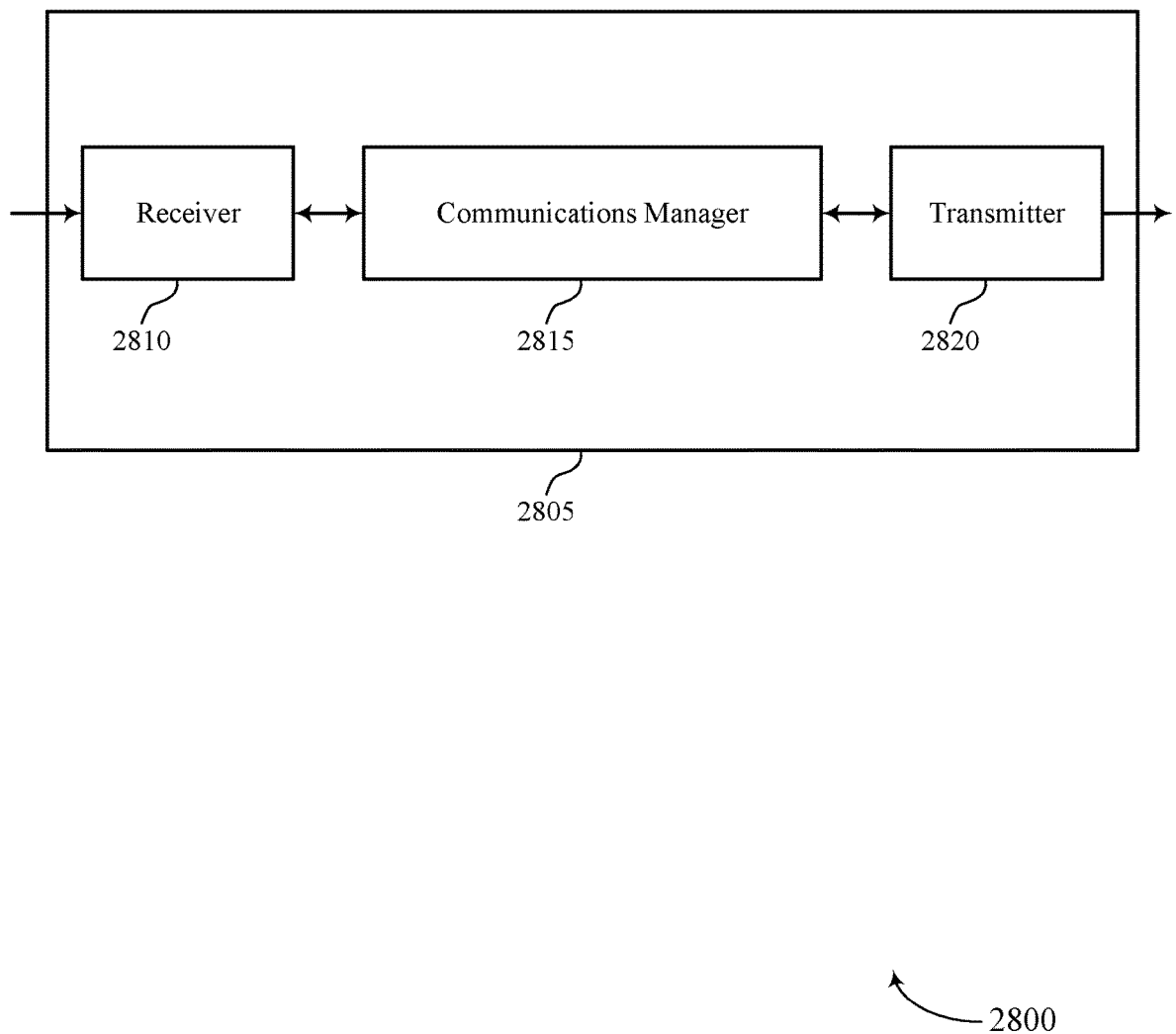
FIGS. 28 and 29 show block diagrams of devices that support configurations for sidelink scheduling requests in accordance with one or more aspects of the present disclosure.

FIG. 28 shows a block diagram 2800 of a device 2805 that supports configurations for sidelink scheduling requests in accordance with one or more aspects of the present disclosure. The device 2805 may be an example of aspects of a base station 105 as described herein. The device 2805 may include a receiver 2810, a communications manager 2815, and a transmitter 2820. The device 2805 may also include a processor. Each of these components may be in communication with one another (e.g., via one or more buses).

The receiver 2810 may receive information such as packets, user data, or control information associated with various information channels (e.g., control channels, data channels, and information related to configurations for sidelink scheduling requests, etc.). Information may be passed on to other components of the device 2805. The receiver 2810 may be an example of aspects of the transceiver 3120 described with reference to FIG. 31. The receiver 2810 may utilize a single antenna or a set of antennas.

The communications manager 2815 may establish a communication link with a remote UE, the communication link including a sidelink communication link between the remote UE and a relay UE and a relay communication link between the relay UE and the base station, configure, based on establishing the communication link, one or resources for transmission of a scheduling request from the remote UE to the relay UE over the sidelink communication link, transmit, over the relay communication link, an indication of the one or more configured resources, receive, over the relay communication link, a scheduling request for the remote UE based on transmitting the indication of the one or more configured resources, and determine, based on reception of the scheduling request, that resources on the sidelink communication link are unavailable for transmission of a BSR. The communications manager 2815 may be an example of aspects of the communications manager 3110 described herein.

The communications manager 2815 may be an example of means for performing various aspects of managing smart repeaters as described herein. The communications manager 2815, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 2815, or its sub-components, may be implemented in code (e.g., as communications management software or firmware) executed by a processor, or any combination thereof. If implemented in code executed by a processor, the functions of the communications manager 2815, or its sub-components may be executed by a general-purpose processor, a DSP, an ASIC, a FPGA or other programmable logic device.

In some examples, the communications manager 2815 may be configured to perform various operations (e.g., receiving, determining, transmitting) using or otherwise in cooperation with the receiver 2810, the transmitter 2820, or both.

The communications manager 2815, or its sub-components, may be physically located at various positions, including being distributed such that portions of functions are implemented at different physical locations by one or more physical components. In some examples, the communications manager 2815, or its sub-components, may be a separate and distinct component in accordance with various aspects of the present disclosure. In some examples, the communications manager 2815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 2820 may transmit signals generated by other components of the device 2805. In some examples, the transmitter 2820 may be collocated with a receiver 2810 in a transceiver module. For example, the transmitter 2820 may be an example of aspects of the transceiver 3120 described with reference to FIG. 31. The transmitter 2820 may utilize a single antenna or a set of antennas.

Figure 29:
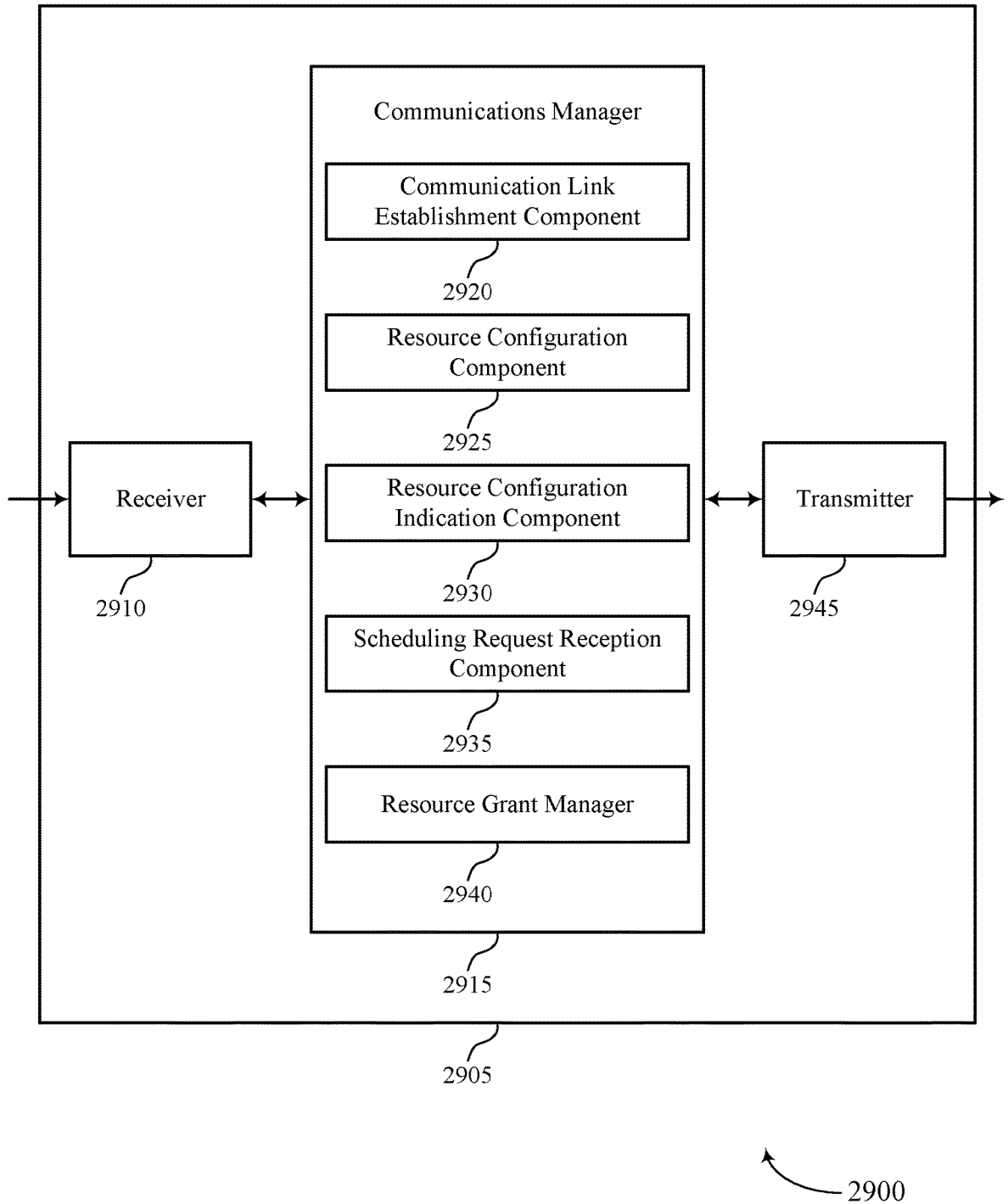

FIG. 29 shows a block diagram 2900 of a device 2905 that supports configurations for sidelink scheduling requests in accordance with one or more aspects of the present disclosure. The device 2905 may be an example of aspects of a device 2805, or a base station 105 as described herein. The device 2905 may include a receiver 2910, a communications manager 2915, and a transmitter 2945. The device 2905 may also include a processor. Each of these components may be in communication with one another (e.g., via one or more buses).

The receiver 2910 may receive information such as packets, user data, or control information associated with various information channels (e.g., control channels, data channels, and information related to configurations for sidelink scheduling requests, etc.). Information may be passed on to other components of the device 2905. The receiver 2910 may be an example of aspects of the transceiver 3120 described with reference to FIG. 31. The receiver 2910 may utilize a single antenna or a set of antennas.

The communications manager 2915 may be an example of aspects of the communications manager 2915 as described herein. The communications manager 2915 may include a communication link establishment component 2920, a resource configuration component 2925, a resource configuration indication component 2930, a scheduling request reception component 2935, and a resource grant manager 2940. The communications manager 2915 may be an example of aspects of the communications manager 3110 described herein.

The communication link establishment component 2920 may establish a communication link with a remote UE, the communication link including a sidelink communication link between the remote UE and a relay UE and a relay communication link between the relay UE and the base station.

The resource configuration component 2925 may configure, based on establishing the communication link, one or resources for transmission of a scheduling request from the remote UE to the relay UE over the sidelink communication link.

The resource configuration indication component 2930 may transmit, over the relay communication link, an indication of the one or more configured resources.

The scheduling request reception component 2935 may receive, over the relay communication link, a scheduling request for the remote UE based on transmitting the indication of the one or more configured resources.

The resource grant manager 2940 may determine, based on reception of the scheduling request, that resources on the sidelink communication link are unavailable for transmission of a BSR.

The transmitter 2945 may transmit signals generated by other components of the device 2905. In some examples, the transmitter 2945 may be collocated with a receiver 2910 in a transceiver module. For example, the transmitter 2945 may be an example of aspects of the transceiver 3120 described with reference to FIG. 31. The transmitter 2945 may utilize a single antenna or a set of antennas.

Figure 30:
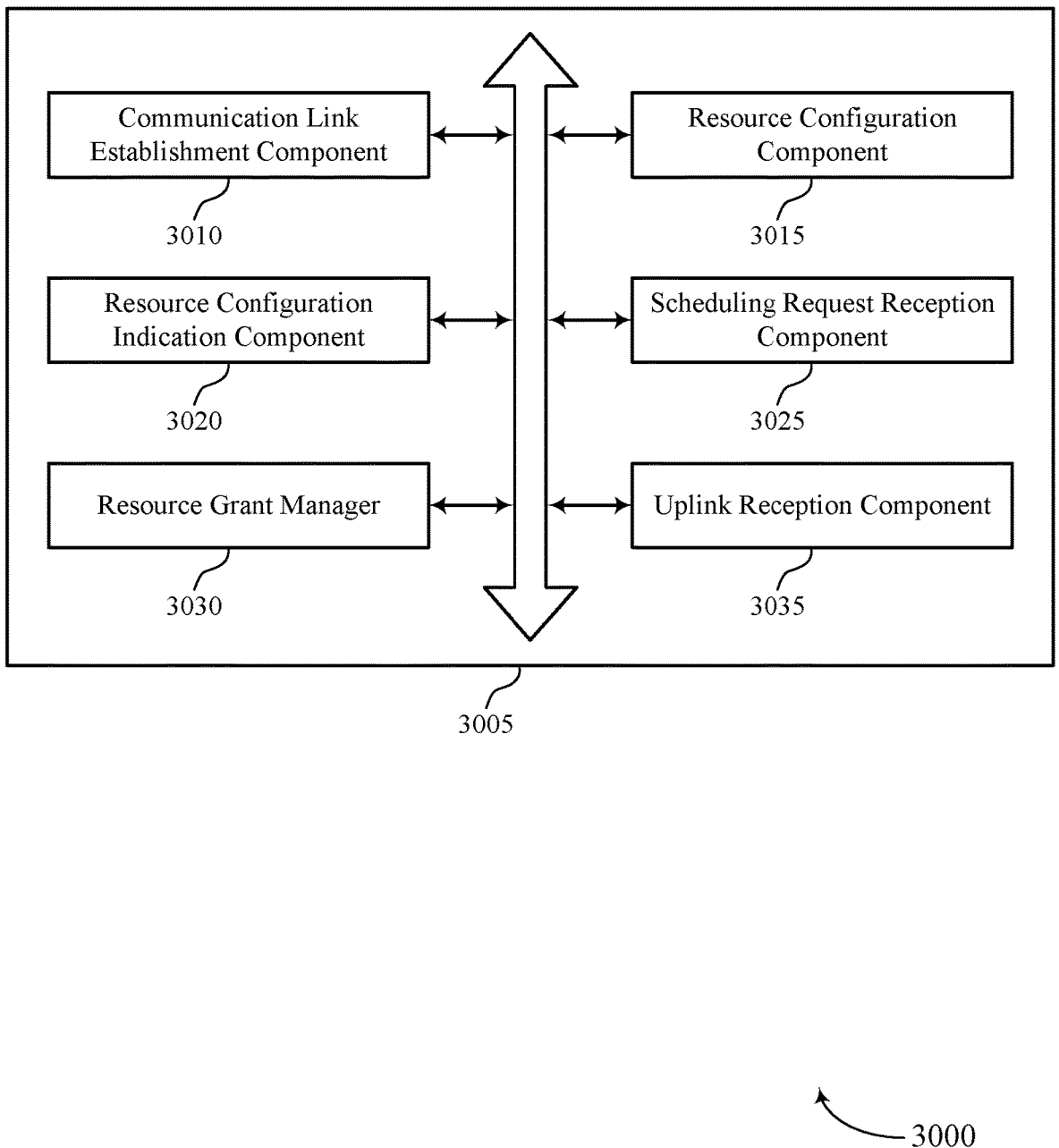
FIG. 30 shows a block diagram of a communications manager that supports configurations for sidelink scheduling requests in accordance with one or more aspects of the present disclosure.

FIG. 30 shows a block diagram 3000 of a communications manager 3005 that supports configurations for sidelink scheduling requests in accordance with one or more aspects of the present disclosure. The communications manager 3005 may be an example of aspects of a communications manager 2815, a communications manager 2915, or a communications manager 3110 described herein. The communications manager 3005 may include a communication link establishment component 3010, a resource configuration component 3015, a resource configuration indication component 3020, a scheduling request reception component 3025, a resource grant manager 3030, and an uplink reception component 3035. Each of these modules may communicate, directly or indirectly, with one another (e.g., via one or more buses).

The communication link establishment component 3010 may establish a communication link with a remote UE, the communication link including a sidelink communication link between the remote UE and a relay UE and a relay communication link between the relay UE and the base station.

The resource configuration component 3015 may configure, based on establishing the communication link, one or resources for transmission of a scheduling request from the remote UE to the relay UE over the sidelink communication link. In some examples, the resource configuration component 3015 may configure the one or more resources on a sidelink feedback channel for transmission of the scheduling request.

The resource configuration indication component 3020 may transmit, over the relay communication link, an indication of the one or more configured resources. In some examples, transmitting, over the relay communication link, a configuration of the one or more resources that includes a bitmap indicating one or more RBs including the one or more resources for transmission of the scheduling request. In some examples, the resource configuration indication component 3020 may transmit, within the configuration, a cyclic shift for the one or more RBs including the one or more resources for transmission of the scheduling request.

In some examples, the resource configuration indication component 3020 may transmit, over the relay communication link, a second indication of one or more second resources configured by the base station for transmission of a scheduling request from the remote UE to the relay UE over the sidelink communication link. In some cases, the one or more configured resources are associated with a first QoS for first communications on the communication link and the one or more second resources are associated with a second QoS for second communications on the communication link. In some cases, the one or more configured resources are associated with a first set of LCHs and the one or more second resources are associated with a second set of LCHs, the first set of LCHs associated with a first range of LCH priorities and the second set of LCHs associated with a second range of LCH priorities. In some cases, the one or more configured resources are associated with a first timer for prohibiting transmission of a scheduling request and the one or more second resources are associated with a second timer for prohibiting transmission of a scheduling request.

The scheduling request reception component 3025 may receive, over the relay communication link, a scheduling request for the remote UE based on transmitting the indication of the one or more configured resources. In some examples, the scheduling request reception component 3025 may identify a priority of the received scheduling request based on a LCH associated with the received scheduling request. In some cases, the scheduling request includes a set of bits and the set of bits includes an indication of a priority associated with the scheduling request.

The resource grant manager 3030 may determine, based on reception of the scheduling request, that resources on the sidelink communication link are unavailable for transmission of a BSR. In some examples, the resource grant manager 3030 may transmit, over the relay communication link, a grant of resources for the sidelink communication link for a data transmission from the remote UE to the base station based on the determination that resources on the sidelink communication link are unavailable.

The uplink reception component 3035 may receive the data transmission over the relay communication link based on transmission of the grant. In some examples, receiving a notification over the relay communication link that includes an indication that the remote UE has released the one or more configured resources.

It should be noted that the methods described herein describe possible implementations, and that the operations may be rearranged or otherwise modified and that other implementations are possible. Further, aspects from two or more of the methods may be combined.

Figure 31:
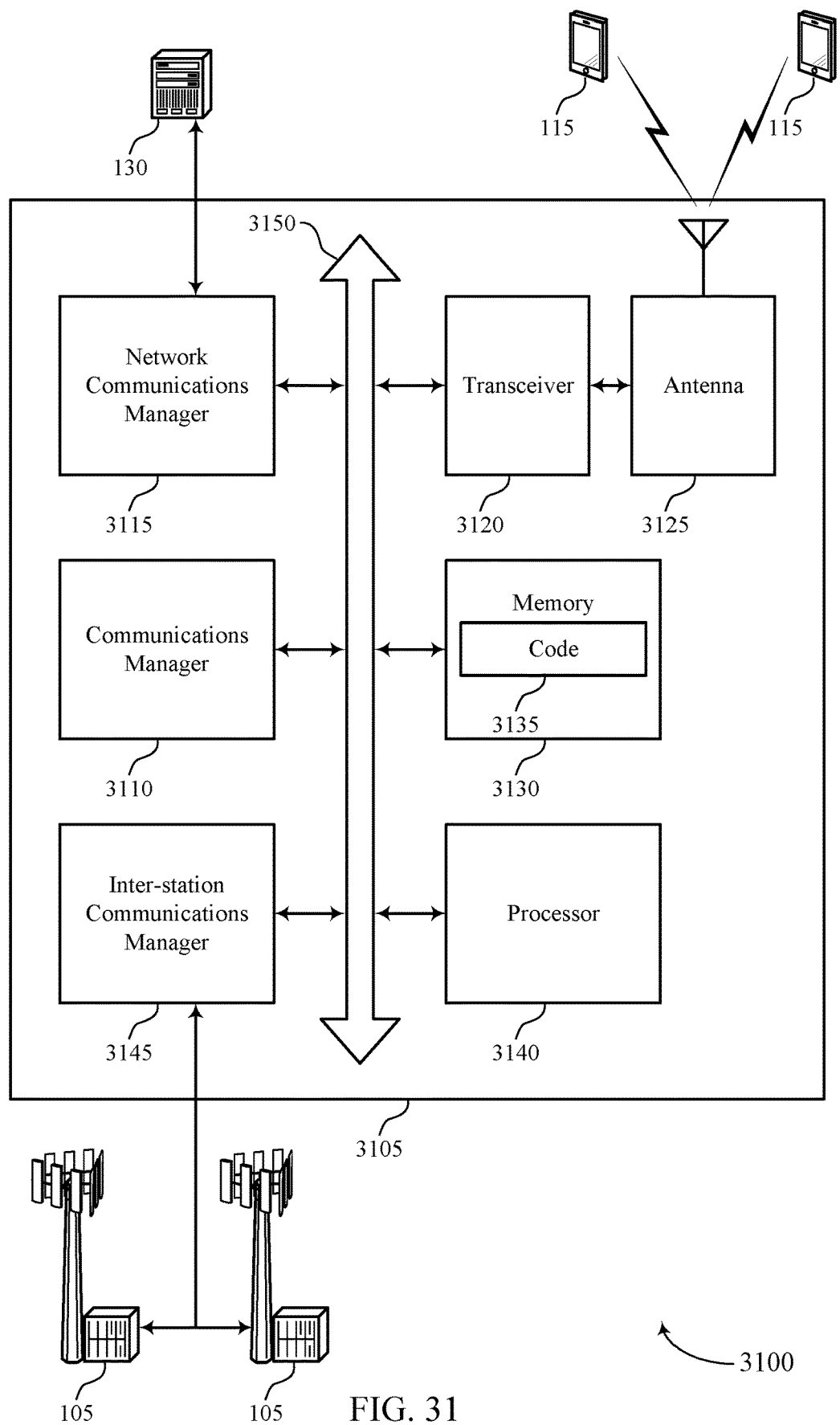
FIG. 31 shows a diagram of a system including a device that supports configurations for sidelink scheduling requests in accordance with one or more aspects of the present disclosure.

FIG. 31 shows a diagram of a system 3100 including a device 3105 that supports configurations for sidelink scheduling requests in accordance with one or more aspects of the present disclosure. The device 3105 may be an example of or include the components of device 2805, device 2905, or a base station 105 as described herein. The device 3105 may include components for bi-directional voice and data communications including components for transmitting and receiving communications, including a communications manager 3110, a network communications manager 3115, a transceiver 3120, an antenna 3125, memory 3130, a processor 3140, and an inter-station communications manager 3145. These components may be in electronic communication via one or more buses (e.g., bus 3150).

The communications manager 3110 may establish a communication link with a remote UE, the communication link including a sidelink communication link between the remote UE and a relay UE and a relay communication link between the relay UE and the base station, configure, based on establishing the communication link, one or resources for transmission of a scheduling request from the remote UE to the relay UE over the sidelink communication link, transmit, over the relay communication link, an indication of the one or more configured resources, receive, over the relay communication link, a scheduling request for the remote UE based on transmitting the indication of the one or more configured resources, and determine, based on reception of the scheduling request, that resources on the sidelink communication link are unavailable for transmission of a BSR.

The network communications manager 3115 may manage communications with the core network (e.g., via one or more wired backhaul links). For example, the network communications manager 3115 may manage the transfer of data communications for client devices, such as one or more UEs 115.

The transceiver 3120 may communicate bi-directionally, via one or more antennas, wired, or wireless links as described above. For example, the transceiver 3120 may represent a wireless transceiver and may communicate bi-directionally with another wireless transceiver. The transceiver 3120 may also include a modem to modulate the packets and provide the modulated packets to the antennas for transmission, and to demodulate packets received from the antennas.

In some cases, the wireless device may include a single antenna 3125. However, in some cases the device may have more than one antenna 3125, which may be capable of concurrently transmitting or receiving multiple wireless transmissions.

The memory 3130 may include RAM, ROM, or a combination thereof. The memory 3130 may store computer-readable code 3135 including instructions that, when executed by a processor (e.g., the processor 3140) cause the device to perform various functions described herein. In some cases, the memory 3130 may contain, among other things, a BIOS which may control basic hardware or software operation such as the interaction with peripheral components or devices.

The processor 3140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 3140 may be configured to operate a memory array using a memory controller. In some cases, a memory controller may be integrated into processor 3140. The processor 3140 may be configured to execute computer-readable instructions stored in a memory (e.g., the memory 3130) to cause the device 3105 to perform various functions (e.g., functions or tasks supporting configurations for sidelink scheduling requests).

The inter-station communications manager 3145 may manage communications with other base station 105, and may include a controller or scheduler for controlling communications with UEs 115 in cooperation with other base stations 105. For example, the inter-station communications manager 3145 may coordinate scheduling for transmissions to UEs 115 for various interference mitigation techniques such as beamforming or joint transmission. In some examples, the inter-station communications manager 3145 may provide an X2 interface within an LTE/LTE-A wireless communication network technology to provide communication between base stations 105.

The code 3135 may include instructions to implement aspects of the present disclosure, including instructions to support wireless communications. The code 3135 may be stored in a non-transitory computer-readable medium such as system memory or other type of memory. In some cases, the code 3135 may not be directly executable by the processor 3140 but may cause a computer (e.g., when compiled and executed) to perform functions described herein.

Figure 32:
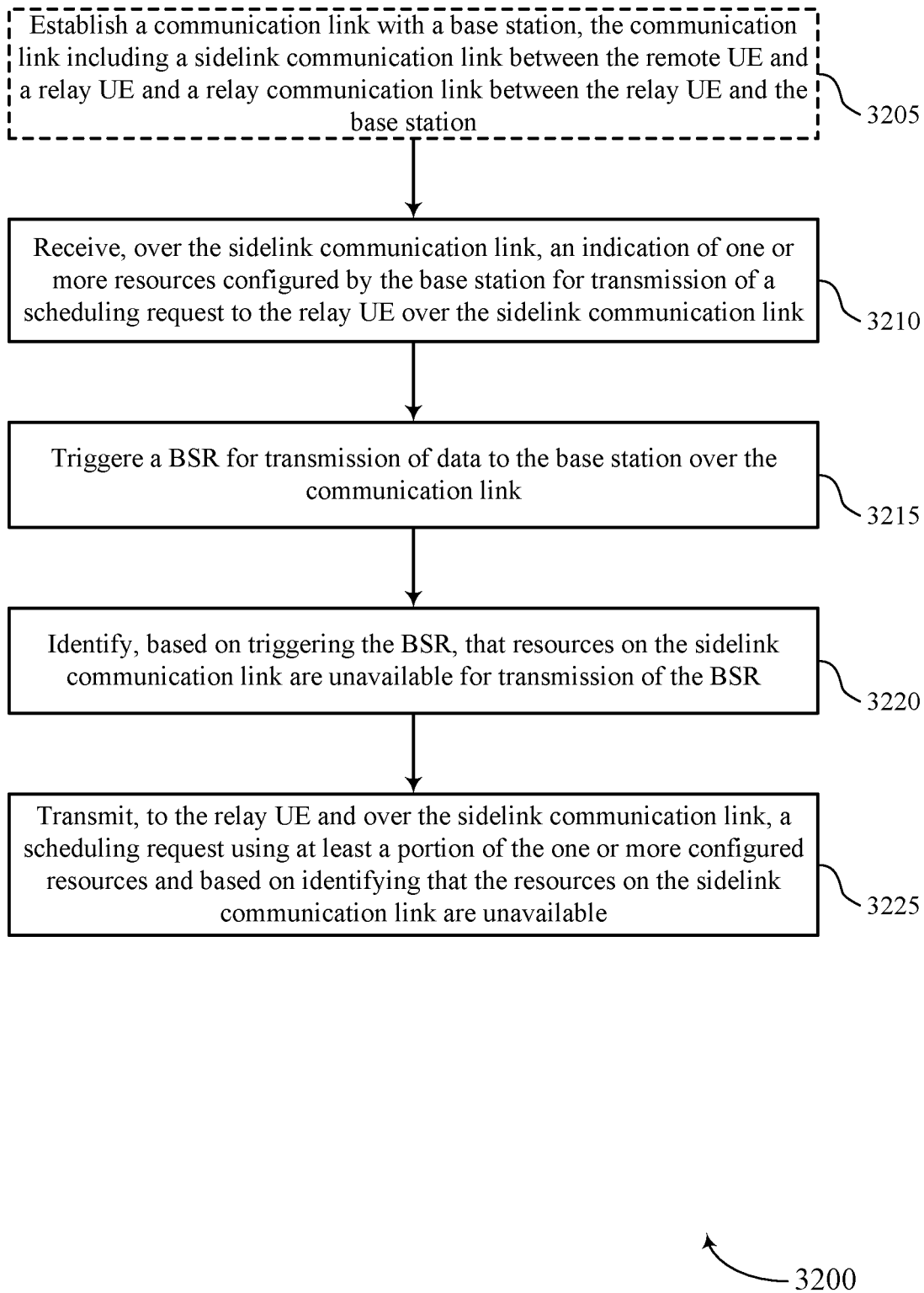
FIGS. 32 through 43 show flowcharts illustrating methods that support configurations for sidelink scheduling requests in accordance with one or more aspects of the present disclosure.

FIG. 32 shows a flowchart illustrating a method 3200 that supports configurations for sidelink scheduling requests in accordance with one or more aspects of the present disclosure. The operations of method 3200 may be implemented by a UE 115 or its components as described herein. For example, the operations of method 3200 may be performed by a communications manager as described with reference to FIGS. 24 through 27. In some examples, a UE may execute a set of instructions to control the functional elements of the UE to perform the functions described below. Additionally or alternatively, a UE may perform aspects of the functions described below using special-purpose hardware.

At 3205, the UE may establish a communication link with a base station, the communication link including a sidelink communication link between the remote UE and a relay UE and a relay communication link between the relay UE and the base station. The operations of 3205 may be performed according to the methods described herein. In some examples, aspects of the operations of 3205 may be performed by a communication link component as described with reference to FIGS. 24 through 27.

At 3210, the UE may receive, over the sidelink communication link, an indication of one or more resources configured by the base station for transmission of a scheduling request to the relay UE over the sidelink communication link. The operations of 3210 may be performed according to the methods described herein. In some examples, aspects of the operations of 3210 may be performed by a resource configuration component as described with reference to FIGS. 24 through 27.

At 3215, the UE may trigger a BSR for transmission of data to the base station over the communication link. The operations of 3215 may be performed according to the methods described herein. In some examples, aspects of the operations of 3215 may be performed by a BSR triggering component as described with reference to FIGS. 24 through 27.

At 3220, the UE may identify, based on triggering the BSR, that resources on the sidelink communication link are unavailable for transmission of the BSR. The operations of 3220 may be performed according to the methods described herein. In some examples, aspects of the operations of 3220 may be performed by a resource availability component as described with reference to FIGS. 24 through 27.

At 3225, the UE may transmit, to the relay UE and over the sidelink communication link, a scheduling request using at least a portion of the one or more configured resources and based on identifying that the resources on the sidelink communication link are unavailable. The operations of 3225 may be performed according to the methods described herein. In some examples, aspects of the operations of 3225 may be performed by a scheduling request transmission component as described with reference to FIGS. 24 through 27.

Figure 33:
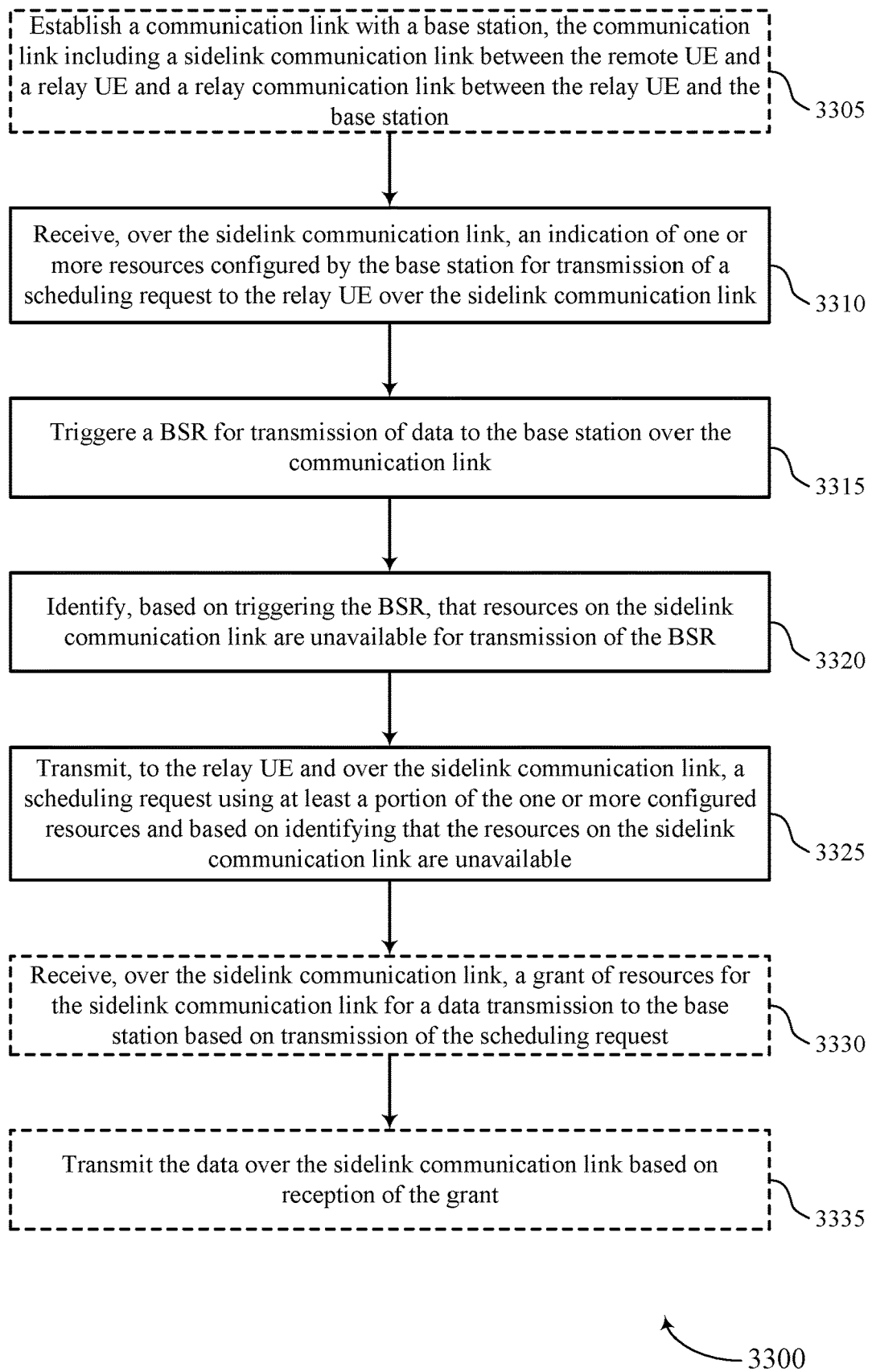

FIG. 33 shows a flowchart illustrating a method 3300 that supports configurations for sidelink scheduling requests in accordance with one or more aspects of the present disclosure. The operations of method 3300 may be implemented by a UE 115 or its components as described herein. For example, the operations of method 3300 may be performed by a communications manager as described with reference to FIGS. 24 through 27. In some examples, a UE may execute a set of instructions to control the functional elements of the UE to perform the functions described below. Additionally or alternatively, a UE may perform aspects of the functions described below using special-purpose hardware.

At 3305, the UE may establish a communication link with a base station, the communication link including a sidelink communication link between the remote UE and a relay UE and a relay communication link between the relay UE and the base station. The operations of 3305 may be performed according to the methods described herein. In some examples, aspects of the operations of 3305 may be performed by a communication link component as described with reference to FIGS. 24 through 27.

At 3310, the UE may receive, over the sidelink communication link, an indication of one or more resources configured by the base station for transmission of a scheduling request to the relay UE over the sidelink communication link. The operations of 3310 may be performed according to the methods described herein. In some examples, aspects of the operations of 3310 may be performed by a resource configuration component as described with reference to FIGS. 24 through 27.

At 3315, the UE may trigger a BSR for transmission of data to the base station over the communication link. The operations of 3315 may be performed according to the methods described herein. In some examples, aspects of the operations of 3315 may be performed by a BSR triggering component as described with reference to FIGS. 24 through 27.

At 3320, the UE may identify, based on triggering the BSR, that resources on the sidelink communication link are unavailable for transmission of the BSR. The operations of 3320 may be performed according to the methods described herein. In some examples, aspects of the operations of 3320 may be performed by a resource availability component as described with reference to FIGS. 24 through 27.

At 3325, the UE may transmit, to the relay UE and over the sidelink communication link, a scheduling request using at least a portion of the one or more configured resources and based on identifying that the resources on the sidelink communication link are unavailable. The operations of 3325 may be performed according to the methods described herein. In some examples, aspects of the operations of 3325 may be performed by a scheduling request transmission component as described with reference to FIGS. 24 through 27.

At 3330, the UE may receive, over the sidelink communication link, a grant of resources for the sidelink communication link for a data transmission to the base station based on transmission of the scheduling request. The operations of 3330 may be performed according to the methods described herein. In some examples, aspects of the operations of 3330 may be performed by a resource grant component as described with reference to FIGS. 24 through 27.

At 3335, the UE may transmit the data over the sidelink communication link based on reception of the grant. The operations of 3335 may be performed according to the methods described herein. In some examples, aspects of the operations of 3335 may be performed by an uplink transmission component as described with reference to FIGS. 24 through 27.

Figure 34:
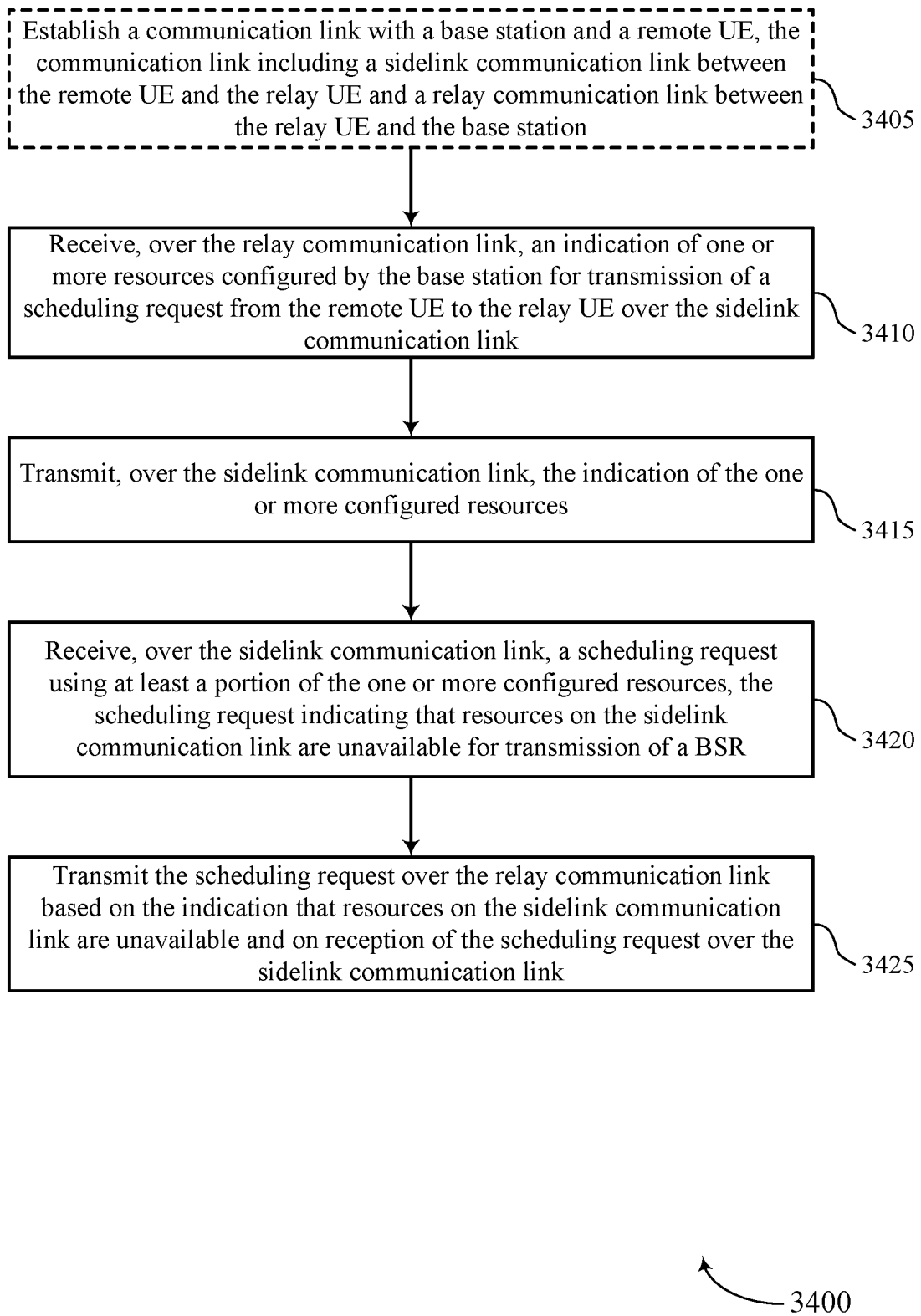

FIG. 34 shows a flowchart illustrating a method 3400 that supports configurations for sidelink scheduling requests in accordance with one or more aspects of the present disclosure. The operations of method 3400 may be implemented by a UE 115 or its components as described herein. For example, the operations of method 3400 may be performed by a communications manager as described with reference to FIGS. 24 through 27. In some examples, a UE may execute a set of instructions to control the functional elements of the UE to perform the functions described below.

Additionally or alternatively, a UE may perform aspects of the functions described below using special-purpose hardware.

At 3405, the UE may establish a communication link with a base station and a remote UE, the communication link including a sidelink communication link between the remote UE and the relay UE and a relay communication link between the relay UE and the base station. The operations of 3405 may be performed according to the methods described herein. In some examples, aspects of the operations of 3405 may be performed by a communication link component as described with reference to FIGS. 24 through 27.

At 3410, the UE may receive, over the relay communication link, an indication of one or more resources configured by the base station for transmission of a scheduling request from the remote UE to the relay UE over the sidelink communication link. The operations of 3410 may be performed according to the methods described herein. In some examples, aspects of the operations of 3410 may be performed by a resource configuration relay component as described with reference to FIGS. 24 through 27.

At 3415, the UE may transmit, over the sidelink communication link, the indication of the one or more configured resources. The operations of 3415 may be performed according to the methods described herein. In some examples, aspects of the operations of 3415 may be performed by a resource configuration relay component as described with reference to FIGS. 24 through 27.

At 3420, the UE may receive, over the sidelink communication link, a scheduling request using at least a portion of the one or more configured resources, the scheduling request indicating that resources on the sidelink communication link are unavailable for transmission of a BSR. The operations of 3420 may be performed according to the methods described herein. In some examples, aspects of the operations of 3420 may be performed by a scheduling request relay component as described with reference to FIGS. 24 through 27.

At 3425, the UE may transmit the scheduling request over the relay communication link based on the indication that resources on the sidelink communication link are unavailable and on reception of the scheduling request over the sidelink communication link. The operations of 3425 may be performed according to the methods described herein. In some examples, aspects of the operations of 3425 may be performed by a scheduling request relay component as described with reference to FIGS. 24 through 27.

Figure 35:
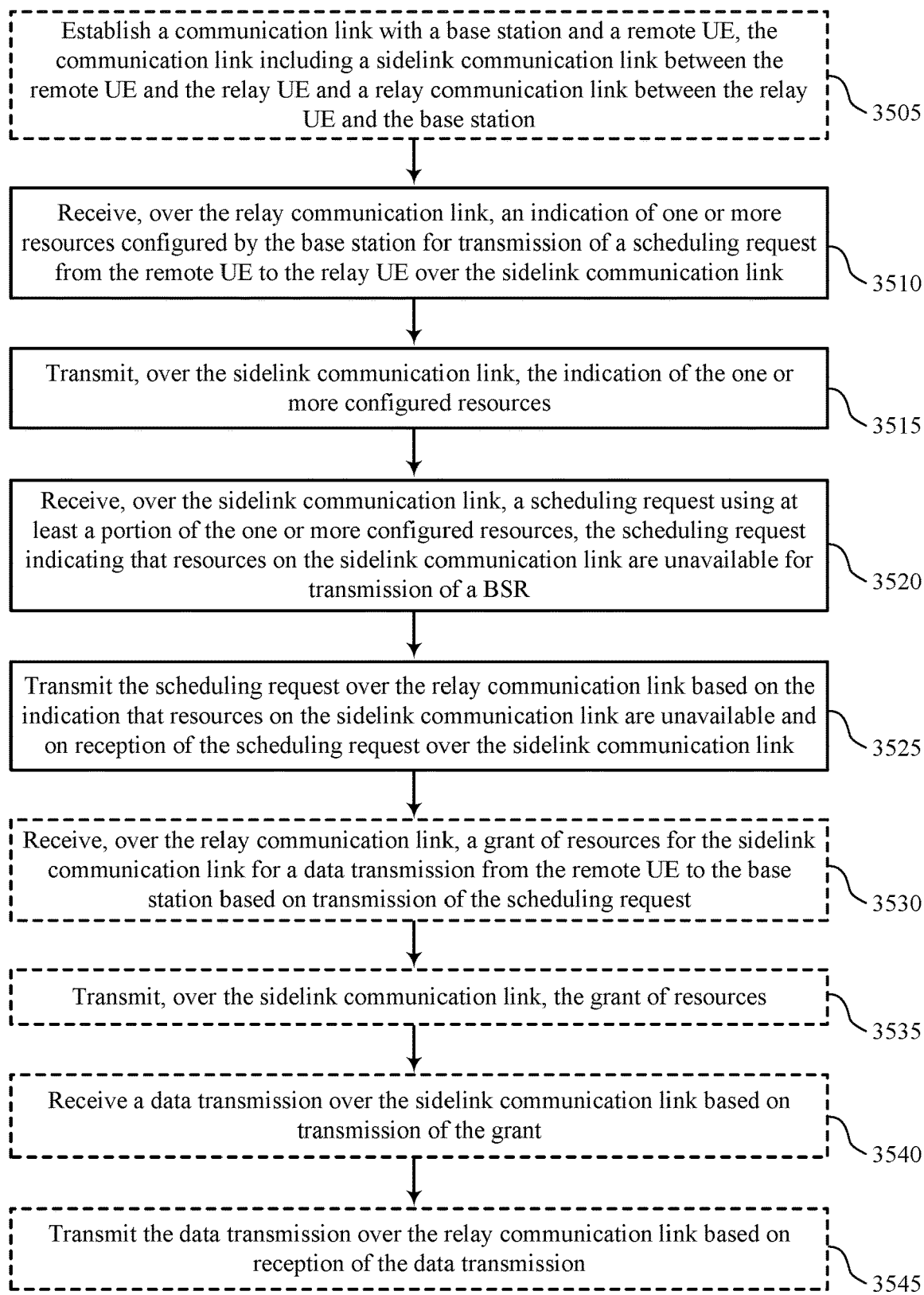

FIG. 35 shows a flowchart illustrating a method 3500 that supports configurations for sidelink scheduling requests in accordance with one or more aspects of the present disclosure. The operations of method 3500 may be implemented by a UE 115 or its components as described herein. For example, the operations of method 3500 may be performed by a communications manager as described with reference to FIGS. 24 through 27. In some examples, a UE may execute a set of instructions to control the functional elements of the UE to perform the functions described below. Additionally or alternatively, a UE may perform aspects of the functions described below using special-purpose hardware.

At 3505, the UE may establish a communication link with a base station and a remote UE, the communication link including a sidelink communication link between the remote UE and the relay UE and a relay communication link between the relay UE and the base station. The operations of 3505 may be performed according to the methods described herein. In some examples, aspects of the operations of 3505 may be performed by a communication link component as described with reference to FIGS. 24 through 27.

At 3510, the UE may receive, over the relay communication link, an indication of one or more resources configured by the base station for transmission of a scheduling request from the remote UE to the relay UE over the sidelink communication link. The operations of 3510 may be performed according to the methods described herein. In some examples, aspects of the operations of 3510 may be performed by a resource configuration relay component as described with reference to FIGS. 24 through 27.

At 3515, the UE may transmit, over the sidelink communication link, the indication of the one or more configured resources. The operations of 3515 may be performed according to the methods described herein. In some examples, aspects of the operations of 3515 may be performed by a resource configuration relay component as described with reference to FIGS. 24 through 27.

At 3520, the UE may receive, over the sidelink communication link, a scheduling request using at least a portion of the one or more configured resources, the scheduling request indicating that resources on the sidelink communication link are unavailable for transmission of a BSR. The operations of 3520 may be performed according to the methods described herein. In some examples, aspects of the operations of 3520 may be performed by a scheduling request relay component as described with reference to FIGS. 24 through 27.

At 3525, the UE may transmit the scheduling request over the relay communication link based on the indication that resources on the sidelink communication link are unavailable and on reception of the scheduling request over the sidelink communication link. The operations of 3525 may be performed according to the methods described herein. In some examples, aspects of the operations of 3525 may be performed by a scheduling request relay component as described with reference to FIGS. 24 through 27.

At 3530, the UE may receive, over the relay communication link, a grant of resources for the sidelink communication link for a data transmission from the remote UE to the base station based on transmission of the scheduling request. The operations of 3530 may be performed according to the methods described herein. In some examples, aspects of the operations of 3530 may be performed by a resource grant component as described with reference to FIGS. 24 through 27.

At 3535, the UE may transmit, over the sidelink communication link, the grant of resources. The operations of 3535 may be performed according to the methods described herein. In some examples, aspects of the operations of 3535 may be performed by a resource grant component as described with reference to FIGS. 24 through 27.

At 3540, the UE may receive a data transmission over the sidelink communication link based on transmission of the grant. The operations of 3540 may be performed according to the methods described herein. In some examples, aspects of the operations of 3540 may be performed by an uplink relay component as described with reference to FIGS. 24 through 27.

At 3545, the UE may transmit the data transmission over the relay communication link based on reception of the data transmission. The operations of 3545 may be performed according to the methods described herein. In some examples, aspects of the operations of 3545 may be performed by an uplink relay component as described with reference to FIGS. 24 through 27.

Figure 36:
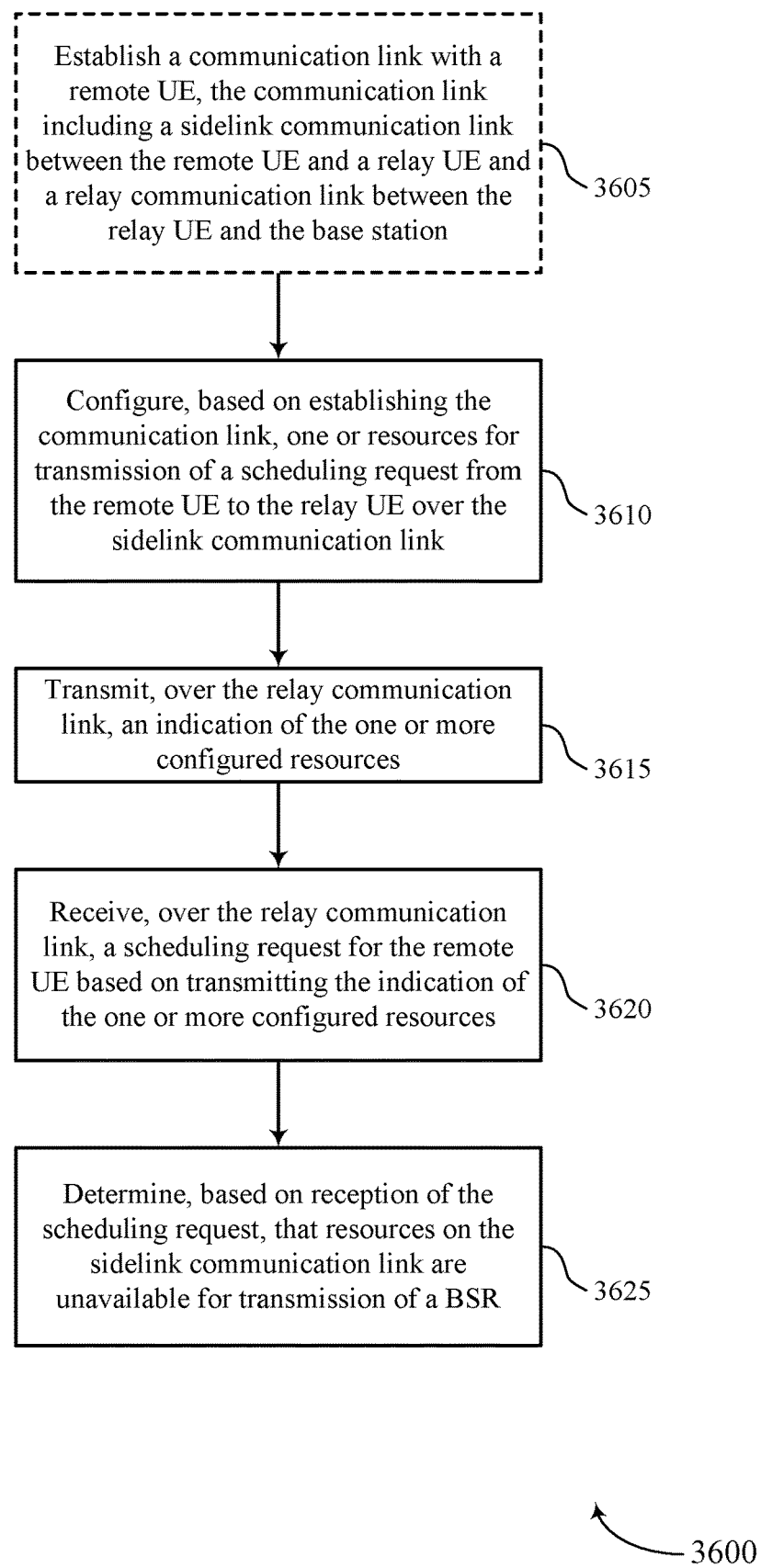

FIG. 36 shows a flowchart illustrating a method 3600 that supports configurations for sidelink scheduling requests in accordance with one or more aspects of the present disclosure. The operations of method 3600 may be implemented by a base station 105 or its components as described herein. For example, the operations of method 3600 may be performed by a communications manager as described with reference to FIGS. 28 through 31. In some examples, a base station may execute a set of instructions to control the functional elements of the base station to perform the functions described below. Additionally or alternatively, a base station may perform aspects of the functions described below using special-purpose hardware.

At 3605, the base station may establish a communication link with a remote UE, the communication link including a sidelink communication link between the remote UE and a relay UE and a relay communication link between the relay UE and the base station. The operations of 3605 may be performed according to the methods described herein. In some examples, aspects of the operations of 3605 may be performed by a communication link establishment component as described with reference to FIGS. 28 through 31.

At 3610, the base station may configure, based on establishing the communication link, one or resources for transmission of a scheduling request from the remote UE to the relay UE over the sidelink communication link. The operations of 3610 may be performed according to the methods described herein. In some examples, aspects of the operations of 3610 may be performed by a resource configuration component as described with reference to FIGS. 28 through 31.

At 3615, the base station may transmit, over the relay communication link, an indication of the one or more configured resources. The operations of 3615 may be performed according to the methods described herein. In some examples, aspects of the operations of 3615 may be performed by a resource configuration indication component as described with reference to FIGS. 28 through 31.

At 3620, the base station may receive, over the relay communication link, a scheduling request for the remote UE based on transmitting the indication of the one or more configured resources. The operations of 3620 may be performed according to the methods described herein. In some examples, aspects of the operations of 3620 may be performed by a scheduling request reception component as described with reference to FIGS. 28 through 31.

At 3625, the base station may determine, based on reception of the scheduling request, that resources on the sidelink communication link are unavailable for transmission of a BSR. The operations of 3625 may be performed according to the methods described herein. In some examples, aspects of the operations of 3625 may be performed by a resource grant manager as described with reference to FIGS. 28 through 31.

Figure 37:
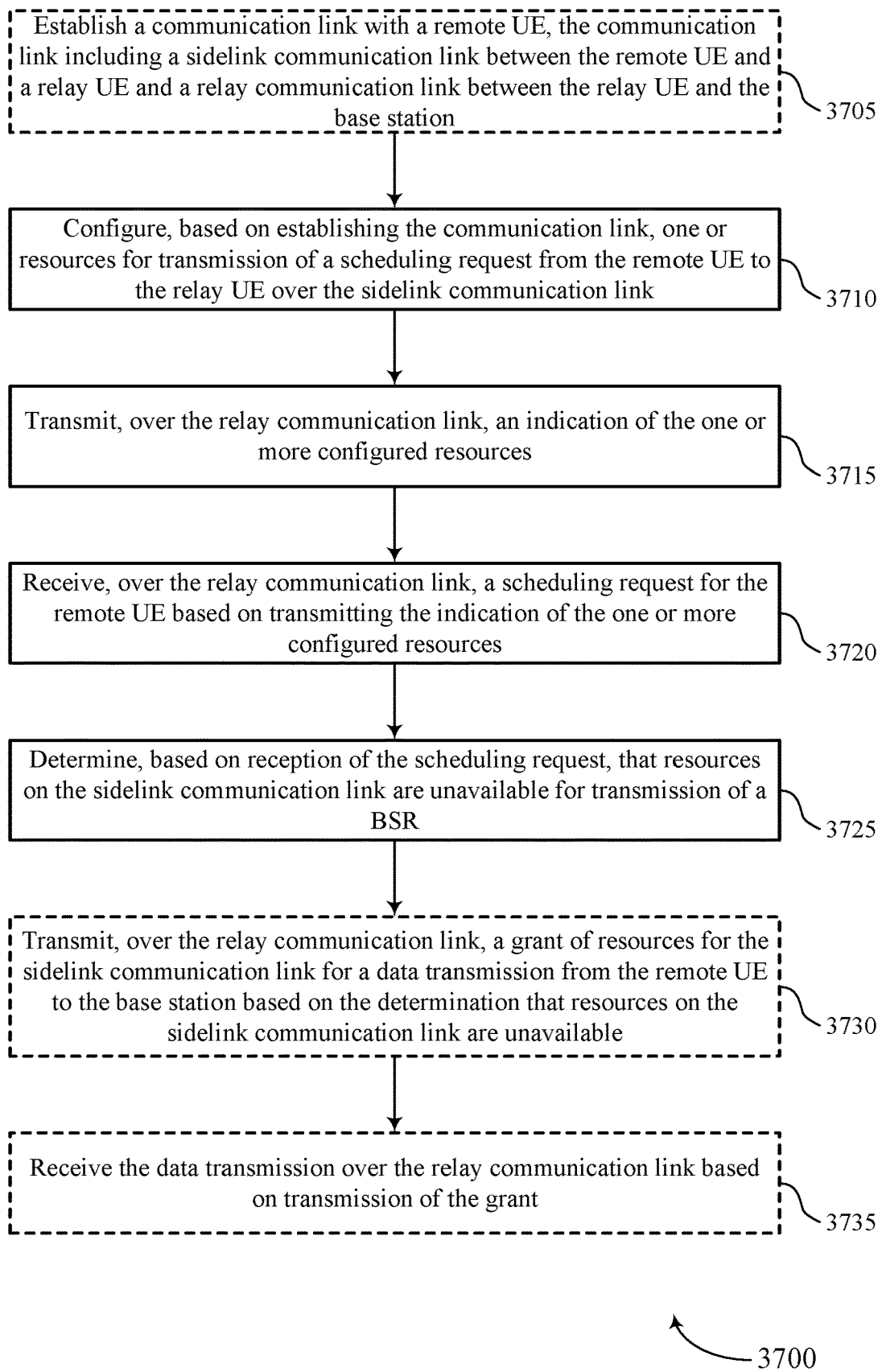

FIG. 37 shows a flowchart illustrating a method 3700 that supports configurations for sidelink scheduling requests in accordance with one or more aspects of the present disclosure. The operations of method 3700 may be implemented by a base station 105 or its components as described herein. For example, the operations of method 3700 may be performed by a communications manager as described with reference to FIGS. 28 through 31. In some examples, a base station may execute a set of instructions to control the functional elements of the base station to perform the functions described below. Additionally or alternatively, a base station may perform aspects of the functions described below using special-purpose hardware.

At 3705, the base station may establish a communication link with a remote UE, the communication link including a sidelink communication link between the remote UE and a relay UE and a relay communication link between the relay UE and the base station. The operations of 3705 may be performed according to the methods described herein. In some examples, aspects of the operations of 3705 may be performed by a communication link establishment component as described with reference to FIGS. 28 through 31.

At 3710, the base station may configure, based on establishing the communication link, one or resources for transmission of a scheduling request from the remote UE to the relay UE over the sidelink communication link. The operations of 3710 may be performed according to the methods described herein. In some examples, aspects of the operations of 3710 may be performed by a resource configuration component as described with reference to FIGS. 28 through 31.

At 3715, the base station may transmit, over the relay communication link, an indication of the one or more configured resources. The operations of 3715 may be performed according to the methods described herein. In some examples, aspects of the operations of 3715 may be performed by a resource configuration indication component as described with reference to FIGS. 28 through 31.

At 3720, the base station may receive, over the relay communication link, a scheduling request for the remote UE based on transmitting the indication of the one or more configured resources. The operations of 3720 may be performed according to the methods described herein. In some examples, aspects of the operations of 3720 may be performed by a scheduling request reception component as described with reference to FIGS. 28 through 31.

At 3725, the base station may determine, based on reception of the scheduling request, that resources on the sidelink communication link are unavailable for transmission of a BSR. The operations of 3725 may be performed according to the methods described herein. In some examples, aspects of the operations of 3725 may be performed by a resource grant manager as described with reference to FIGS. 28 through 31.

At 3730, the base station may transmit, over the relay communication link, a grant of resources for the sidelink communication link for a data transmission from the remote UE to the base station based on the determination that resources on the sidelink communication link are unavailable. The operations of 3730 may be performed according to the methods described herein. In some examples, aspects of the operations of 3730 may be performed by a resource grant manager as described with reference to FIGS. 28 through 31.

At 3735, the base station may receive the data transmission over the relay communication link based on transmission of the grant. The operations of 3735 may be performed according to the methods described herein. In some examples, aspects of the operations of 3735 may be performed by an uplink reception component as described with reference to FIGS. 28 through 31.

Figure 38:
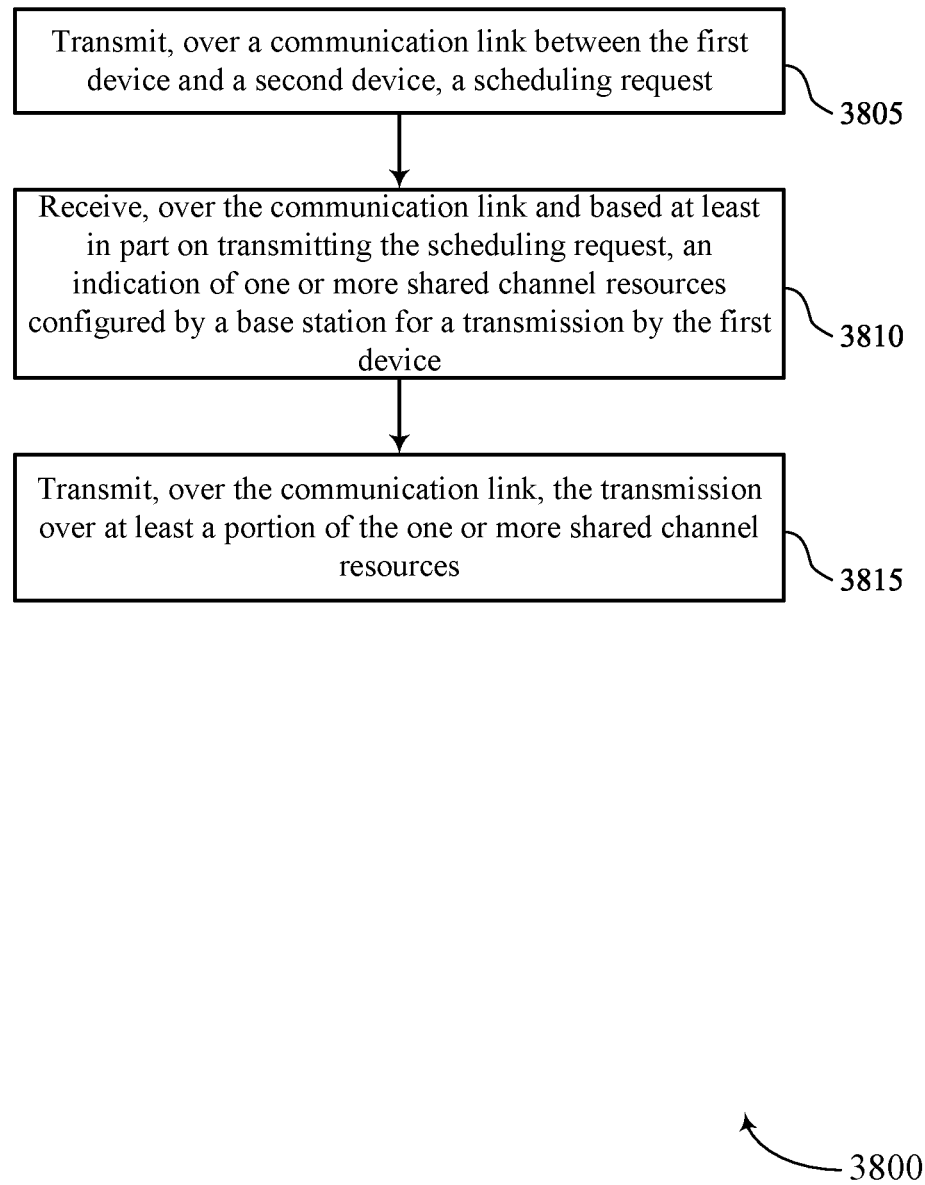

FIG. 38 shows a flowchart illustrating a method 3800 that supports scheduling sidelink transmission with relay in accordance with aspects of the present disclosure. The operations of the method 3800 may be implemented by a UE or its components as described herein. For example, the operations of the method 3800 may be performed by a UE 115 as described with reference to FIGS. 6 through 9. In some examples, a UE may execute a set of instructions to control the functional elements of the UE to perform the described functions. Additionally or alternatively, the UE may perform aspects of the described functions using special-purpose hardware.

At 3805, the method may include transmitting, over a communication link between the first device and a second device, a scheduling request. The operations of 3805 may be performed in accordance with examples as disclosed herein. In some examples, aspects of the operations of 3805 may be performed by an SR component 830 as described with reference to FIG. 8.

At 3810, the method may include receiving, over the communication link and based on transmitting the scheduling request, an indication of one or more shared channel resources configured by a base station for a transmission by the first device. The operations of 3810 may be performed in accordance with examples as disclosed herein. In some examples, aspects of the operations of 3810 may be performed by a sidelink grant component 815 as described with reference to FIG. 8.

At 3815, the method may include transmitting, over the communication link, the transmission over at least a portion of the one or more shared channel resources. The operations of 3815 may be performed in accordance with examples as disclosed herein. In some examples, aspects of the operations of 3815 may be performed by a sidelink transmission component 825 as described with reference to FIG. 8.

Figure 39:
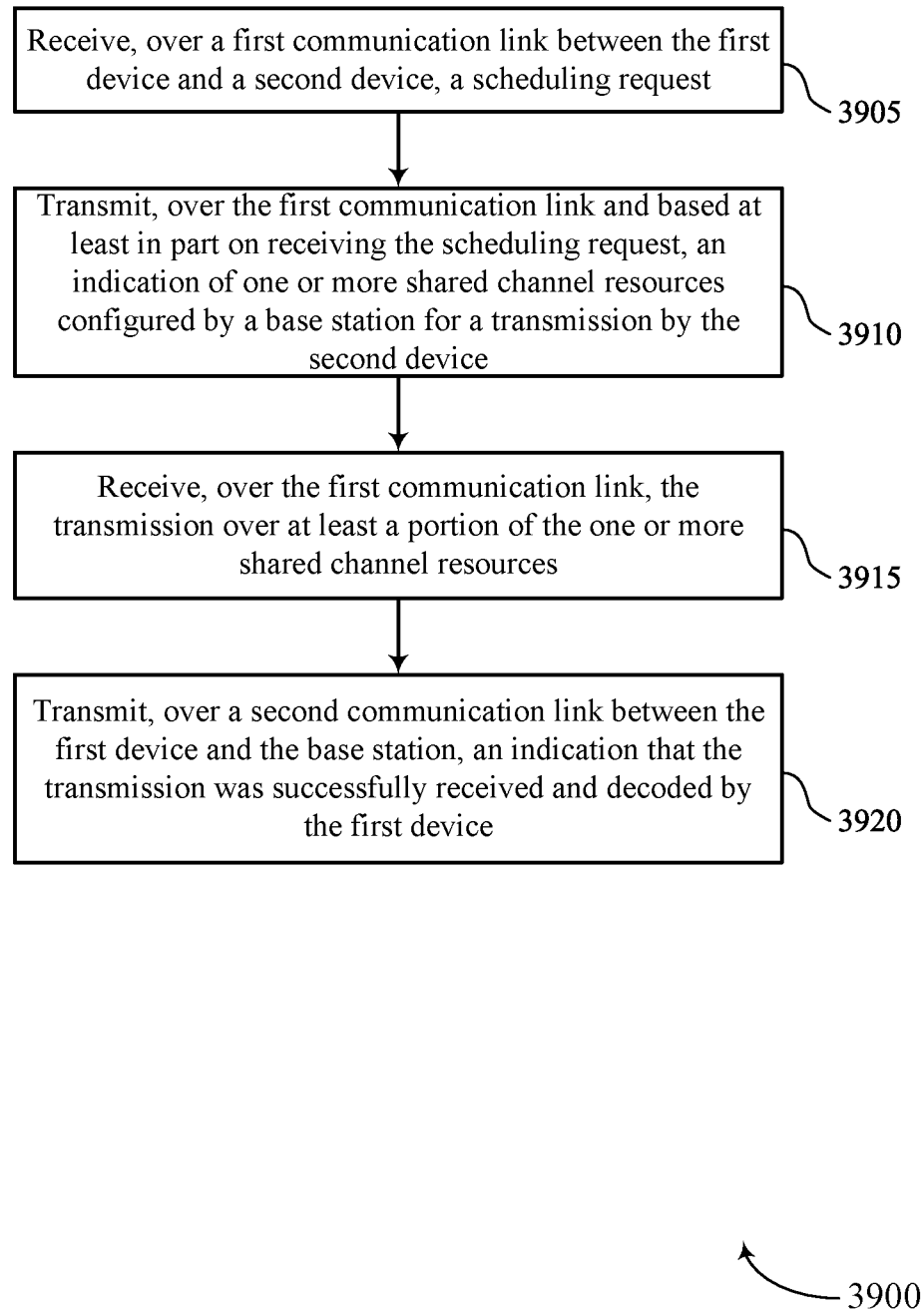

FIG. 39 shows a flowchart illustrating a method 3900 that supports scheduling sidelink transmission with relay in accordance with aspects of the present disclosure. The operations of the method 3900 may be implemented by a UE or its components as described herein. For example, the operations of the method 3900 may be performed by a UE 115 as described with reference to FIGS. 6 through 9. In some examples, a UE may execute a set of instructions to control the functional elements of the UE to perform the described functions. Additionally or alternatively, the UE may perform aspects of the described functions using special-purpose hardware.

At 3905, the method may include receiving, over a first communication link between the first device and a second device, a scheduling request. The operations of 3905 may be performed in accordance with examples as disclosed herein. In some examples, aspects of the operations of 3905 may be performed by an SR component 830 as described with reference to FIG. 8.

At 3910, the method may include transmitting, over the first communication link and based on receiving the scheduling request, an indication of one or more shared channel resources configured by a base station for a transmission by the second device. The operations of 3910 may be performed in accordance with examples as disclosed herein. In some examples, aspects of the operations of 3910 may be performed by a sidelink grant component 815 as described with reference to FIG. 8.

At 3915, the method may include receiving, over the first communication link, the transmission over at least a portion of the one or more shared channel resources. The operations of 3915 may be performed in accordance with examples as disclosed herein. In some examples, aspects of the operations of 3915 may be performed by a sidelink transmission component 825 as described with reference to FIG. 8.

At 3920, the method may include transmitting, over a second communication link between the first device and the base station, an indication that the transmission was successfully received and decoded by the first device. The operations of 3920 may be performed in accordance with examples as disclosed herein. In some examples, aspects of the operations of 3920 may be performed by a feedback component 840 as described with reference to FIG. 8.

Figure 40:
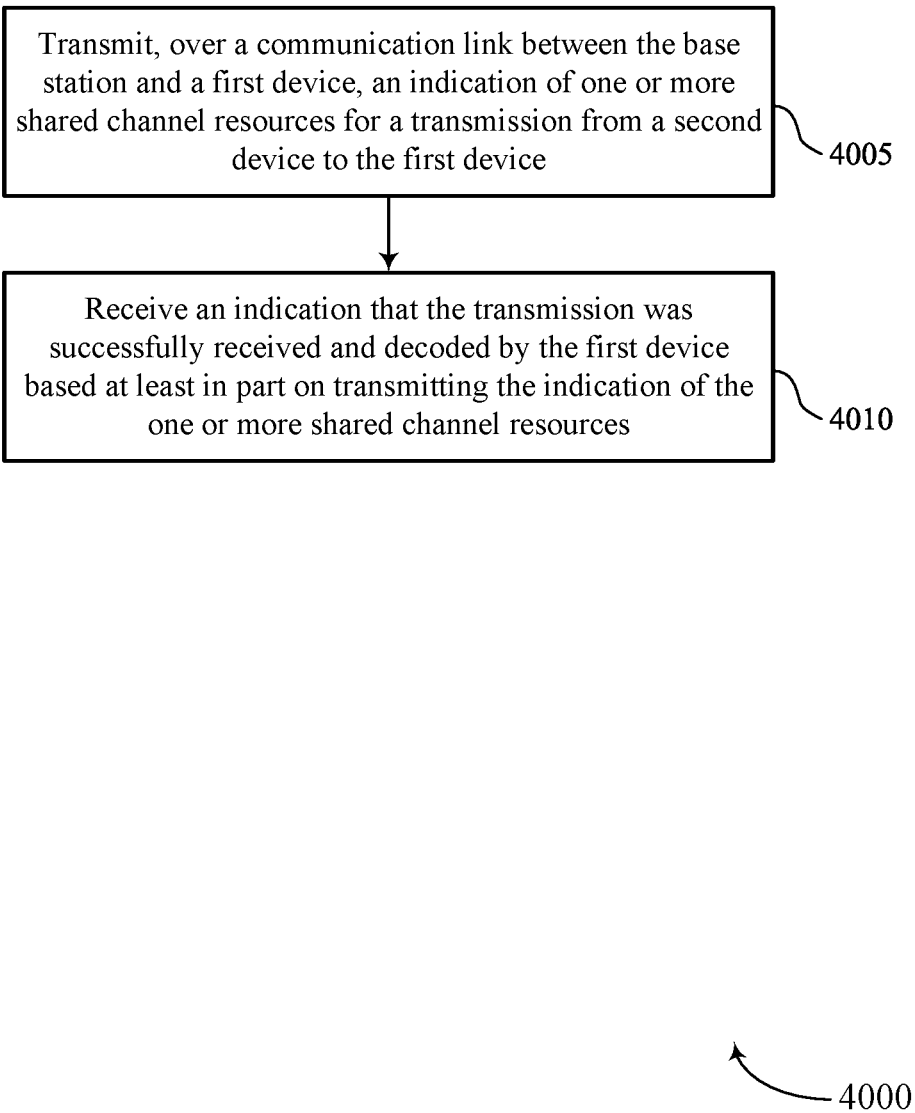

FIG. 40 shows a flowchart illustrating a method 4000 that supports scheduling sidelink transmission with relay in accordance with aspects of the present disclosure. The operations of the method 4000 may be implemented by a base station or its components as described herein. For example, the operations of the method 4000 may be performed by a base station 105 as described with reference to FIGS. 10 through 13. In some examples, a base station may execute a set of instructions to control the functional elements of the base station to perform the described functions. Additionally or alternatively, the base station may perform aspects of the described functions using special-purpose hardware.

At 4005, the method may include transmitting, over a communication link between the base station and a first device, an indication of one or more shared channel resources for a transmission from a second device to the first device. The operations of 4005 may be performed in accordance with examples as disclosed herein. In some examples, aspects of the operations of 4005 may be performed by a sidelink grant transmitter 1215 as described with reference to FIG. 12.

At 4010, the method may include receiving an indication that the transmission was successfully received and decoded by the first device based on transmitting the indication of the one or more shared channel resources. The operations of 4010 may be performed in accordance with examples as disclosed herein. In some examples, aspects of the operations of 4010 may be performed by a feedback receiver as described with reference to FIG. 12.

Figure 41:
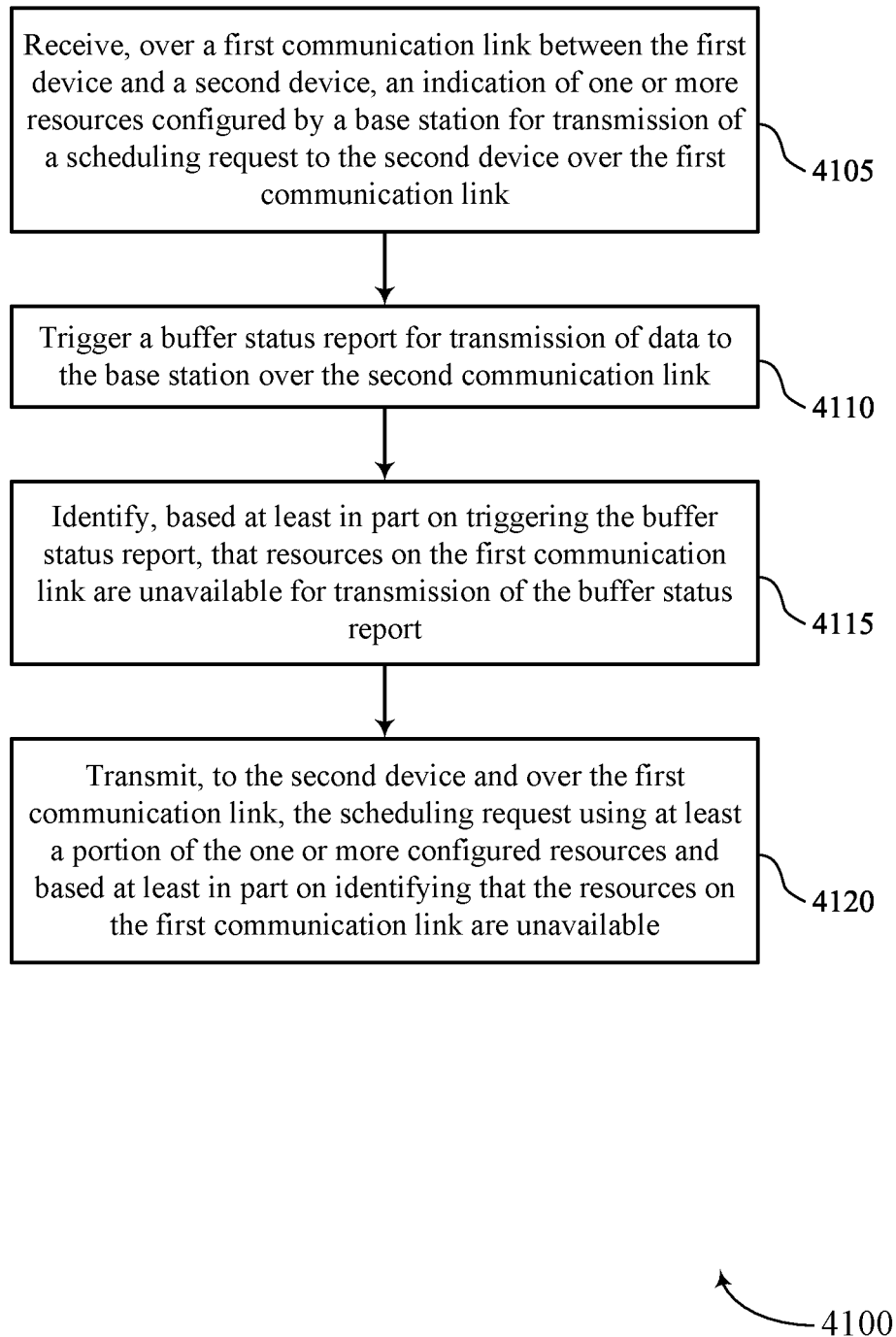

FIG. 41 shows a flowchart illustrating a method 4100 that supports scheduling sidelink transmission with relay in accordance with aspects of the present disclosure. The operations of the method 4100 may be implemented by a UE or its components as described herein. For example, the operations of the method 4100 may be performed by a UE 115 as described with reference to FIGS. 24 through 27. In some examples, a UE may execute a set of instructions to control the functional elements of the UE to perform the described functions. Additionally or alternatively, the UE may perform aspects of the described functions using special-purpose hardware.

At 4105, the method may include receiving, over a first communication link between the first device and a second device, an indication of one or more resources configured by a base station for transmission of a scheduling request to the second device over the first communication link. The operations of 4105 may be performed in accordance with examples as disclosed herein. In some examples, aspects of the operations of 4105 may be performed by a resource configuration component 2615 as described with reference to FIG. 26.

At 4110, the method may include triggering a buffer status report for transmission of data to the base station over the second communication link. The operations of 4110 may be performed in accordance with examples as disclosed herein. In some examples, aspects of the operations of 4110 may be performed by a BSR triggering component 2620 as described with reference to FIG. 26.

At 4115, the method may include identifying, based on triggering the buffer status report, that resources on the first communication link are unavailable for transmission of the buffer status report. The operations of 4115 may be performed in accordance with examples as disclosed herein. In some examples, aspects of the operations of 4115 may be performed by a resource availability component 2625 as described with reference to FIG. 26.

At 4120, the method may include transmitting, to the second device and over the first communication link, the scheduling request using at least a portion of the one or more configured resources and based on identifying that the resources on the first communication link are unavailable. The operations of 4120 may be performed in accordance with examples as disclosed herein. In some examples, aspects of the operations of 4120 may be performed by a scheduling request transmission component 2630 as described with reference to FIG. 26.

Figure 42:
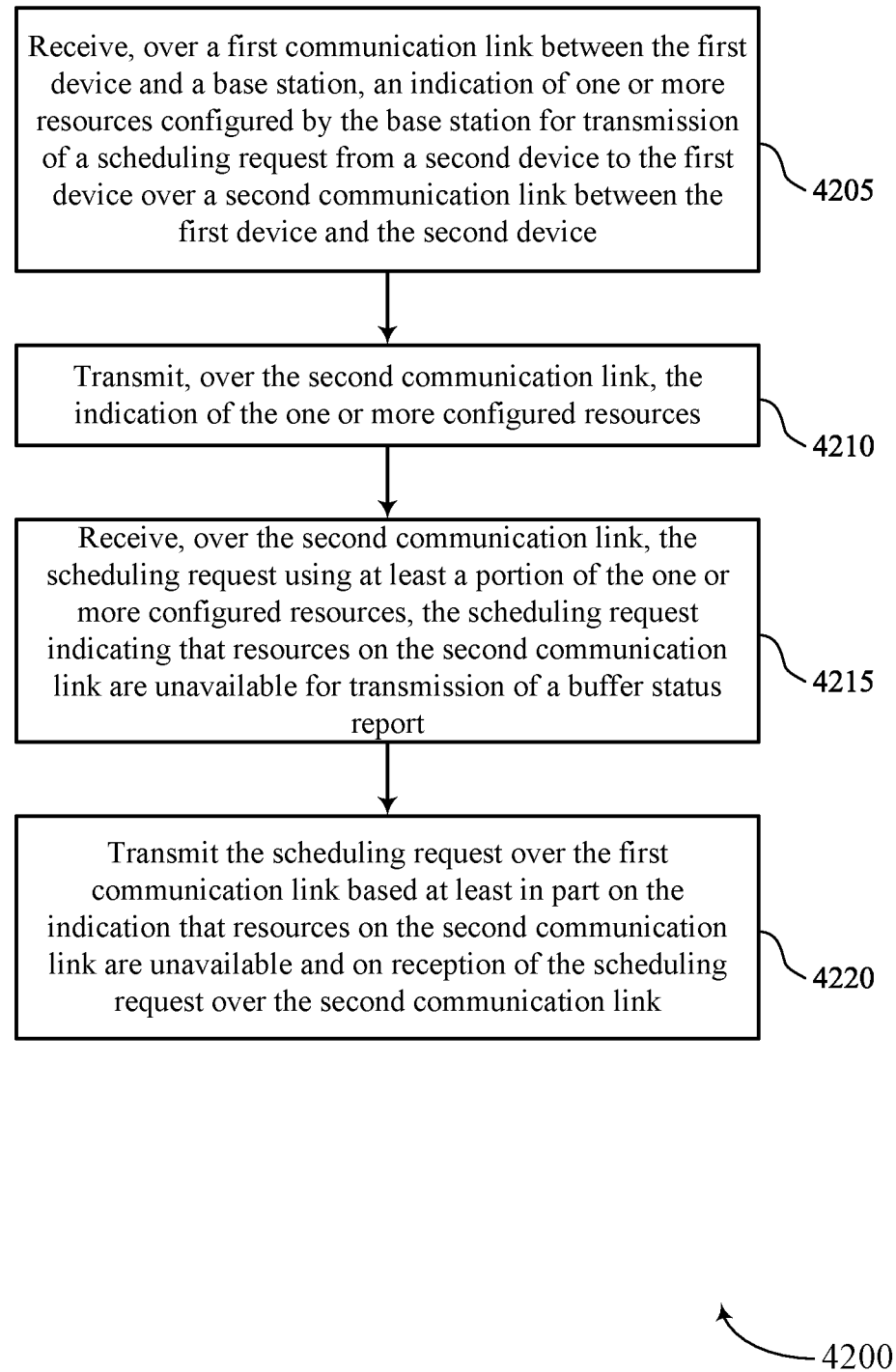

FIG. 42 shows a flowchart illustrating a method 4200 that supports scheduling sidelink transmission with relay in accordance with aspects of the present disclosure. The operations of the method 4200 may be implemented by a UE or its components as described herein. For example, the operations of the method 4200 may be performed by a UE 115 as described with reference to FIGS. 24 through 27. In some examples, a UE may execute a set of instructions to control the functional elements of the UE to perform the described functions. Additionally or alternatively, the UE may perform aspects of the described functions using special-purpose hardware.

At 4205, the method may include receiving, over a first communication link between the first device and a base station, an indication of one or more resources configured by the base station for transmission of a scheduling request from a second device to the first device over a second communication link between the first device and the second device. The operations of 4205 may be performed in accordance with examples as disclosed herein. In some examples, aspects of the operations of 4205 may be performed by a resource configuration relay component 2650 as described with reference to FIG. 26.

At 4210, the method may include transmitting, over the second communication link, the indication of the one or more configured resources. The operations of 4210 may be performed in accordance with examples as disclosed herein. In some examples, aspects of the operations of 4210 may be performed by a resource configuration relay component 2650 as described with reference to FIG. 26.

At 4215, the method may include receiving, over the second communication link, the scheduling request using at least a portion of the one or more configured resources, the scheduling request indicating that resources on the second communication link are unavailable for transmission of a buffer status report. The operations of 4215 may be performed in accordance with examples as disclosed herein. In some examples, aspects of the operations of 4215 may be performed by a scheduling request relay component 2655 as described with reference to FIG. 26.

At 4220, the method may include transmitting the scheduling request over the first communication link based on the indication that resources on the second communication link are unavailable and on reception of the scheduling request over the second communication link. The operations of 4220 may be performed in accordance with examples as disclosed herein. In some examples, aspects of the operations of 4220 may be performed by a scheduling request relay component 2655 as described with reference to FIG. 26.

Figure 43:
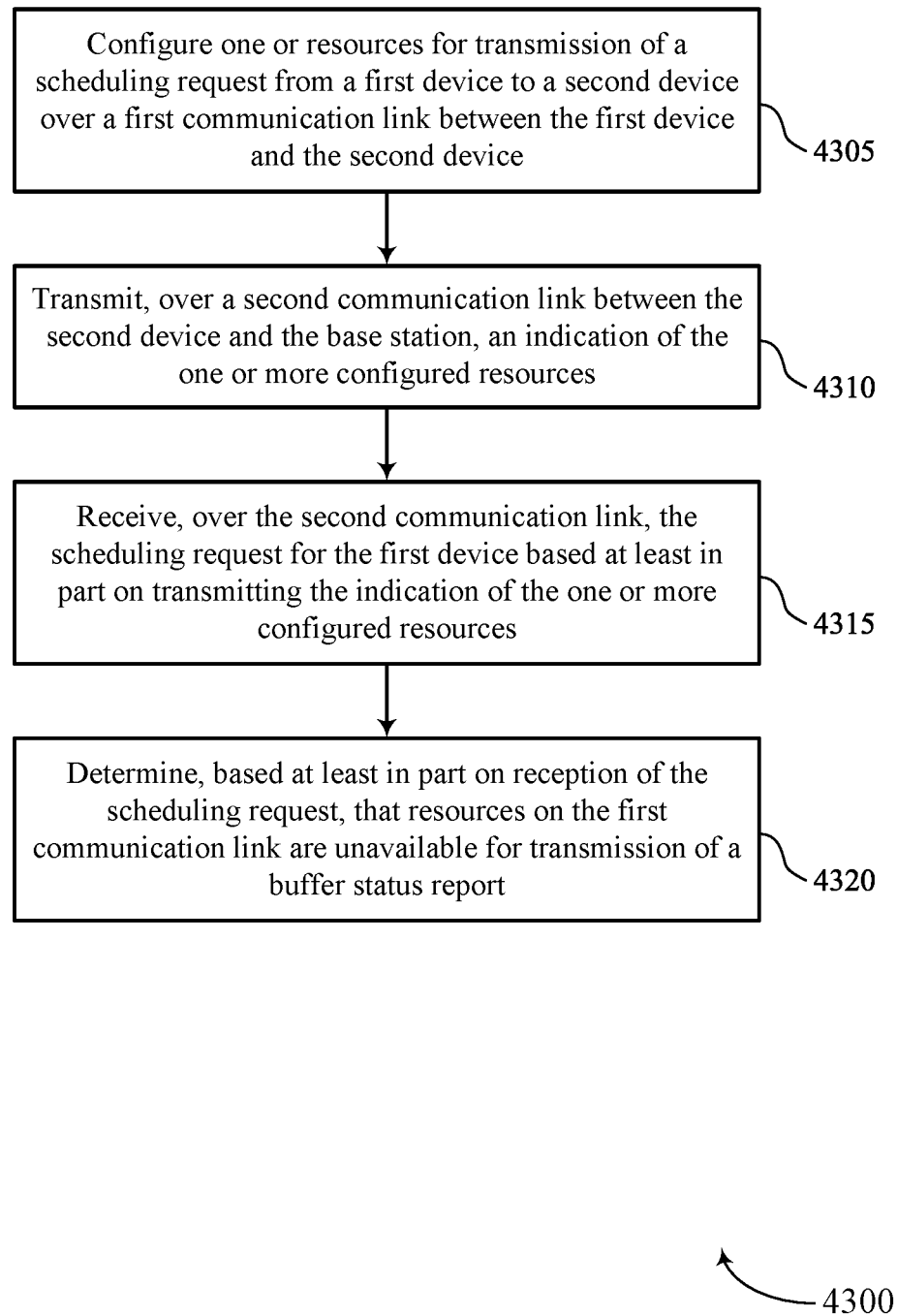

FIG. 43 shows a flowchart illustrating a method 4300 that supports scheduling sidelink transmission with relay in accordance with aspects of the present disclosure. The operations of the method 4300 may be implemented by a base station or its components as described herein. For example, the operations of the method 4300 may be performed by a base station 105 as described with reference to FIGS. 28 through 31. In some examples, a base station may execute a set of instructions to control the functional elements of the base station to perform the described functions. Additionally or alternatively, the base station may perform aspects of the described functions using special-purpose hardware.

At 4305, the method may include configuring one or resources for transmission of a scheduling request from a first device to a second device over a first communication link between the first device and the second device. The operations of 4305 may be performed in accordance with examples as disclosed herein. In some examples, aspects of the operations of 4305 may be performed by a resource configuration component 3015 as described with reference to FIG. 30.

At 4310, the method may include transmitting, over a second communication link between the second device and the base station, an indication of the one or more configured resources. The operations of 4310 may be performed in accordance with examples as disclosed herein. In some examples, aspects of the operations of 4310 may be performed by a as described with reference to FIG. #.

At 4315, the method may include receiving, over the second communication link, the scheduling request for the first device based on transmitting the indication of the one or more configured resources. The operations of 4315 may be performed in accordance with examples as disclosed herein. In some examples, aspects of the operations of 4315 may be performed by a scheduling request reception component 3025 as described with reference to FIG. 30.

At 4320, the method may include determining, based on reception of the scheduling request, that resources on the first communication link are unavailable for transmission of a buffer status report. The operations of 4320 may be performed in accordance with examples as disclosed herein. In some examples, aspects of the operations of 4320 may be performed by a resource grant manager 3030 as described with reference to FIG. 30.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Aspect 1: A method for wireless communication at a first device, comprising: transmitting, over a communication link between the first device and a second device, a scheduling request; receiving, over the communication link and based at least in part on transmitting the scheduling request, an indication of one or more shared channel resources configured by a base station for a transmission by the first device; and transmitting, over the communication link, the transmission over at least a portion of the one or more shared channel resources.

Aspect 2: The method of aspect 1, further comprising: receiving a control signal from the base station indicating a priority for each of a plurality of logical channel groups of the first device.

Aspect 3: The method of any of aspects 1 through 2, further comprising: determining that a criterion for transmitting the transmission is satisfied, wherein the transmitting the transmission over at least the portion of the one or more shared channel resources is based at least in part on determining that the criterion is satisfied, wherein the transmission corresponds to data stored at the first device, and wherein the criterion comprises the first device receiving the data at an empty buffer, the data being associated with a logical channel that has a higher priority than one or more additional logical channels associated with additional data stored at the first device, or a combination thereof.

Aspect 4: A method for wireless communication at a first device, comprising: receiving, over a first communication link between the first device and a second device, a scheduling request; transmitting, over the first communication link and based at least in part on receiving the scheduling request, an indication of one or more shared channel resources configured by a base station for a transmission by the second device; receiving, over the first communication link, the transmission over at least a portion of the one or more shared channel resources; and transmitting, over a second communication link between the first device and the base station, an indication that the transmission was successfully received and decoded by the first device.

Aspect 5: The method of aspect 4, further comprising: receiving, over the second communication link, an indication of one or more feedback channel resources for the scheduling request from the second device to the first device; and transmitting, over the first communication link, the indication of the one or more feedback channel resources, wherein the scheduling request is received over at least a portion of the one or more feedback channel resources.

Aspect 6: The method of aspect 5, wherein the transmission corresponds to data stored at the second device, and further comprising: receiving, over the second communication link, an indication of one or more additional feedback channel resources for the scheduling request from the second device to the first device; and transmitting, over the first communication link, the indication of the one or more additional feedback channel resources, wherein the one or more feedback channel resources are associated with a first priority and the one or more additional feedback channel resources are associated with a second priority, and wherein the scheduling request is received over the at least the portion of the one or more feedback channel resources based at least in part on the data being associated with a logical channel group with the first priority.

Aspect 7: The method of aspect 6, wherein the one or more feedback channel resources is associated with a first prohibit timer and a first maximum transmission counter, and the one or more additional feedback channel resources is associated with a second prohibit timer and a second maximum transmission counter.

Aspect 8: The method of any of aspects 4 through 7, further comprising: receiving a first control signal over the second communication link indicating a priority for each of a plurality of logical channel groups of the second device; and transmitting a second control signal over the first communication link indicating the priority for each of the plurality of logical channel groups of the second device.

Aspect 9: The method of aspect 8, further comprising: transmitting, to a third device, a third control signal indicating the priority for each of the plurality of logical channel groups of the second device.

Aspect 10: The method of any of aspects 4 through 9, wherein the transmission comprises a buffer status report, and further comprising: transmitting the buffer status report over the second communication link.

Aspect 11: The method of any of aspects 4 through 10, further comprising: transmitting, over the second communication link, a second scheduling request over the second communication link based at least in part on receiving the scheduling request over the first communication link; and receiving, over the second communication link, the indication of the one or more shared channel resources based at least in part on transmitting the second scheduling request.

Aspect 12: The method of any of aspects 4 through 11, further comprising: transmitting, over the first communication link, an indication of second one or more shared channel resources configured by the base station for the transmission; determining that the first device has failed to successfully receive and decode the transmission over the second one or more shared channel resources; and transmitting, over the second communication link, an indication that the first device has failed to successfully receive and decode the transmission based at least in part on the determining, wherein receiving the indication of the one or more shared channel resources is based at least in part on transmitting the indication that the first device has failed to successfully receive and decode the transmission.

Aspect 13: The method of any of aspects 4 through 12, wherein the scheduling request is received over a dedicated feedback channel.

Aspect 14: The method of any of aspects 4 through 13, wherein the transmission corresponds to data stored at the second device, and the scheduling request explicitly indicates a priority of a logical channel group associated with the data.

Aspect 15: The method of any of aspects 4 through 14, wherein the transmission corresponds to data stored at the second device, and the transmission indicates a priority of one or more logical channel groups associated with the data stored at the second device.

Aspect 16: The method of any of aspects 4 through 15, wherein the transmission comprises a buffer status report corresponding to data stored at the second device.

Aspect 17: A method for wireless communication at a base station, comprising: transmitting, over a communication link between the base station and a first device, an indication of one or more shared channel resources for a transmission from a second device to the first device; and receiving an indication that the transmission was successfully received and decoded by the first device based at least in part on transmitting the indication of the one or more shared channel resources.

Aspect 18: A method for wireless communication at a first device, comprising: receiving, over a first communication link between the first device and a second device, an indication of one or more resources configured by a base station for transmission of a scheduling request to the second device over the first communication link; triggering a buffer status report for transmission of data to the base station over the second communication link; identifying, based at least in part on triggering the buffer status report, that resources on the first communication link are unavailable for transmission of the buffer status report; and transmitting, to the second device and over the first communication link, the scheduling request using at least a portion of the one or more configured resources and based at least in part on identifying that the resources on the first communication link are unavailable.

Aspect 19: The method of aspect 18, further comprising: initiating a counter based at least in part on transmission of the scheduling request.

Aspect 20: The method of aspect 19, further comprising: transmitting, over the first communication link, the buffer status report based at least in part on transmission of the scheduling request; and resetting the counter to an initial value based at least in part on transmission of the buffer status report.

Aspect 21: The method of any of aspects 19 through 20, further comprising: transmitting, over the first communication link, a second scheduling request based at least in part on the triggered buffer status report; and incrementing the counter based at least in part on transmission of the second scheduling request.

Aspect 22: A method for wireless communication at a first device, comprising: receiving, over a first communication link between the first device and a base station, an indication of one or more resources configured by the base station for transmission of a scheduling request from a second device to the first device over a second communication link between the first device and the second device; transmitting, over the second communication link, the indication of the one or more configured resources; receiving, over the second communication link, the scheduling request using at least a portion of the one or more configured resources, the scheduling request indicating that resources on the second communication link are unavailable for transmission of a buffer status report; and transmitting the scheduling request over the first communication link based at least in part on the indication that resources on the second communication link are unavailable and on reception of the scheduling request over the second communication link.

Aspect 23: The method of aspect 22, further comprising: receiving, over the first communication link, a second indication of one or more second resources configured by the base station for transmission of the scheduling request from the second device to the first device over the second communication link; and transmitting, over the second communication link, the second indication of the one or more second resources.

Aspect 24: The method of aspect 23, wherein the one or more configured resources are associated with a first quality of service for first communications on the first communication link and the one or more second resources are associated with a second quality of service for second communications on the first communication link.

Aspect 25: The method of any of aspects 23 through 24, wherein the one or more configured resources are associated with a first set of logical channels and the one or more second resources are associated with a second set of logical channels, the first set of logical channels associated with a first range of logical channel priorities and the second set of logical channels associated with a second range of logical channel priorities.

Aspect 26: The method of aspect 25, further comprising: identifying a priority of the received scheduling request based at least in part on the first range of logical channel priorities and receiving the scheduling request on the at least a portion of the one or more configured resources; and configuring a logical channel for transmission of the scheduling request based at least in part on the identified priority.

Aspect 27: The method of any of aspects 23 through 26, wherein the one or more configured resources are associated with a first timer for prohibiting transmission of the scheduling request and the one or more second resources are associated with a second timer for prohibiting transmission of the scheduling request.

Aspect 28: The method of any of aspects 22 through 27, further comprising: receiving a notification over the second communication link that comprises an indication that the second device has released the one or more configured resources; and transmitting, the notification over the first communication link based at least in part on receiving the notification.

Aspect 29: The method of any of aspects 22 through 28, wherein the scheduling request comprises a plurality of bits and the plurality of bits comprises an indication of a priority associated with the scheduling request.

Aspect 30: A method for wireless communication at a base station, comprising: configuring one or resources for transmission of a scheduling request from a first device to a second device over a first communication link between the first device and the second device; transmitting, over a second communication link between the second device and the base station, an indication of the one or more configured resources; receiving, over the second communication link, the scheduling request for the first device based at least in part on transmitting the indication of the one or more configured resources; and determining, based at least in part on reception of the scheduling request, that resources on the first communication link are unavailable for transmission of a buffer status report.

Aspect 31: An apparatus for wireless communication at a first device, comprising a processor; memory coupled with the processor; and instructions stored in the memory and executable by the processor to cause the apparatus to perform a method of any of aspects 1 through 3.

Aspect 32: An apparatus for wireless communication at a first device, comprising at least one means for performing a method of any of aspects 1 through 3.

Aspect 33: A non-transitory computer-readable medium storing code for wireless communication at a first device, the code comprising instructions executable by a processor to perform a method of any of aspects 1 through 3.

Aspect 34: An apparatus for wireless communication at a first device, comprising a processor; memory coupled with the processor; and instructions stored in the memory and executable by the processor to cause the apparatus to perform a method of any of aspects 4 through 16.

Aspect 35: An apparatus for wireless communication at a first device, comprising at least one means for performing a method of any of aspects 4 through 16.

Aspect 36: A non-transitory computer-readable medium storing code for wireless communication at a first device, the code comprising instructions executable by a processor to perform a method of any of aspects 4 through 16.

Aspect 37: An apparatus for wireless communication at a base station, comprising a processor; memory coupled with the processor; and instructions stored in the memory and executable by the processor to cause the apparatus to perform a method of any of aspects 17 through 17.

Aspect 38: An apparatus for wireless communication at a base station, comprising at least one means for performing a method of any of aspects 17 through 17.

Aspect 39: A non-transitory computer-readable medium storing code for wireless communication at a base station, the code comprising instructions executable by a processor to perform a method of any of aspects 17 through 17.

Aspect 40: An apparatus for wireless communication at a first device, comprising a processor; memory coupled with the processor; and instructions stored in the memory and executable by the processor to cause the apparatus to perform a method of any of aspects 18 through 21.

Aspect 41: An apparatus for wireless communication at a first device, comprising at least one means for performing a method of any of aspects 18 through 21.

Aspect 42: A non-transitory computer-readable medium storing code for wireless communication at a first device, the code comprising instructions executable by a processor to perform a method of any of aspects 18 through 21.

Aspect 43: An apparatus for wireless communication at a first device, comprising a processor; memory coupled with the processor; and instructions stored in the memory and executable by the processor to cause the apparatus to perform a method of any of aspects 22 through 29.

Aspect 44: An apparatus for wireless communication at a first device, comprising at least one means for performing a method of any of aspects 22 through 29.

Aspect 45: A non-transitory computer-readable medium storing code for wireless communication at a first device, the code comprising instructions executable by a processor to perform a method of any of aspects 22 through 29.

Aspect 46: An apparatus for wireless communication at a base station, comprising a processor; memory coupled with the processor; and instructions stored in the memory and executable by the processor to cause the apparatus to perform a method of any of aspects 30 through 30.

Aspect 47: An apparatus for wireless communication at a base station, comprising at least one means for performing a method of any of aspects 30 through 30.

Aspect 48: A non-transitory computer-readable medium storing code for wireless communication at a base station, the code comprising instructions executable by a processor to perform a method of any of aspects 30 through 30.

Aspect 49: A method for wireless communication at a remote UE, comprising: establishing a communication link with a base station, the communication link comprising a sidelink communication link between the remote UE and a relay UE and a relay communication link between the relay UE and the base station; transmitting, over the sidelink communication link, a scheduling request; receiving, over the sidelink communication link and based at least in part on transmitting the scheduling request, an indication of one or more sidelink shared channel resources configured by the base station for a sidelink transmission by the remote UE; and transmitting, over the sidelink communication link, the sidelink transmission over at least a portion of the one or more sidelink shared channel resources.

Aspect 50: The method of aspect 49, further comprising: receiving, over the sidelink communication link, an indication of one or more sidelink feedback channel resources configured by the base station for the scheduling request from the remote UE to the relay UE, wherein the scheduling request is transmitted over at least a portion of the one or more sidelink feedback channel resources.

Aspect 51: The method of aspect 50, wherein the sidelink transmission corresponds to data stored at the remote UE, and further comprising: receiving, over the sidelink communication link, an indication of one or more additional sidelink feedback channel resources configured by the base station for the scheduling request from the remote UE to the relay UE, wherein the one or more sidelink feedback channel resources are associated with a first priority and the one or more additional sidelink feedback channel resources are associated with a second priority, and wherein the scheduling request is transmitted over the at least the portion of the one or more sidelink feedback channel resources based at least in part on the data being associated with a logical channel group with the first priority.

Aspect 52: The method of aspect 51, wherein the one or more sidelink feedback channel resources is associated with a first prohibit timer and a first maximum transmission counter, and the one or more additional sidelink feedback channel resources are associated with a second prohibit timer and a second maximum transmission counter.

Aspect 53: The method of any of aspects 49 through 52, further comprising: receiving a control signal over the sidelink communication link indicating a priority for each of a plurality of logical channel groups.

Aspect 54: The method of any of aspects 49 through 53, further comprising: receiving a control signal from the base station indicating a priority for each of a plurality of logical channel groups of the remote UE.

Aspect 55: The method of any of aspects 49 through 54, wherein the scheduling request is transmitted over a dedicated feedback channel.

Aspect 56: The method of any of aspects 49 through 55, wherein the sidelink transmission corresponds to data stored at the remote UE, and the scheduling request explicitly indicates a priority of a logical channel group associated with the data.

Aspect 57: The method of any of aspects 49 through 56, wherein the sidelink transmission corresponds to data stored at the remote UE, and the sidelink transmission indicates a priority of one or more logical channel groups associated with the data stored at the remote UE.

Aspect 58: The method of any of aspects 49 through 57, further comprising: determining that a criterion for transmitting the sidelink transmission is satisfied, wherein the transmitting the sidelink transmission over at least the portion of one or more sidelink shared channel resources is based at least in part on determining that the criterion is satisfied.

Aspect 59: The method of aspect 58, wherein the sidelink transmission corresponds to data stored at the remote UE, and the criterion comprises the remote UE receiving the data at an empty buffer, the data being associated with a logical channel that has a higher priority than one or more additional logical channels associated with additional data stored at the remote UE, or a combination thereof.

Aspect 60: The method of any of aspects 49 through 59, wherein the sidelink transmission comprises a buffer status report corresponding to data stored at the remote UE.

Aspect 61: A method for wireless communication at a relay UE, comprising: establishing a communication link with a base station and a remote UE, the communication link comprising a sidelink communication link between the remote UE and the relay UE and a relay communication link between the relay UE and the base station; receiving, over the sidelink communication link, a scheduling request; transmitting, over the sidelink communication link and based at least in part on receiving the scheduling request, an indication of one or more sidelink shared channel resources configured by the base station for a sidelink transmission by the remote UE; receiving, over the sidelink communication link, the sidelink transmission over at least a portion of the one or more sidelink shared channel resources; and transmitting, over the relay communication link, an indication that the sidelink transmission was successfully received and decoded by the relay UE.

Aspect 62: The method of aspect 61, further comprising: receiving, over the relay communication link, an indication of one or more sidelink feedback channel resources for the scheduling request from the remote UE to the relay UE; and transmitting, over the sidelink communication link, the indication of the one or more sidelink feedback channel resources, wherein the scheduling request is received over at least a portion of the one or more sidelink feedback channel resources.

Aspect 63: The method of aspect 62, wherein the sidelink transmission corresponds to data stored at the remote UE, and further comprising: receiving, over the relay communication link, an indication of one or more additional sidelink feedback channel resources for the scheduling request from the remote UE to the relay UE; and transmitting, over the sidelink communication link, the indication of the one or more additional sidelink feedback channel resources, wherein the one or more sidelink feedback channel resources are associated with a first priority and the one or more additional sidelink feedback channel resources are associated with a second priority, and wherein the scheduling request is received over the at least the portion of the one or more sidelink feedback channel resources based at least in part on the data being associated with a logical channel group with the first priority.

Aspect 64: The method of any of aspects 61 through 63, wherein the one or more sidelink feedback channel resources is associated with a first prohibit timer and a first maximum transmission counter, and the one or more additional sidelink feedback channel resources is associated with a second prohibit timer and a second maximum transmission counter.

Aspect 65: The method of any of aspects 61 through 64, further comprising:

receiving a first control signal over the relay communication link indicating a priority for each of a plurality of logical channel groups of the remote UE; and transmitting a second control signal over the sidelink communication link indicating the priority for each of the plurality of logical channel groups of the remote UE.

Aspect 66: The method of aspect 65, further comprising: transmitting, to an additional UE, a third control signal indicating the priority for each of the plurality of logical channel groups of the remote UE.

Aspect 67: The method of any of aspects 61 through 66, wherein the sidelink transmission comprises a buffer status report, and further comprising: transmitting the buffer status report over the relay communication link.

Aspect 68: The method of any of aspects 61 through 67, further comprising:

transmitting, over the relay communication link, a second scheduling request over the relay communication link based at least in part on receiving the scheduling request over the sidelink communication link; and receiving, over the relay communication link, the indication of one or more sidelink shared channel resources based at least in part on transmitting the second scheduling request.

Aspect 69: The method of any of aspects 61 through 68, further comprising: transmitting, over the sidelink communication link, an indication of second one or more sidelink shared channel resources configured by the base station for the sidelink transmission; determining that the relay UE has failed to successfully receive and decode the sidelink transmission over the second one or more sidelink shared channel resources; and transmitting, over the relay communication link, an indication that the relay UE has failed to successfully receive and decode the sidelink transmission based at least in part on the determining, wherein receiving the indication of the one or more sidelink shared channel resources is based at least in part on transmitting the indication that the relay UE has failed to successfully receive and decode the sidelink transmission.

Aspect 70: The method of any of aspects 61 through 69, wherein the scheduling request is received over a dedicated feedback channel.

Aspect 71: The method of any of aspects 61 through 70, wherein the sidelink transmission corresponds to data stored at the remote UE, and the scheduling request explicitly indicates a priority of a logical channel group associated with the data.

Aspect 72: The method of any of aspects 61 through 71, wherein the sidelink transmission corresponds to data stored at the remote UE, and the sidelink transmission indicates a priority of one or more logical channel groups associated with the data stored at the remote UE.

Aspect 73: The method of any of aspects 61 through 72, wherein the sidelink transmission comprises a buffer status report corresponding to data stored at the remote UE.

Aspect 74: A method for wireless communication at a base station, comprising: establishing a communication link with a remote UE, the communication link comprising a sidelink communication link between the remote UE and a relay UE and a relay communication link between the relay UE and the base station; transmitting, over the relay communication link, an indication of one or more sidelink shared channel resources for a sidelink transmission from the remote UE to the relay UE; and receiving an indication that the sidelink transmission was successfully received and decoded by the relay UE based at least in part on transmitting the indication of the one or more sidelink shared channel resources.

Aspect 75: The method of aspect 74, further comprising: receiving a scheduling request associated with the remote UE over the relay communication link, wherein transmitting the indication of the one or more sidelink shared channel resources is based at least in part on receiving the scheduling request.

Aspect 76: The method of aspect 75, further comprising: transmitting, over the relay communication link, an indication of one or more sidelink feedback channel resources for a second scheduling request from the remote UE to the relay UE.

Aspect 77: The method of aspect 76, further comprising: transmitting, over the relay communication link, an indication of one or more additional sidelink feedback control channel resources for the second scheduling request from the remote UE to the relay UE.

Aspect 78: The method of any of aspects 75 through 77, further comprising: transmitting a control signal over the relay communication link indicating a priority for each of a plurality of logical channel groups of the remote UE.

Aspect 79: The method of any of aspects 75 through 78, further comprising: transmitting a control signal to the remote UE indicating a priority for each of a plurality of logical channel groups of the remote UE.

Aspect 80: The method of aspect 79, further comprising: transmitting a second control signal to another UE indicating the priority of each of the plurality of logical channel groups of the remote UE.

Aspect 81: The method of any of aspects 75 through 80, wherein the sidelink transmission comprises a buffer status report, and further comprising: receiving the buffer status report over the relay communication link.

Aspect 82: The method of any of aspects 75 through 81, further comprising:

receiving, over the relay communication link, an indication that the relay UE has failed to successfully receive and decode the sidelink transmission; and transmitting, over the relay communication link, an indication of second one or more sidelink shared channel resources for retransmission of the sidelink transmission, wherein receiving the indication that the sidelink transmission was successfully received and decoded is based at least in part on transmitting the indication of the second one or more sidelink shared channel resources.

Aspect 83: The method of any of aspects 74 through 82, wherein the sidelink transmission comprises a buffer status report corresponding to data stored at the remote UE.

Aspect 84: A method for wireless communication at a remote UE, comprising: establishing a sidelink communication link with a relay UE; determining that a criterion for transmitting a sidelink transmission is satisfied; transmitting, over the sidelink communication link, the sidelink transmission over one or more preconfigured sidelink shared channel resources based at least in part on determining that the criterion is satisfied; and receiving, over the sidelink communication link, an indication that the sidelink transmission was successfully received and decoded by the relay UE.

Aspect 85: The method of aspect 84, further comprising: transmitting, over the sidelink communication link, the sidelink transmission over second one or more preconfigured sidelink shared channel resources, wherein the second one or more preconfigured sidelink shared channel resources occur prior to the one or more preconfigured sidelink shared channel resources; receiving, over the sidelink communication link, an indication that the relay UE failed to successfully receive and decode the sidelink transmission; and transmitting the sidelink transmission over the one or more preconfigured sidelink shared channel resources based at least in part on receiving the indication that the relay UE failed to successfully receive and decode the sidelink transmission.

Aspect 86: The method of any of aspects 84 through 85, wherein the sidelink transmission comprises a buffer status report corresponding to data stored at the remote UE.

Aspect 87: A method for wireless communication at a relay UE, comprising: establishing a sidelink communication link with a remote UE; receiving, over the sidelink communication link, a sidelink transmission over one or more preconfigured sidelink shared channel resources; and transmitting, over the sidelink communication link, an indication that the sidelink transmission was successfully received and decoded by the remote UE.

Aspect 88: The method of aspect 87, further comprising: determining that the relay UE has failed to receive the sidelink transmission over second one or more preconfigured sidelink shared channel resources, wherein the second one or more preconfigured sidelink shared channel resources occur prior to the one or more preconfigured sidelink shared channel resources; transmitting, over the sidelink communication link, an indication that the relay UE failed to successfully receive and decode the sidelink transmission; and receiving the sidelink transmission over the one or more preconfigured sidelink shared channel resources based at least in part on transmitting the indication that the relay UE failed to successfully receive and decode the sidelink transmission.

Aspect 89: The method of any of aspects 87 through 88, wherein the sidelink transmission comprises a buffer status report corresponding to data stored at the remote UE.

Aspect 90: A method for wireless communication at a remote UE, comprising: establishing a communication link with a base station, the communication link comprising a sidelink communication link between the remote UE and a relay UE and a relay communication link between the relay UE and the base station; receiving, over the sidelink communication link, an indication of one or more resources configured by the base station for transmission of a scheduling request to the relay UE over the sidelink communication link; triggering a buffer status report for transmission of data to the base station over the communication link; identifying, based at least in part on triggering the buffer status report, that resources on the sidelink communication link are unavailable for transmission of the buffer status report; and transmitting, to the relay UE and over the sidelink communication link, a scheduling request using at least a portion of the one or more configured resources and based at least in part on identifying that the resources on the sidelink communication link are unavailable.

Aspect 91: The method of aspect 90, further comprising: receiving, over the sidelink communication link, a grant of resources for the sidelink communication link for a data transmission to the base station based at least in part on transmission of the scheduling request; and transmitting the data over the sidelink communication link based at least in part on reception of the grant.

Aspect 92: The method of any of aspects 90 through 91, wherein receiving the indication of the one or more configured resources comprises: receiving, over the sidelink communication link, a configuration indicating one or more resources on a sidelink feedback channel for transmission of the scheduling request.

Aspect 93: The method of any of aspects 90 through 92, wherein receiving the indication of the one or more configured resources comprises: receiving, over the sidelink communication link, a configuration of the one or more resources that comprises a bitmap indicating one or more resource blocks comprising the one or more resources for transmission of the scheduling request.

Aspect 94: The method of aspect 93, wherein receiving the indication of the one or more configured resources further comprises: receiving, within the configuration, a cyclic shift for the one or more resource blocks comprising the one or more resources.

Aspect 95: The method of any of aspects 90 through 94, further comprising: receiving, over the sidelink communication link, a second indication of one or more second resources configured by the base station for transmission of a scheduling request to the relay UE over the sidelink communication link.

Aspect 96: The method of aspect 95, wherein the one or more configured resources are associated with a first quality of service for first communications on the communication link and the one or more second resources are associated with a second quality of service for second communications on the communication link.

Aspect 97: The method of any of aspects 95 through 96, wherein the one or more configured resources are associated with a first set of logical channels and the one or more second resources are associated with a second set of logical channels, the first set of logical channels associated with a first range of logical channel priorities and the second set of logical channels associated with a second range of logical channel priorities.

Aspect 98: The method of aspect 97, further comprising: selecting the one or more configured resources for transmission of the scheduling request based at least in part on a logical channel priority of the scheduling request and the first range of logical channel priorities.

Aspect 99: The method of any of aspects 95 through 98, wherein the one or more configured resources are associated with a first timer for prohibiting transmission of a scheduling request and the one or more second resources are associated with a second timer for prohibiting transmission of a scheduling request.

Aspect 100: The method of any of aspects 90 through 99, further comprising: initiating a counter based at least in part on transmission of the scheduling request.

Aspect 101: The method of aspect 100, further comprising: transmitting, over the sidelink communication link, the buffer status report based at least in part on transmission of the scheduling request; and resetting the counter to an initial value based at least in part on transmission of the buffer status report.

Aspect 102: The method of any of aspects 100 through 101, further comprising: transmitting, over the sidelink communication link, a second scheduling request based at least in part on the triggered buffer status report; and incrementing the counter based at least in part on transmission of the second scheduling request.

Aspect 103: The method of any of aspects 100 through 102, further comprising: determining that the counter has reached a threshold value based at least in part on initiating the counter; releasing the one or more configured resources based at least in part on the counter reaching the threshold value; and transmitting, based at least in part on releasing the one or more configured resources, a notification over the sidelink communication link that comprises an indication that the remote UE has released the one or more configured resources.

Aspect 104: The method of any of aspects 90 through 103, wherein the scheduling request comprises a plurality of bits and the plurality of bits comprises an indication of a priority associated with the scheduling request.

Aspect 105: A method for wireless communication at a relay UE, comprising: establishing a communication link with a base station and a remote UE, the communication link comprising a sidelink communication link between the remote UE and the relay UE and a relay communication link between the relay UE and the base station; receiving, over the relay communication link, an indication of one or more resources configured by the base station for transmission of a scheduling request from the remote UE to the relay UE over the sidelink communication link; transmitting, over the sidelink communication link, the indication of the one or more configured resources; receiving, over the sidelink communication link, a scheduling request using at least a portion of the one or more configured resources, the scheduling request indicating that resources on the sidelink communication link are unavailable for transmission of a buffer status report; and transmitting the scheduling request over the relay communication link based at least in part on the indication that resources on the sidelink communication link are unavailable and on reception of the scheduling request over the sidelink communication link.

Aspect 106: The method of aspect 105, further comprising: receiving, over the relay communication link, a grant of resources for the sidelink communication link for a data transmission from the remote UE to the base station based at least in part on transmission of the scheduling request; transmitting, over the sidelink communication link, the grant of resources; receiving a data transmission over the sidelink communication link based at least in part on transmission of the grant; and transmitting the data transmission over the relay communication link based at least in part on reception of the data transmission.

Aspect 107: The method of any of aspects 105 through 106, wherein receiving the indication of the one or more configured resources comprises: receiving, over the relay communication link, a configuration indicating one or more resources on a sidelink feedback channel for transmission of the scheduling request.

Aspect 108: The method of any of aspects 105 through 107, wherein receiving the indication of the one or more configured resources comprises: receiving, over the relay communication link, a configuration of the one or more resources that comprises a bitmap indicating one or more resource blocks comprising the one or more resources for transmission of the scheduling request.

Aspect 109: The method of aspect 108, wherein receiving the indication of the one or more configured resources further comprises: receiving, within the configuration, a cyclic shift for the one or more resource blocks comprising the one or more resources.

Aspect 110: The method of any of aspects 105 through 109, further comprising: receiving, over the relay communication link, a second indication of one or more second resources configured by the base station for transmission of a scheduling request from the remote UE to the relay UE over the sidelink communication link; and transmitting, over the sidelink communication link, the second indication of the one or more second resources.

Aspect 111: The method of aspect 110, wherein the one or more configured resources are associated with a first quality of service for first communications on the communication link and the one or more second resources are associated with a second quality of service for second communications on the communication link.

Aspect 112: The method of any of aspects 110 through 111, wherein the one or more configured resources are associated with a first set of logical channels and the one or more second resources are associated with a second set of logical channels, the first set of logical channels associated with a first range of logical channel priorities and the second set of logical channels associated with a second range of logical channel priorities.

Aspect 113: The method of aspect 112, further comprising: identifying a priority of the received scheduling request based at least in part on the first range of logical channel priorities and receiving the scheduling request on the at least a portion of the one or more configured resources; and configuring a logical channel for transmission of the scheduling request based at least in part on the identified priority.

Aspect 114: The method of any of aspects 110 through 113, wherein the one or more configured resources are associated with a first timer for prohibiting transmission of a scheduling request and the one or more second resources are associated with a second timer for prohibiting transmission of a scheduling request.

Aspect 115: The method of any of aspects 105 through 114, further comprising: receiving a notification over the sidelink communication link that comprises an indication that the remote UE has released the one or more configured resources; and transmitting, the notification over the relay communication link based at least in part on receiving the notification.

Aspect 116: The method of any of aspects 105 through 115, wherein the scheduling request comprises a plurality of bits and the plurality of bits comprises an indication of a priority associated with the scheduling request.

Aspect 117: A method for wireless communication at a base station, comprising: establishing a communication link with a remote UE, the communication link comprising a sidelink communication link between the remote UE and a relay UE and a relay communication link between the relay UE and the base station; configuring, based at least in part on establishing the communication link, one or resources for transmission of a scheduling request from the remote UE to the relay UE over the sidelink communication link; transmitting, over the relay communication link, an indication of the one or more configured resources; receiving, over the relay communication link, a scheduling request for the remote UE based at least in part on transmitting the indication of the one or more configured resources; and determining, based at least in part on reception of the scheduling request, that resources on the sidelink communication link are unavailable for transmission of a buffer status report.

Aspect 118: The method of aspect 117, further comprising: transmitting, over the relay communication link, a grant of resources for the sidelink communication link for a data transmission from the remote UE to the base station based at least in part on the determination that resources on the sidelink communication link are unavailable; and receiving the data transmission over the relay communication link based at least in part on transmission of the grant.

Aspect 119: The method of any of aspects 117 through 118, wherein configuring the one or more resources comprises: configuring the one or more resources on a sidelink feedback channel for transmission of the scheduling request.

Aspect 120: The method of any of aspects 117 through 119, wherein transmitting the indication of the one or more configured resources comprises: transmitting, over the relay communication link, a configuration of the one or more resources that comprises a bitmap indicating one or more resource blocks comprising the one or more resources for transmission of the scheduling request.

Aspect 121: The method of aspect 120, wherein transmitting the indication of the one or more configured resources further comprises: transmitting, within the configuration, a cyclic shift for the one or more resource blocks comprising the one or more resources.

Aspect 122: The method of any of aspects 117 through 121, further comprising: transmitting, over the relay communication link, a second indication of one or more second resources configured by the base station for transmission of a scheduling request from the remote UE to the relay UE over the sidelink communication link.

Aspect 123: The method of aspect 122, wherein the one or more configured resources are associated with a first quality of service for first communications on the communication link and the one or more second resources are associated with a second quality of service for second communications on the communication link.

Aspect 124: The method of any of aspects 122 through 123, wherein the one or more configured resources are associated with a first set of logical channels and the one or more second resources are associated with a second set of logical channels, the first set of logical channels associated with a first range of logical channel priorities and the second set of logical channels associated with a second range of logical channel priorities.

Aspect 125: The method of aspect 124, further comprising: identifying a priority of the received scheduling request based at least in part on a logical channel associated with the received scheduling request.

Aspect 126: The method of any of aspects 122 through 125, wherein the one or more configured resources are associated with a first timer for prohibiting transmission of a scheduling request and the one or more second resources are associated with a second timer for prohibiting transmission of a scheduling request.

Aspect 127: The method of any of aspects 117 through 126, further comprising: receiving a notification over the relay communication link that comprises an indication that the remote UE has released the one or more configured resources.

Aspect 128: The method of any of aspects 117 through 127, wherein the scheduling request comprises a plurality of bits and the plurality of bits comprises an indication of a priority associated with the scheduling request.

Aspect 129: An apparatus for wireless communication at a remote UE, comprising a processor; memory coupled with the processor; and instructions stored in the memory and executable by the processor to cause the apparatus to perform a method of any of aspects 49 through 60.

Aspect 130: An apparatus for wireless communication at a remote UE, comprising at least one means for performing a method of any of aspects 49 through 60.

Aspect 131: A non-transitory computer-readable medium storing code for wireless communication at a remote UE, the code comprising instructions executable by a processor to perform a method of any of aspects 49 through 60.

Aspect 132: An apparatus for wireless communication at a relay UE, comprising a processor; memory coupled with the processor; and instructions stored in the memory and executable by the processor to cause the apparatus to perform a method of any of aspects 61 through 73.

Aspect 133: An apparatus for wireless communication at a relay UE, comprising at least one means for performing a method of any of aspects 61 through 73.

Aspect 134: A non-transitory computer-readable medium storing code for wireless communication at a relay UE, the code comprising instructions executable by a processor to perform a method of any of aspects 61 through 73.

Aspect 135: An apparatus for wireless communication at a base station, comprising a processor; memory coupled with the processor; and instructions stored in the memory and executable by the processor to cause the apparatus to perform a method of any of aspects 74 through 83.

Aspect 136: An apparatus for wireless communication at a base station, comprising at least one means for performing a method of any of aspects 74 through 83.

Aspect 137: A non-transitory computer-readable medium storing code for wireless communication at a base station, the code comprising instructions executable by a processor to perform a method of any of aspects 74 through 83.

Aspect 138: An apparatus for wireless communication at a remote UE, comprising a processor; memory coupled with the processor; and instructions stored in the memory and executable by the processor to cause the apparatus to perform a method of any of aspects 84 through 86.

Aspect 139: An apparatus for wireless communication at a remote UE, comprising at least one means for performing a method of any of aspects 84 through 86.

Aspect 140: A non-transitory computer-readable medium storing code for wireless communication at a remote UE, the code comprising instructions executable by a processor to perform a method of any of aspects 84 through 86.

Aspect 141: An apparatus for wireless communication at a relay UE, comprising a processor; memory coupled with the processor; and instructions stored in the memory and executable by the processor to cause the apparatus to perform a method of any of aspects 87 through 89.

Aspect 142: An apparatus for wireless communication at a relay UE, comprising at least one means for performing a method of any of aspects 87 through 89.

Aspect 143: A non-transitory computer-readable medium storing code for wireless communication at a relay UE, the code comprising instructions executable by a processor to perform a method of any of aspects 87 through 89.

Aspect 144: An apparatus for wireless communication at a remote UE, comprising a processor; memory coupled with the processor; and instructions stored in the memory and executable by the processor to cause the apparatus to perform a method of any of aspects 90 through 104.

Aspect 145: An apparatus for wireless communication at a remote UE, comprising at least one means for performing a method of any of aspects 90 through 104.

Aspect 146: A non-transitory computer-readable medium storing code for wireless communication at a remote UE, the code comprising instructions executable by a processor to perform a method of any of aspects 90 through 104.

Aspect 147: An apparatus for wireless communication at a relay UE, comprising a processor; memory coupled with the processor; and instructions stored in the memory and executable by the processor to cause the apparatus to perform a method of any of aspects 105 through 116.

Aspect 148: An apparatus for wireless communication at a relay UE, comprising at least one means for performing a method of any of aspects 105 through 116.

Aspect 149: A non-transitory computer-readable medium storing code for wireless communication at a relay UE, the code comprising instructions executable by a processor to perform a method of any of aspects 105 through 116.

Aspect 150: An apparatus for wireless communication at a base station, comprising a processor; memory coupled with the processor; and instructions stored in the memory and executable by the processor to cause the apparatus to perform a method of any of aspects 117 through 128.

Aspect 151: An apparatus for wireless communication at a base station, comprising at least one means for performing a method of any of aspects 117 through 128.

Aspect 152: A non-transitory computer-readable medium storing code for wireless communication at a base station, the code comprising instructions executable by a processor to perform a method of any of aspects 117 through 128.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
   receiving an indication of one or more feedback channel resources for a scheduling request from the first device to a second device configured by a network entity;
   transmitting, over a communication link between the first device and the second device, the scheduling request over the one or more feedback channel resources;
   receiving, over the communication link and based at least in part on the scheduling request, an indication of one or more shared channel resources configured by the network entity for a transmission by the first device; and
   transmitting, over the communication link, the transmission over at least a portion of the one or more shared channel resources.

2. The method of claim 1, further comprising:
   receiving a control signal from the network entity indicating a priority for each of a plurality of logical channel groups of the first device.

3. The method of claim 1, further comprising:
   determining that a criterion for transmitting the transmission is satisfied, wherein the transmitting the transmission over the at least the portion of the one or more shared channel resources is based at least in part on determining that the criterion is satisfied, wherein the transmission corresponds to data stored at the first device, and wherein the criterion comprises the first device receiving the data in an empty buffer, the data being associated with a logical channel that has a higher priority than one or more additional logical channels associated with additional data stored at the first device, or a combination thereof.

4. A method for wireless communication at a first device, comprising:
   receiving, over a first communication link between the first device and a second device, a scheduling request;
   transmitting, over the first communication link between the first device and the second device, an indication of first one or more shared channel resources configured by a network entity for a transmission;
   determining that the first device has failed to successfully receive and decode the transmission over the first one or more shared channel resources;
   transmitting, over a second communication link, an indication that the first device has failed to successfully receive and decode the transmission based at least in part on the determining;
   transmitting, over the first communication link and based at least in part on transmitting the indication that the first device has failed to successfully receive and decode the transmission, an indication of second one or more shared channel resources configured by the network entity for a retransmission of the transmission by the second device; and
   receiving, over the first communication link, the retransmission of the transmission over at least a portion of the second one or more shared channel resources.

5. The method of claim 4, further comprising:
   receiving, over the second communication link, an indication of one or more feedback channel resources for the scheduling request from the second device to the first device; and
   transmitting, over the first communication link, the indication of the one or more feedback channel resources, wherein the scheduling request is received over at least a portion of the one or more feedback channel resources.

6. The method of claim 5, wherein the transmission corresponds to data stored at the second device, the method further comprising:
   receiving, over the second communication link, an indication of one or more additional feedback channel resources for the scheduling request from the second device to the first device; and
   transmitting, over the first communication link, the indication of the one or more additional feedback channel resources, wherein the one or more feedback channel resources are associated with a first priority and the one or more additional feedback channel resources are associated with a second priority, and wherein the scheduling request is received over the at least the portion of the one or more feedback channel resources based at least in part on the data being associated with a logical channel group with the first priority.

7. The method of claim 6, wherein the one or more feedback channel resources are associated with a first prohibit timer and a first maximum transmission counter, and the one or more additional feedback channel resources are associated with a second prohibit timer and a second maximum transmission counter.

8. The method of claim 4, further comprising:
   receiving a first control signal over the second communication link indicating a priority for each of a plurality of logical channel groups of the second device; and
   transmitting a second control signal over the first communication link indicating the priority for each of the plurality of logical channel groups of the second device.

9. The method of claim 8, further comprising:
   transmitting, to a third device, a third control signal indicating the priority for each of the plurality of logical channel groups of the second device.

10. The method of claim 4, wherein the transmission comprises a buffer status report, the method further comprising:
    transmitting the buffer status report over the second communication link.

11. The method of claim 4, further comprising:
    transmitting, over the second communication link, a second scheduling request over the second communication link based at least in part on receiving the scheduling request over the first communication link; and
    receiving, over the second communication link, the indication of the first one or more shared channel resources based at least in part on transmitting the second scheduling request.

12. The method of claim 4, wherein the scheduling request is received over a dedicated feedback channel.

13. The method of claim 4, wherein the transmission corresponds to data stored at the second device, and wherein the scheduling request explicitly indicates a priority of a logical channel group associated with the data.

14. The method of claim 4, wherein the transmission corresponds to data stored at the second device, and wherein the transmission indicates a priority of one or more logical channel groups associated with the data stored at the second device.

15. The method of claim 4, wherein the transmission comprises a buffer status report corresponding to data stored at the second device.

16. A method for wireless communication at a network entity, comprising:
outputting an indication of one or more shared channel resources for a transmission from a second device to a first device;
obtaining an indication that the first device has failed to successfully receive and decode the transmission based at least in part on outputting the indication of the one or more shared channel resources; and
outputting an indication of second one or more shared channel resources for a retransmission of the transmission from the second device to the first device.

17. A method for wireless communication at a first device, comprising:
receiving, over a first communication link between the first device and a second device, an indication of one or more resources configured by a network entity for transmission of a scheduling request to the second device over the first communication link;
triggering a buffer status report for transmission of data to the network entity over a second communication link;
identifying, based at least in part on triggering the buffer status report, that resources on the first communication link are unavailable for transmission of the buffer status report; and
transmitting, to the second device and over the first communication link, the scheduling request using at least a portion of the one or more configured resources and based at least in part on identifying that the resources on the first communication link are unavailable.

18. The method of claim 17, further comprising:
initiating a counter based at least in part on transmission of the scheduling request.

19. The method of claim 18, further comprising:
transmitting, over the first communication link, the buffer status report based at least in part on transmission of the scheduling request; and
resetting the counter to an initial value based at least in part on transmission of the buffer status report.

20. The method of claim 18, further comprising:
transmitting, over the first communication link, a second scheduling request based at least in part on the triggered buffer status report; and
incrementing the counter based at least in part on transmission of the second scheduling request.

21. A method for wireless communication at a first device, comprising:
receiving, over a first communication link between the first device and a network entity, an indication of one or more resources configured by the network entity for transmission of a scheduling request from a second device to the first device over a second communication link between the first device and the second device;
transmitting, over the second communication link, the indication of the one or more configured resources;
receiving, over the second communication link, the scheduling request using at least a portion of the one or more configured resources, the scheduling request indicating that resources on the second communication link are unavailable for transmission of a buffer status report; and
transmitting the scheduling request over the first communication link based at least in part on the indication that resources on the second communication link are unavailable and on reception of the scheduling request over the second communication link.

22. The method of claim 21, further comprising:
receiving, over the first communication link, a second indication of one or more second resources configured by the network entity for transmission of the scheduling request from the second device to the first device over the second communication link; and
transmitting, over the second communication link, the second indication of the one or more second resources.

23. The method of claim 22, wherein the one or more configured resources are associated with a first quality of service for first communications on the first communication link and the one or more second resources are associated with a second quality of service for second communications on the first communication link.

24. The method of claim 22, wherein the one or more configured resources are associated with a first set of logical channels and the one or more second resources are associated with a second set of logical channels, the first set of logical channels associated with a first range of logical channel priorities and the second set of logical channels associated with a second range of logical channel priorities.

25. The method of claim 24, further comprising:
identifying a priority of the received scheduling request based at least in part on the first range of logical channel priorities and receiving the scheduling request on the at least the portion of the one or more configured resources; and
configuring a logical channel for transmission of the scheduling request based at least in part on the identified priority.

26. The method of claim 22, wherein the one or more configured resources are associated with a first timer for prohibiting transmission of the scheduling request and the one or more second resources are associated with a second timer for prohibiting transmission of the scheduling request.

27. The method of claim 21, further comprising:
receiving a notification over the second communication link that comprises an indication that the one or more configured resources are released; and
transmitting, the notification over the first communication link based at least in part on receiving the notification.

28. The method of claim 21, wherein the scheduling request comprises a plurality of bits and the plurality of bits comprises an indication of a priority associated with the scheduling request.

29. A method for wireless communication at a network entity, comprising:
configuring one or more resources for transmission of a scheduling request from a first device to a second device over a first communication link between the first device and the second device;

outputting an indication of the one or more configured resources;
obtaining the scheduling request for the first device based at least in part on outputting the indication of the one or more configured resources; and
determining, based at least in part on reception of the scheduling request, that resources on the first communication link are unavailable for transmission of a buffer status report.

30. The method of claim 16, further comprising:
obtaining a scheduling request, wherein outputting the indication of the one or more shared channel resources is based at least in part on the scheduling request.

31. The method of claim 16, further comprising:
outputting a control signal indicating a priority for each of a plurality of logical channel groups.

32. An apparatus for wireless communication at a first device, comprising:
one or more memories; and
one or more processors coupled with the one or more memories and configured to cause the first device to:
receive an indication of one or more feedback channel resources for a scheduling request from the first device to a second device configured by a network entity;
transmit, over a communication link between the first device and the second device, the scheduling request over the one or more feedback channel resources;
receive, over the communication link and based at least in part on the scheduling request, an indication of one or more shared channel resources configured by the network entity for a transmission by the first device; and
transmit, over the communication link, the transmission over at least a portion of the one or more shared channel resources.

33. The apparatus of claim 32, wherein the one or more processors are further configured to cause the first device to:
receive a control signal from the network entity indicating a priority for each of a plurality of logical channel groups of the first device.

34. The apparatus of claim 32, wherein the one or more processors are further configured to cause the first device to:
determine that a criterion for the transmission is satisfied, wherein the transmission is transmitted over the at least the portion of the one or more shared channel resources when the criterion is satisfied, wherein the transmission corresponds to data stored at the first device, and wherein the criterion comprises the data being associated with a previously empty buffer that has received the data, the data being associated with a logical channel that has a higher priority than one or more additional logical channels associated with additional data stored at the first device, or a combination thereof.

35. An apparatus for wireless communication at a first device, comprising:
one or more memories; and
one or more processors coupled with the one or more memories and configured to cause the first device to:
receive, over a first communication link between the first device and a second device, a scheduling request;
transmit, over the first communication link between the first device and the second device, an indication of first one or more shared channel resources configured by a network entity for a transmission;
determine that the first device has failed to successfully receive and decode the transmission over the first one or more shared channel resources;
transmit, over a second communication link, an indication that the first device has failed to successfully receive and decode the transmission based at least in part on the failure of the first device to successfully receive and decode the transmission over the first one or more shared channel resources;
transmit, over the first communication link and based at least in part on the indication that the first device has failed to successfully receive and decode the transmission, an indication of second one or more shared channel resources configured by the network entity for a retransmission of the transmission by the second device; and
receive, over the first communication link, the retransmission of the transmission over at least a portion of the second one or more shared channel resources.

36. The apparatus of claim 35, wherein the one or more processors are further configured to cause the first device to:
receive, over the second communication link, an indication of one or more feedback channel resources for the scheduling request from the second device to the first device;
and transmit, over the first communication link, the indication of the one or more feedback channel resources, wherein the scheduling request is received over at least a portion of the one or more feedback channel resources.

37. The apparatus of claim 36, wherein the transmission corresponds to data stored at the second device, and wherein the one or more processors are further configured to:
receive, over the second communication link, an indication of one or more additional feedback channel resources for the scheduling request from the second device to the first device; and
transmit, over the first communication link, the indication of the one or more additional feedback channel resources, wherein the one or more feedback channel resources are associated with a first priority and the one or more additional feedback channel resources are associated with a second priority, and wherein the scheduling request is received over the at least the portion of the one or more feedback channel resources based at least in part on the data being associated with a logical channel group with the first priority.

38. An apparatus for wireless communication at a network entity, comprising:
one or more memories; and
one or more processors coupled with the one or more memories and configured to cause the network entity to:
output an indication of one or more shared channel resources for a transmission from a second device to a first device;
obtain an indication that the first device has failed to successfully receive and decode the transmission based at least in part on the indication of the one or more shared channel resources; and
output an indication of second one or more shared channel resources for a retransmission of the transmission from the second device to the first device.

39. The apparatus of claim 38, wherein the one or more processors are further configured to cause the network entity to:

obtain a scheduling request, wherein the indication of the one or more shared channel resources is based at least in part on the scheduling request.

40. The apparatus of claim 38, wherein the one or more processors are further configured to cause the network entity to:
output a control signal indicating a priority for each of a plurality of logical channel groups.

41. An apparatus for wireless communication at a first device, comprising:
one or more memories; and
one or more processors coupled with the one or more memories and configured to cause the first device to:
receive, over a first communication link between the first device and a second device, an indication of one or more resources configured by a network entity for transmission of a scheduling request to the second device over the first communication link;
trigger a buffer status report for transmission of data to the network entity over a second communication link;
identify, based at least in part on the triggered buffer status report, that resources on the first communication link are unavailable for transmission of the buffer status report; and
transmit, to the second device and over the first communication link, the scheduling request using at least a portion of the one or more configured resources and based at least in part on the resources on the first communication link being unavailable.

42. The apparatus of claim 41, wherein the one or more processors are further configured to cause the first device to:
initiate a counter based at least in part on transmission of the scheduling request.

43. The apparatus of claim 42, wherein the one or more processors are further configured to cause the first device to:
transmit, over the first communication link, the buffer status report based at least in part on transmission of the scheduling request; and
reset the counter to an initial value based at least in part on transmission of the buffer status report.

44. An apparatus for wireless communication at a first device, comprising:
one or more memories; and
one or more processors coupled with the one or more memories and configured to cause the first device to:
receive, over a first communication link between the first device and a network entity, an indication of one or more resources configured by the network entity for transmission of a scheduling request from a second device to the first device over a second communication link between the first device and the second device;
transmit, over the second communication link, the indication of the one or more configured resources;
receive, over the second communication link, the scheduling request using at least a portion of the one or more configured resources, the scheduling request indicating that resources on the second communication link are unavailable for transmission of a buffer status report; and
transmit the scheduling request over the first communication link based at least in part on the indication that resources on the second communication link are unavailable and on reception of the scheduling request over the second communication link.

45. The apparatus of claim 44, wherein the one or more processors are further configured to cause the first device to:
receive, over the first communication link, a second indication of one or more second resources configured by the network entity for transmission of the scheduling request from the second device to the first device over the second communication link; and
transmit, over the second communication link, the second indication of the one or more second resources.

46. The apparatus of claim 45, wherein the one or more configured resources are associated with a first quality of service for first communications on the first communication link and the one or more second resources are associated with a second quality of service for second communications on the first communication link.

47. An apparatus for wireless communication at a network entity, comprising:
one or more memories; and
one or more processors coupled with the one or more memories and configured to cause the network entity to:
configure one or more resources for transmission of a scheduling request from a first device to a second device over a first communication link between the first device and the second device;
output an indication of the one or more configured resources;
obtain the scheduling request for the first device based at least in part on the indication of the one or more configured resources; and
determine, based at least in part on reception of the scheduling request, that resources on the first communication link are unavailable for transmission of a buffer status report.

48. A non-transitory computer-readable medium storing code for wireless communication at a first device, the code comprising instructions executable by one or more processors to cause the first device to:
receive an indication of one or more feedback channel resources for a scheduling request from the first device to a second device configured by a network entity;
transmit, over a communication link between the first device and the second device, the scheduling request over the one or more feedback channel resources;
receive, over the communication link and based at least in part on the scheduling request, an indication of one or more shared channel resources configured by the network entity for a transmission by the first device; and
transmit, over the communication link, the transmission over at least a portion of the one or more shared channel resources.

49. The non-transitory computer-readable medium of claim 48, wherein the instructions are further executable by the one or more processors to cause the first device to:
receive a control signal from the network entity indicating a priority for each of a plurality of logical channel groups of the first device.

50. The non-transitory computer-readable medium of claim 49, wherein the transmission corresponds to data stored at the second device, wherein the instructions are further executable by the one or more processors to cause the first device to:
determine that a criterion for transmitting the transmission is satisfied, wherein the transmitting the transmission over the at least the portion of the one or more shared channel resources is based at least in part on determining that the criterion is satisfied, wherein the transmission corresponds to data stored at the first device, and wherein the criterion comprises the first device receiving the data in an empty buffer, the data being associated with a logical channel that has a higher priority than one or more additional logical channels associated with additional data stored at the first device, or a combination thereof.

51. A non-transitory computer-readable medium storing code for wireless communication at a first device, the code comprising instructions executable by one or more processors to cause the first device to:
receive, over a first communication link between the first device and a second device, a scheduling request;
transmit, over the first communication link between the first device and the second device, an indication of first one or more shared channel resources configured by a network entity for a transmission;
determine that the first device has failed to successfully receive and decode the transmission over the first one or more shared channel resources;
transmit, over a second communication link, an indication that the first device has failed to successfully receive and decode the transmission based at least in part on the determining;
transmit, over the first communication link and based at least in part on transmitting the indication that the first device has failed to successfully receive and decode the transmission, an indication of second one or more shared channel resources configured by the network entity for a retransmission of the transmission by the second device; and
receive, over the first communication link, the retransmission of the transmission over at least a portion of the second one or more shared channel resources.

52. The non-transitory computer-readable medium of claim 51, wherein the instructions are further executable by the one or more processors to cause the first device to:
receive, over the second communication link, an indication of one or more feedback channel resources for the scheduling request from the second device to the first device; and
transmit, over the first communication link, the indication of the one or more feedback channel resources, wherein the scheduling request is received over at least a portion of the one or more feedback channel resources.

53. The non-transitory computer-readable medium of claim 52, wherein the transmission corresponds to data stored at the second device, and wherein the instructions are further executable by the one or more processors to cause the first device to:
receive, over the second communication link, an indication of one or more additional feedback channel resources for the scheduling request from the second device to the first device; and
transmit, over the first communication link, the indication of the one or more additional feedback channel resources, wherein the one or more feedback channel resources are associated with a first priority and the one or more additional feedback channel resources are associated with a second priority, and wherein the scheduling request is received over the at least the portion of the one or more feedback channel resources based at least in part on the data being associated with a logical channel group with the first priority.

54. A non-transitory computer-readable medium storing code for wireless communication at a network entity, the code comprising instructions executable by one or more processors to cause the network entity to:
output an indication of one or more shared channel resources for a transmission from a second device to a first device;
obtain an indication that the first device has failed to successfully receive and decode the transmission based at least in part on outputting the indication of the one or more shared channel resources; and
outputting an indication of second one or more shared channel resources for a retransmission of the transmission from the second device to the first device.

55. The non-transitory computer-readable medium of claim 54, wherein the instructions are further executable by the one or more processors to cause the network entity to:
obtain a scheduling request, wherein outputting the indication of the one or more shared channel resources is based at least in part on the scheduling request.

56. The non-transitory computer-readable medium of claim 54, wherein the instructions are further executable by the one or more processors to cause the network entity to:
output a control signal indicating a priority for each of a plurality of logical channel groups.

57. A non-transitory computer-readable medium storing code for wireless communication at a first device, the code comprising instructions executable by one or more processors to cause the first device to:
receive, over a first communication link between the first device and a second device, an indication of one or more resources configured by a network entity for transmission of a scheduling request to the second device over the first communication link;
trigger a buffer status report for transmission of data to the network entity over a second communication link;
identify, based at least in part on triggering the buffer status report, that resources on the first communication link are unavailable for transmission of the buffer status report; and
transmit, to the second device and over the first communication link, the scheduling request using at least a portion of the one or more configured resources and based at least in part on identifying that the resources on the first communication link are unavailable.

58. The non-transitory computer-readable medium of claim 57, wherein the instructions are further executable by the one or more processors to cause the first device to:
initiate a counter based at least in part on transmission of the scheduling request.

59. The non-transitory computer-readable medium of claim 58, wherein the instructions are further executable by the one or more processors to cause the first device to:
transmit, over the first communication link, the buffer status report based at least in part on transmission of the scheduling request; and
reset the counter to an initial value based at least in part on transmission of the buffer status report.

60. A non-transitory computer-readable medium storing code for wireless communication at a first device, the code comprising instructions executable by one or more processors to cause the first device to:
receive, over a first communication link between the first device and a network entity, an indication of one or more resources configured by the network entity for transmission of a scheduling request from a second device to the first device over a second communication link between the first device and the second device;

transmit, over the second communication link, the indication of the one or more configured resources;

receive, over the second communication link, the scheduling request using at least a portion of the one or more configured resources, the scheduling request indicating that resources on the second communication link are unavailable for transmission of a buffer status report; and transmit the scheduling request over the first communication link based at least in part on the indication that resources on the second communication link are unavailable and on reception of the scheduling request over the second communication link.

61. The non-transitory computer-readable medium of claim 60, wherein the instructions are further executable by the one or more processors to cause the first device to:

receive, over the first communication link, a second indication of one or more second resources configured by the network entity for transmission of the scheduling request from the second device to the first device over the second communication link; and transmit, over the second communication link, the second indication of the one or more second resources.

62. The non-transitory computer-readable medium of claim 61, wherein the one or more configured resources are associated with a first quality of service for first communications on the first communication link and the one or more second resources are associated with a second quality of service for second communications on the first communication link.

63. A non-transitory computer-readable medium storing code for wireless communication at a network entity, the code comprising instructions executable by one or more processors to cause the network entity to:

configure one or more resources for transmission of a scheduling request from a first device to a second device over a first communication link between the first device and the second device;

output an indication of the one or more configured resources;

obtain the scheduling request for the first device based at least in part on outputting the indication of the one or more configured resources; and determine, based at least in part on reception of the scheduling request, that resources on the first communication link are unavailable for transmission of a buffer status report.

* * * * *